United States Patent
Gorodissky et al.

(10) Patent No.: US 10,911,476 B2
(45) Date of Patent: *Feb. 2, 2021

(54) SELECTIVELY CHOOSING BETWEEN ACTUAL-ATTACK AND SIMULATION/EVALUATION FOR VALIDATING A VULNERABILITY OF A NETWORK NODE DURING EXECUTION OF A PENETRATION TESTING CAMPAIGN

(71) Applicant: XM CYBER LTD., Hertzelia (IL)

(72) Inventors: Boaz Gorodissky, Hod-Hasharon (IL); Adi Ashkenazy, Tel Aviv (IL); Ronen Segal, Hertzelia (IL); Menahem Lasser, Kohav-Yair (IL)

(73) Assignee: XM CYBER LTD., Hertsliya (IL)

(*) Notice: Subject to any disclaimer, the term of this patent is extended or adjusted under 35 U.S.C. 154(b) by 0 days.

This patent is subject to a terminal disclaimer.

(21) Appl. No.: 16/831,982

(22) Filed: Mar. 27, 2020

(65) Prior Publication Data
US 2020/0236130 A1    Jul. 23, 2020

Related U.S. Application Data

(63) Continuation of application No. 16/566,969, filed on Sep. 11, 2019, now Pat. No. 10,645,113, which is a
(Continued)

(51) Int. Cl.
*H04L 29/06* (2006.01)
*H04L 12/26* (2006.01)
*G06F 21/55* (2013.01)

(52) U.S. Cl.
CPC ......... *H04L 63/1433* (2013.01); *G06F 21/55* (2013.01); *H04L 43/06* (2013.01);
(Continued)

(58) Field of Classification Search
CPC ............ H04L 63/1433; H04L 63/1466; H04L 63/1475
(Continued)

(56) References Cited

U.S. PATENT DOCUMENTS

| | | | |
|---|---|---|---|
| 8,458,798 B2* | 6/2013 | Williams | G06F 21/577 726/25 |
| 9,015,847 B1* | 4/2015 | Kaplan | H04L 63/1441 726/25 |

(Continued)

OTHER PUBLICATIONS

Geer et al., "Penetration testing: a duet", doi: 10.1109/CSAC.2002. 1176290, 2002, pp. 185-195. (Year: 2002).*
(Continued)

*Primary Examiner* — Peter C Shaw
(74) *Attorney, Agent, or Firm* — Momentum IP Group; Marc Van Dyke

(57) ABSTRACT

Methods and systems for penetration testing of a networked system by a penetration testing system. In some embodiments, both active and passive validation methods are used during a single penetration testing campaign in a single networked system. In other embodiments, a first penetration testing campaign uses only active validation and a second penetration campaign uses only passive validation, where both campaigns are performed by a single penetration testing system in a single networked system. Node-by-node determination of whether to use active or passive validation can be based on expected extent and/or likelihood of damage from actually compromising a network node using active validation.

14 Claims, 32 Drawing Sheets

Related U.S. Application Data continuation of application No. 16/400,938, filed on May 1, 2019, now Pat. No. 10,454,966, application No. 16/831,982, which is a continuation of application No. PCT/IB2018/058849, filed on Nov. 11, 2018, said application No. 16/566,969 is a continuation of application No. PCT/IB2018/058849, filed on Nov. 11, 2018, said application No. 16/400,938 is a continuation of application No. 16/186,557, filed on Nov. 11, 2018, now Pat. No. 10,367,846.

(60) Provisional application No. 62/586,600, filed on Nov. 15, 2017, provisional application No. 62/586,600, filed on Nov. 15, 2017.

(52) U.S. Cl.
CPC ...... *H04L 63/1408* (2013.01); *H04L 63/1466* (2013.01); *H04L 63/1475* (2013.01)

(58) Field of Classification Search
USPC .......................................................... 726/25
See application file for complete search history.

(56) References Cited

U.S. PATENT DOCUMENTS

| | | | |
|---|---|---|---|
| 2015/0067857 A1* | 3/2015 | Symons | H04L 63/1408 726/23 |
| 2018/0034846 A1* | 2/2018 | Marquez | H04L 63/1433 |
| 2018/0091558 A1* | 3/2018 | Daugherty | G06F 21/577 |

OTHER PUBLICATIONS

LanFang et al., "A Research of Behavior-Based Penetration Testing Model of the Network", doi: 10.1109/ICICEE.2012.444, 2012, pp. 1680-1683. (Year: 2012).*

* cited by examiner

*Third embodiment –*
*performed as an implementation of step S153*

S153 Subject a single networked system to first and second penetration testing campaigns such that (i) both penetration testing campaigns are performed by a single penetration testing system; (ii) the first penetration testing campaign employs only active validation for validating vulnerabilities of network nodes of the single networked system; and (iii) the second penetration testing campaign employs only passive validation for validating vulnerabilities of network nodes of the single networked system Steps S301 and S303 are performed by a single penetration testing system Execute S301 the first penetration testing campaign by the single penetration testing system, the executing of the first penetration testing campaign comprising performing one or more validation operations for validating vulnerabilities for network nodes of the single networked system, wherein the methods of validation used for all validation operations included in the first penetration testing campaign are active validation methods Execute S303 the second penetration testing campaign by the single penetration testing system, the executing of the second penetration testing campaign comprising performing one or more validation operations for validating vulnerabilities for network nodes of the single networked system, wherein the methods of validation used for all validation operations included in the second penetration testing campaign are passive validation methods Report S305 the security vulnerability of the networked system

FIG.10

TIME ⟶
*Example 1:*
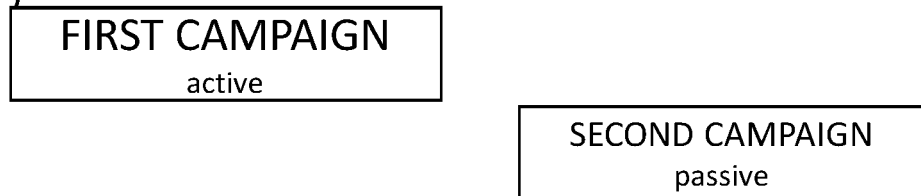
*Example 2:*
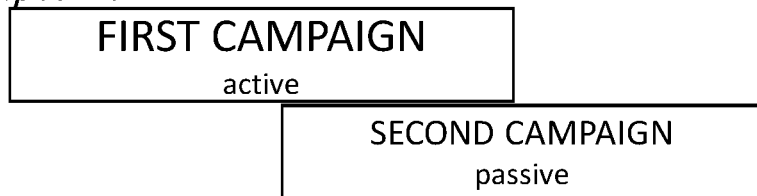
*Example 3:*
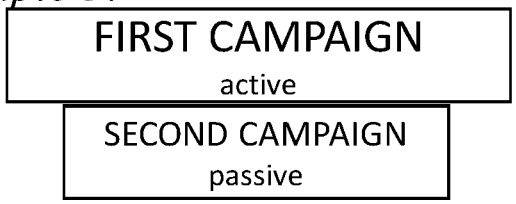
*Example 4:*
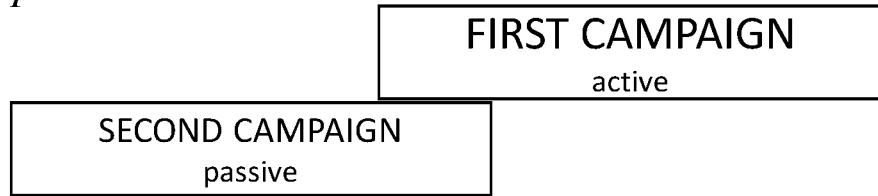
FIG. 11

```
┌─────────────────────────────────────────────────────┐
│ starting the executing of the penetration testing  │
│ campaign by the penetration testing system         │
└─────────────────────────────────────────────────────┘
                          │
                          ▼
┌─────────────────────────────────────────────────────┐
│ determining, by the penetration testing system, a  │
│ first network node of the networked system to be   │
│ the next network node to attempt to compromise in  │
│ the penetration testing campaign                   │
└─────────────────────────────────────────────────────┘
                          │
                          ▼
┌─────────────────────────────────────────────────────┐
│ determining, by the penetration testing system, a  │
│ first vulnerability of network nodes to be used    │
│ for compromising the first network node            │
└─────────────────────────────────────────────────────┘
                          │
                          ▼
┌─────────────────────────────────────────────────────┐
│ selecting, by the penetration testing system, a    │
│ first validation method for validating the first   │
│ vulnerability for the first network node, the      │
│ first validation method being selected from a      │
│ group comprising active validation and passive     │
│ validation                                         │
└─────────────────────────────────────────────────────┘
                          │
                          ▼
```

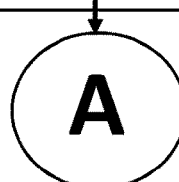

FIG. 13A starting the executing of the penetration testing campaign by the penetration testing system determining, by the penetration testing system, a first network node of the networked system to be the next network node to attempt to compromise in the penetration testing campaign determining, by the penetration testing system, a first vulnerability of network nodes to be used for compromising the first network node

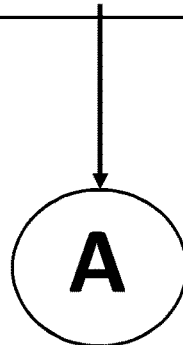

FIG. 14A

```
┌─────────────────────────────────────────────────┐
│ starting the executing of the first penetration │
│ testing campaign by the penetration testing     │
│ system                                          │
└─────────────────────────────────────────────────┘
                        │
                        ▼
┌─────────────────────────────────────────────────┐
│ determining, by the penetration testing system, │
│ a first network node of the networked system to │
│ be the next network node to attempt to          │
│ compromise in the first penetration testing     │
│ campaign                                        │
└─────────────────────────────────────────────────┘
                        │
                        ▼
┌─────────────────────────────────────────────────┐
│ determining, by the penetration testing system, │
│ a first vulnerability of network nodes to be    │
│ used for compromising the first network node    │
└─────────────────────────────────────────────────┘
                        │
                        ▼
┌─────────────────────────────────────────────────┐
│ selecting, by the penetration testing system, a │
│ first validation method for validating the      │
│ first vulnerability for the first network node, │
│ the first validation method being selected from │
│ a group comprising active validation and        │
│ passive validation                              │
└─────────────────────────────────────────────────┘
```

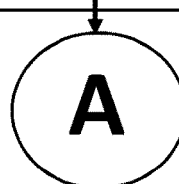

SELECTIVELY CHOOSING BETWEEN ACTUAL-ATTACK AND SIMULATION/EVALUATION FOR VALIDATING A VULNERABILITY OF A NETWORK NODE DURING EXECUTION OF A PENETRATION TESTING CAMPAIGN

CROSS-REFERENCE TO RELATED APPLICATIONS

This patent application is a continuation of U.S. Ser. No. 16/566,969 filed Sep. 11, 2019 which is incorporated herein by reference in its entirety. U.S. Ser. No. 16/566,969 is a continuation of U.S. Ser. No. 16/400,938 filed on May 1, 2019 which is incorporated herein by reference in its entirety. U.S. Ser. No. 16/400,938 is a continuation of U.S. Ser. No. 16/186,557 filed on Nov. 11, 2018 which is incorporated herein by reference in its entirety. This patent application is a continuation of PCT/IB2018/058849 filed on Nov. 11, 2018 which is incorporated herein by reference in its entirety. PCT/IB2018/058849 and U.S. Ser. No. 16/186,557 each claim the benefit of U.S. Provisional Patent Application No. 62/586,600 filed on Nov. 15, 2017, which is incorporated herein by reference in its entirety.

BACKGROUND

There is currently a proliferation of organizational networked computing systems. Every type of organization, be it a commercial company, a university, a bank, a government agency or a hospital, heavily relies on one or more networks interconnecting multiple computing nodes. Failures of the networked computing system of an organization or even of only a portion of it might cause significant damage, up to completely shutting down all operations. Additionally, all data of the organization exists somewhere on its networked computing system, including all confidential data comprising its "crown jewels" such as prices, details of customers, purchase orders, employees' salaries, technical formulas, etc. Loss of such data or leaks of such data to outside unauthorized entities might be disastrous for the organization. As almost all organizational networks are connected to the Internet at least through one computing node, they are subject to attacks by computer hackers or by hostile adversaries. Quite often the newspapers are reporting incidents in which websites crashed, sensitive data was stolen or service to customers was denied, where the failures were the results of hostile penetration into an organization's networked computing system. As a result, many organizations invest a lot of efforts and costs in preventive means designed to protect their computing networks against potential threats. There are many defensive products offered in the market claiming to provide protection against one or more known modes of attack, and many organizations arm themselves to the teeth with multiple products of this kind.

However, it is difficult to tell how effective such products really are in achieving their stated goals of blocking hostile attacks, and consequently most CISO's (Computer Information Security Officers) will admit (maybe only off the record), that they don't really know how well they can withstand an attack from a given adversary. The only way to really know how strong and secure a system is, is by trying to attack it as a real adversary would. This is known as red-teaming or penetration testing (pen testing, in short), and is a very common approach that is even required by regulation in some developed countries.

Penetration testing requires highly talented people to man the red team. Those people should be familiar with each and every publicly known vulnerability and attacking method and should also have a very good familiarity with networking techniques and multiple operating systems implementations. Such people are hard to find and therefore many organizations give up establishing their own red teams and resort to hiring external expert consultants for carrying out that role (or completely give up penetration testing). But external consultants are expensive and therefore are typically called in only for brief periods separated by long intervals in which no such testing is done. This makes the penetration testing ineffective as vulnerabilities caused by new attacks that appear almost daily are discovered only months after becoming serious threats to the organization.

Additionally, even rich organizations that can afford hiring talented experts as in-house red teams do not achieve good protection. Testing for vulnerabilities of a large network containing many types of computers, operating systems, network routers and other devices is both a very complex and a very tedious process. The process is prone to human errors of missing testing for certain threats or misinterpreting the damages of certain attacks. Also, because a manual process of full testing against all threats is quite long, the organization might again end with a too long discovery period after a new threat appears.

Because of the above difficulties several vendors are proposing automated penetration testing systems. Such systems automatically discover and report vulnerabilities of a networked system, potential damages that might be caused to the networked system, and potential trajectories of attack that may be employed by an attacker.

A Discussion of FIGS. 1A-1B, 2

A penetration testing process involves at least the following main functions: (i) a reconnaissance function, (ii) an attack function, and (ii) a reporting function. The process may also include additional functions, for example a cleanup function that restores the tested networked system to its original state as it was before the test. In an automated penetration testing system, at least one of the above three functions is at least partially automated, and typically two or three of them are at least partially automated.

A reconnaissance function is the function within a penetration testing system that handles the collection of data about the tested networked system. The collected data may include internal data of networks nodes, data about network traffic within the tested networked system, business intelligence data of the organization owning the tested networked system, etc. The functionality of a prior art reconnaissance function can be implemented, for example, by software executing in a server that is not one of the network nodes of the tested networked system, where the server probes the tested networked system for the purpose of collecting data about it.

An attack function is the function within a penetration testing system that handles the determination of whether security vulnerabilities exist in the tested networked system based on data collected by the reconnaissance function. The functionality of a prior art attack function can be implemented, for example, by software executing in a server that is not one of the nodes of the tested networked system, where the server attempts to attack the tested networked system for the purpose of verifying that it can be compromised.

A reporting function is the function within a penetration testing system that handles the reporting of results of the penetration testing system. The functionality of a prior art reporting function may be implemented, for example, by software executing in the same server that executes the functionality of the attack function, where the server reports the findings of the attack function to an administrator or a CISO of the tested networked system.

FIG. 1A (PRIOR ART) is a block diagram of code modules of a typical penetration testing system. FIG. 1B (PRIOR ART) is a related flow-chart.

In FIG. 1A, code for the reconnaissance function, for the attack function, and for the reporting function are respectively labelled as 20, 30 and 40, and are each schematically illustrated as part of a penetration testing system code module (PTSCM) labelled as 10. The term 'code' is intended broadly and may include any combination of computer-executable code and computer-readable data which when read affects the output of execution of the code. The computer-executable code may be provided as any combination of human-readable code (e.g. in a scripting language such as Python), machine language code, assembler code and byte code, or in any form known in the art. Furthermore, the executable code may include any stored data (e.g. structured data) such as configuration files, XML files, and data residing in any type of database (e.g. a relational database, an object-database, etc.).

In one example and as shown in FIG. 1B, the reconnaissance function (performed in step S21 by execution of reconnaissance function code 20), the attack function (performed in step S31 by execution of attack function code 30) and the reporting function (performed in step S41 by execution of reporting function code 40) are executed in strictly sequential order so that first the reconnaissance function is performed by executing code 20 thereof, then the attack function is performed by executing code 30 thereof, and finally the reporting function is performed 40 by executing code thereof. However, the skilled artisan will appreciate that this order is just one example, and is not a requirement. For example, the attack and the reporting functions may be performed in parallel or in an interleaved way, with the reporting function reporting first results obtained by the attack function, while the attack function is working on additional results. Similarly, the reconnaissance and the attack functions may operate in parallel or in an interleaved way, with the attack function detecting a vulnerability based on first data collected by the reconnaissance function, while the reconnaissance function is working on collecting additional data.

FIG. 1A also illustrates code of an optional cleanup function which is labeled as 50. Also illustrated in FIG. 1B is step S51 of performing a cleanup function—e.g. by executing cleanup function code 50 of FIG. 1A.

"A campaign of penetration testing" is a specific run of a specific test of a specific networked system by the penetration testing system.

A penetration-testing-campaign module may comprise at least part of reconnaissance function code 20, attack function code 30, reporting function 40 and optionally cleanup function code 50—for example, in combination with suitable hardware (e.g. one or more computing device 110 and one or more processor(s) 120 thereof) for executing the code.

FIG. 2 illustrates a prior art computing device 110 which may have any form-factor including but not limited to a laptop, a desktop, a mobile phone, a server, a tablet, or any other form factor. The computing device 110 in FIG. 2 includes (i) computer memory 160 which may store code 180; (ii) one or more processors 120 (e.g. central-processing-unit (CPU)) for executing code 180; and (iii) a network interface 150 (e.g. a network card, or a wireless modem).

Memory 160 may include any combination of volatile (e.g. RAM) and non-volatile (e.g. ROM, flash, disk-drive) memory.

Code 180 may include operating-system code—e.g. Windows®, Linux®, Android®, Mac-OS® or any other code.

In one example, a penetration testing system is the combination of (i) code 10 (e.g. including reconnaissance function code 20, attack function code 30, reporting function code 40, and optionally cleanup function code 50); and (ii) one or more computing devices 110 which execute the code 10. For example, a first computing device may execute a first portion of code 10 and a second computing device (e.g. in networked communication with the first computing device) may execute a second portion of code 10.

A Discussion of Types of Penetration Testing Systems

Some prior art penetration testing systems can be characterized as doing an "actual attack penetration testing", while other prior art penetration testing systems can be characterized as doing a "simulated penetration testing".

A prior art actual attack penetration testing system does its penetration testing by accessing and attempting to attack the tested networked system. Such a system actually accesses the tested networked system during the test and is not limiting itself to simulation. This may include (i) collecting data by the reconnaissance function about the tested networked system and its components by actively probing it. The probing is done by sending queries or other messages to one or more network nodes of the tested networked system, and then deducing information about the tested networked system from the received responses or from network traffic triggered by the queries or the messages. The reconnaissance function is fully implemented by software executing outside the tested networked system and/or by software executing in one or more network nodes of the tested networked system that analyze network traffic and network packets of the tested networked system, and (ii) verifying that the tested networked system can be compromised by actively attempting to compromise it and checking if it was indeed compromised. This implies that a side-effect of executing an actual attack penetration test might be actually compromising the tested networked system. Typically, prior art actual attack penetration testing systems include a function of cleanup and recovery at the end of the test, in which any compromising operation that was done during the test is undone. A prior art simulated penetration testing system does its penetration testing by avoiding disturbance to the tested networked system and specifically by avoiding any risk of compromising it. This implies, among other things, that whenever there is a need to verify that the tested networked system can be compromised by an operation or a sequence of operations, the verification is done by simulating the results of that operation or sequence of operations or by otherwise evaluating them, without taking the risk of actually compromising the tested networked system. Some prior art simulated penetration testing systems implement the simulation by duplicating all or parts of the hardware of the tested networked system. Then when there is a need for verifying that an operation or a sequence of operations compromises the tested networked system, this is done by actually attacking the duplicated system without risking the tested system. While this implementation achieves the goal of avoiding the risk of not compromising the tested networked system, it is highly expensive and also difficult to accurately implement, and therefore rarely used.

In this disclosure, the phrase 'active method of validation' (or the equivalent 'active method') is used in connection with validation methods using actual attack. Similarly, the phrase 'passive method of validation' (or the equivalent 'passive method') is used in connection with validation methods using simulation or other type of evaluation.

U.S. Pat. No. 10,038,711 discloses penetration testing systems that employ reconnaissance agent penetration testing. Such penetration testing systems are characterized by using a reconnaissance agent software module installed on some network nodes of the tested networked system, where the instances of the reconnaissance agent take part in implementing the reconnaissance function. With regard to verifying that the tested networked system can be compromised by an operation or a sequence of operations, reconnaissance agent penetration testing systems may use either actual attack methods (active validation) or simulation/evaluation methods (passive validation).

This section is provided to reveal information believed by the applicant to be of possible relevance. No admission is necessarily intended, nor should be construed, that any of the information anywhere in this background section (in particular, that U.S. Pat. No. 10,038,711) constitutes prior art against the present invention.

The Problem to Solve

Every penetration testing system operates by iteratively compromising (physically or by simulation/evaluation) network nodes of the tested networked system. At any iteration during the testing process some of the nodes of the tested networked system are considered to be already compromised by the potential attacker, and the penetration testing system is attempting to compromise one or more additional network nodes (not yet compromised) by utilizing the already-compromised nodes that are operating under the control of the attacker's instructions. Once an additional network node is found to be compromisable, it is added to the group of already-compromised nodes and a new iteration begins.

Thus, a penetration testing system has a frequent need to identify a vulnerability that would compromise a given network node. This identification is typically achieved by using a pre-compiled knowledge base about known vulnerabilities, that depends on characteristics of the given network node. For example, the penetration testing system may have in its knowledge base a rule saying that a network node running the Windows 7 Operating System might be compromised by sending it a specific network message through a specific Internet port.

However, knowing that a node might be compromised is not the same as knowing for sure it would be compromised by the examined vulnerability under current conditions. For example, the target node may have installed on it a patch provided by Microsoft for making the Windows 7 Operating System immune to that vulnerability. Or the administrator of the target node may have disabled the service that is typically using the specific Internet port and therefore the node is currently not listening to that specific Internet port and is thus currently not vulnerable to anything sent to it through that specific Internet port.

Therefore, it is clear that without detailed knowledge about what is going on inside the target node it is not always possible to know for sure whether a given potential vulnerability would compromise a given network node under current conditions. This is a major issue for penetration testing systems, that need to know for sure that a given node could be compromised before reporting a penetration vulnerability. As a result, when a penetration testing system determines that a given vulnerability might compromise a given network node, it has to find a way of validating that this is indeed so under current conditions.

As explained above, the common solutions adopted by prior art penetration testing systems are:

a. Validating by actual attack—testing whether the given vulnerability succeeds in compromising the given node by actually attempting to compromise the node by exploiting the vulnerability, and then finding out if the attempt was successful and the node was indeed compromised.

b. Validating by simulation or by other evaluation—testing whether the given vulnerability succeeds in compromising the given node by either simulating the tested networked system and attempting to compromise it by exploiting the vulnerability in the simulation, or by evaluating the success/failure of exploiting the vulnerability by using pre-compiled knowledge about the vulnerability plus data about current conditions in the network node. In both cases the validation is done without actually attempting to compromise the tested networked system and thus without risking an actual compromising of the network node.

Each of the above approaches has its drawbacks. The actual attack method has the severe drawback of risking actually compromising the tested networked system. Even though penetration testing systems employing this method attempt to undo any compromising operations they performed during the test, it is difficult to guarantee that full recovery will always be achieved. The simulation/evaluation method has the drawback of sometimes lacking knowledge of data that is essential for reaching a correct result. If the condition for successful compromising depends on data that is internal to the target node (for example the version of the firmware of a storage device internal to the node), then the method cannot reliably validate the success of the compromising by the vulnerability unless special arrangements are done in order to obtain the required information during the execution of the penetration testing campaign.

Prior art penetration testing systems are quite rigid regarding the validation approach they employ—a given penetration testing system either employs validation by actual attack or validation by simulation/evaluation. This implies:

a. For a given penetration testing campaign, there is no way of employing validation by actual attack for some potential vulnerabilities and validation by simulation/evaluation for other potential vulnerabilities.

b. For a given scenario template, there is no way of employing validation by actual attack for execution of some campaigns that are based on the scenario template and employing validation by simulation/evaluation for execution of other campaigns that are also based on the scenario template.

c. For a given tested networked system, there is no way of employing validation by actual attack for execution of some penetration testing campaigns and employing validation by simulation/evaluation for execution of other penetration testing campaigns, even when different campaigns are based on different scenario templates.

But in many situations a user of a penetration testing system may want to have more flexibility. For example:

a. A user may want to execute a penetration testing campaign in which some potential vulnerabilities are validated by actual attack, while other potential vulnerabilities are validated by simulation or evaluation.

As an example, the user may prefer to use validation by actual attack for most vulnerabilities because it provides better reliability for the validation conclusions, but for some specific vulnerabilities would like to use validation by simulation/evaluation because the damage to the tested networked system in case an actual attack exploiting any of these specific vulnerabilities turns out to be successful (e.g. a shutdown of the network node) is unacceptable and therefore cannot be risked.

As another example, the user may prefer to use validation by simulation/evaluation for most vulnerabilities because it is important not to risk compromising the tested networked system, but for some specific vulnerabilities would like to use validation by actual attack because the importance of the resources put at risk by these specific vulnerabilities (e.g. password files) is so high that the most reliable validation conclusions are desired, even at the cost of risking the compromising of the tested networked system during the test (e.g. by exporting a password file to the penetration testing system, which may be under the control of the organization owning the tested networked system, and thus causing no real damage when being compromised during the penetration test).

b. A user may want to execute multiple penetration testing campaigns where all campaigns are based on the same scenario template, when some of the campaigns employ validation by actual attack, while other campaigns employ validation by simulation/evaluation.

As an example, the user may prefer to use validation by actual attack for most of the campaigns because this provides better reliability for the validation conclusions, but for some specific campaigns would like to use validation by simulation/evaluation because at the time of those specific runs a flawless operation of the tested networked system is critical and no risk of the system being compromised can be taken.

As another example, the user may prefer to use validation by simulation/evaluation for most of the campaigns because it is important not to risk compromising the tested networked system, but for some specific campaigns would like to use validation by actual attack because it is desired to get the most reliable validation conclusions once in a while, even at the cost of risking the compromising of the tested networked system.

c. A user may want to execute some penetration testing campaigns while employing validation by actual attack, and to execute some other penetration testing campaigns while employing validation by simulation/evaluation (where different campaigns are based on different scenario templates).

As an example, for some campaigns which are set with the goal of the attacker being exporting certain files out of the tested networked system, the user may accept the risk of compromising the networked system and wish to employ validation by actual attack, as the damage at risk is not critical (at least when the penetration testing system, which is the receiver of the exported files, is under control of the organization owning the tested networked system). For other campaigns which are set up with the goal of the attacker being damaging of certain files, the user may not agree to accept the risk and therefore wishes to employ validation by simulation/evaluation.

There is thus a need for providing users of penetration testing systems with greater flexibility in controlling the method of validation of potential vulnerabilities employed during the penetration testing process.

SUMMARY OF EMBODIMENTS

A method for penetration testing of a networked system by a penetration testing system, using both active and passive validation methods during a single penetration testing campaign, is disclosed herein. The presently-disclosed method comprises: a. determining a first target network node of the networked system to be the next network node to attempt to compromise during the single penetration testing campaign; b. determining a first vulnerability of network nodes to be used for compromising the first target network node; c. selecting a first validation method for validating the first vulnerability for the first target network node, a type of the first validation method being selected from the type group consisting of active validation and passive validation; d. validating the first vulnerability for the first target network node using the first validation method; e. determining a second target network node of the networked system to be the next network node to attempt to compromise during the single penetration testing campaign; f. determining a second vulnerability of network nodes to be used for compromising the second target network node; g. selecting a second validation method for validating the second vulnerability for the second target network node, a type of the second validation method being selected from the type group consisting of active validation and passive validation and being different from the type of the first validation method; h. validating the second vulnerability for the second target network node using the second validation method; and i. reporting at least one security vulnerability of the networked system determined to exist based on results of the executing of the single penetration testing campaign, wherein the reporting comprises performing at least one operation selected from the group consisting of: (A) causing a display device to display a report containing information about the at least one security vulnerability of the networked system, (B) storing the report containing information about the at least one security vulnerability of the networked system in a file and (C) electronically transmitting the report containing information about the at least one security vulnerability of the networked system, wherein all of steps a-i are performed by the penetration testing system, and all of steps a-h are performed during the single penetration testing campaign.

In some embodiments, the first and second validation methods are respectively selected in accordance with the first and second vulnerabilities.

In some embodiments, i. the selecting of the first validation method comprises: A. determining a first damage to the first target network node that can be caused by validating the first vulnerability for the first target network node by using active validation; and B. selecting the type of the first validation method to be a type of a validation method that is associated with the first damage; and ii. the selecting of the second validation method comprises: A. determining a second damage to the second target network node that can be caused by validating the second vulnerability for the second target network node by using active validation; and B. selecting the type of the second validation method to be a type of a validation method that is associated with the second damage. In some such embodiments, the determining of the first damage includes determining an extent of the first damage. Also, in some such embodiments, the determining of the first damage includes determining a likelihood of the first damage occurring.

In some embodiments, the selecting of the type of the first and second validation methods are performed such that the identity of the first vulnerability uniquely determines the type of the first validation method, and the identity of the second vulnerability uniquely determines the type of the second validation method.

In some embodiments, steps a-i are performed in the order listed.

In some embodiments, the penetration testing system is controlled by a user interface of a computing device, and the method for penetration testing of the networked system further comprises: j. receiving, by the penetration testing system and via the user interface of the computing device, one or more manually-entered inputs, the one or more manually-entered inputs explicitly defining at least one item selected from the group consisting of (i) a type of a validation method to be used for validating the first vulnerability, and (ii) a type of a validation method to be used for validating the second vulnerability.

A penetration testing system for executing penetration testing of a networked system using both active and passive validation methods during a single penetration testing campaign is disclosed herein. The presently disclosed penetration testing system comprises: a. a remote computing device comprising a computer memory and one or more processors, the remote computing device in networked communication with multiple network nodes of the networked system; b. a non-transitory computer-readable storage medium containing program instructions, wherein execution of the program instructions by the one or more processors of the remote computing device performs all of the following during the single penetration testing campaign: i. determine a first target network node of the networked system to be the next network node to attempt to compromise during the single penetration testing campaign; ii. determine a first vulnerability of network nodes to be used for compromising the first target network node; iii. select a first validation method for validating the first vulnerability for the first target network node, a type of the first validation method being selected from the type group consisting of active validation and passive validation; iv. cause a validation of the first vulnerability for the first target network node using the first validation method; v. determine a second target network node of the networked system to be the next network node to attempt to compromise during the single penetration testing campaign; vi. determine a second vulnerability of network nodes to be used for compromising the second target network node;

vii. select a second validation method for validating the second vulnerability for the second target network node, a type of the second validation method being selected from the type group consisting of active validation and passive validation and being different from the type of the first validation method; and viii. cause a validation of the second vulnerability for the second target network node using the second validation method; wherein the execution of the program instructions by the one or more processors of the remote computing device further performs: report at least one security vulnerability of the networked system determined to exist based on results of executing the single penetration testing campaign, wherein the reporting comprises performing at least one operation selected from the group consisting of: (A) causing a display device to display a report containing information about the at least one security vulnerability of the networked system, (B) storing the report containing information about the at least one security vulnerability of the networked system in a file and (C) electronically transmitting the report containing information about the at least one security vulnerability of the networked system.

A method for penetration testing of a networked system by a penetration testing system using both active and passive validation methods is disclosed herein. The presently disclosed method for penetration testing comprises: a. determining a first target network node of the networked system to be the next network node to attempt to compromise; b. determining a first vulnerability of network nodes to be used for compromising the first target network node; c. determining a first damage to the first target network node that can be caused by validating the first vulnerability for the first target network node by using active validation; d. selecting a first validation method for validating the first vulnerability for the first target network node, a type of the first validation method being: A. selected from the type group consisting of active validation and passive validation; and B. associated with the first damage; e. validating the first vulnerability for the first target network node using the first validation method; f. determining a second target network node of the networked system to be the next network node to attempt to compromise; g. determining a second vulnerability of network nodes to be used for compromising the second target network node; h. determining a second damage to the second target network node that can be caused by validating the second vulnerability for the second target network node by using active validation; i. selecting a second validation method for validating the second vulnerability for the second target network node, a type of the second validation method being: A. selected from the type group consisting of active validation and passive validation; B. associated with the second damage; and C. different from the type of the first validation method; j. validating the second vulnerability for the second target network node using the second validation method; and k. reporting at least one security vulnerability of the networked system determined to exist based on results of performing steps a-j, wherein the reporting comprises performing at least one operation selected from the group consisting of: (A) causing a display device to display a report containing information about the at least one security vulnerability of the networked system, (B) storing the report containing information about the at least one security vulnerability of the networked system in a file and (C) electronically transmitting the report containing information about the at least one security vulnerability of the networked system, wherein all of steps a-k are performed by the penetration testing system.

In some embodiments, all of steps a-j are performed during a single penetration testing campaign that is carried out by the penetration testing system.

In some embodiments, the determining of the first damage includes determining an extent of the first damage.

In some embodiments, the determining of the first damage includes determining a likelihood of the first damage occurring.

In some embodiments, steps a-k are performed in the order listed.

In some embodiments, the penetration testing system is controlled by a user interface of a computing device, and the method for penetration testing of the networked system further comprises: j. receiving, by the penetration testing system and via the user interface of the computing device, one or more manually-entered inputs, the one or more manually-entered inputs explicitly defining at least one item selected from the group consisting of (i) a type of a validation method associated with the first damage, and (ii) a type of a validation method associated with the second damage.

A penetration testing system for executing penetration testing of a networked system using both active and passive validation methods is disclosed herein. The presently disclosed penetration testing system comprises: a. a remote computing device comprising a computer memory and one or more processors, the remote computing device in networked communication with multiple network nodes of the networked system; b. a non-transitory computer-readable storage medium containing program instructions, wherein execution of the program instructions by the one or more processors of the remote computing device performs all of the following: i. determine a first target network node of the networked system to be the next network node to attempt to compromise; ii. determine a first vulnerability of network nodes to be used for compromising the first target network node; iii. determine a first damage to the first target network node that can be caused by validating the first vulnerability for the first target network node by using active validation; iv. select a first validation method for validating the first vulnerability for the first target network node, a type of the first validation method being: A. selected from the type group consisting of active validation and passive validation; and B. associated with the first damage; v. cause a validation of the first vulnerability for the first target network node using the first validation method; vi. determine a second target network node of the networked system to be the next network node to attempt to compromise; vii. determine a second vulnerability of network nodes to be used for compromising the second target network node; viii. determine a second damage to the second target network node that can be caused by validating the second vulnerability for the second target network node by using active validation; ix. select a second validation method for validating the second vulnerability for the second target network node, a type of the second validation method being: A. selected from the type group consisting of active validation and passive validation; B. associated with the second damage; and C. different from the type of the first validation method; x. cause a validation of the second vulnerability for the second target network node using the second validation method; and xi. report at least one security vulnerability of the networked system determined to exist based on results of performing operations b(i)-b(x), wherein the reporting comprises performing at least one operation selected from the group consisting of: (A) causing a display device to display a report containing information about the at least one security vulnerability of the networked system, (B) storing the report containing information about the at least one security vulnerability of the networked system in a file and (C) electronically transmitting the report containing information about the at least one security vulnerability of the networked system.

A method is disclosed herein for subjecting a single networked system to first and second penetration testing campaigns such that (i) both penetration testing campaigns are performed by a single penetration testing system; (ii) the first penetration testing campaign employs only active validation for validating vulnerabilities of network nodes of the single networked system; and (iii) the second penetration testing campaign employs only passive validation for validating vulnerabilities of network nodes of the single networked system. The presently disclosed method comprises: a. executing the first penetration testing campaign by the single penetration testing system, the executing of the first penetration testing campaign comprising performing one or more validation operations for validating vulnerabilities for network nodes of the single networked system, wherein the methods of validation used for all validation operations included in the first penetration testing campaign are active validation methods; b. executing the second penetration testing campaign by the single penetration testing system, the executing of the second penetration testing campaign comprising performing one or more validation operations for validating vulnerabilities for network nodes of the single networked system, wherein the methods of validation used for all validation operations included in the second penetration testing campaign are passive validation methods, and c. reporting, by the single penetration testing system, at least one security vulnerability of the single networked system determined to exist based on at least one member selected from the group consisting of (1) results of the executing of the first penetration testing campaign, and (2) results of the executing of the second penetration testing campaign, wherein the reporting comprises performing at least one operation selected from the group consisting of (i) causing a display device to display a report containing information about the at least one security vulnerability of the single networked system, (ii) storing the report containing information about the at least one security vulnerability of the single networked system in a file, and (iii) electronically transmitting the report containing information about the at least one security vulnerability of the single networked system.

In some embodiments, the second penetration testing campaign commences after the first penetration testing campaign has concluded.

In some embodiments, the first penetration testing campaign commences after the second penetration testing campaign has concluded.

In some embodiments, the second penetration testing campaign commences after the first penetration testing campaign has commenced but before the first penetration testing campaign has concluded.

In some embodiments, the first and second penetration testing campaigns are performed at least partially simultaneously.

In some embodiments, the first penetration testing campaign is based on a first scenario template, the second penetration testing campaign is based on a second scenario template, and the second scenario template is different from the first scenario template.

In some such embodiments, the identity of the first scenario template uniquely determines the use of active validation for all validation operations included in the first penetration testing campaign, and the identity of the second scenario template uniquely determines the use of passive validation for all validation operations included in the second penetration testing campaign.

Also in some such embodiments, the penetration testing system is controlled by a user interface of a computing device, and the method for executing the penetration testing campaigns further comprises: receiving, by the penetration testing system and via the user interface of the computing device, one or more manually-entered inputs, the one or more manually-entered inputs explicitly defining at least one of (i) a type of a validation method to be used for validating all vulnerabilities in the first penetration testing campaign that is based on the first scenario template, and (ii) a type of a validation method to be used for validating all vulnerabilities in the second penetration testing campaign that is based on the second scenario template.

In some other such embodiments, the penetration testing system is controlled by a user interface of a computing device, and the method for executing the penetration testing campaigns further comprises: receiving, by the penetration testing system and via the user interface of the computing device, one or more manually-entered inputs, the one or more manually-entered inputs explicitly defining at least one of (i) a type of a validation method to be used for validating vulnerabilities in all penetration testing campaigns that are based on the first scenario template, and (ii) a type of a validation method to be used for validating vulnerabilities in all penetration testing campaigns that are based on the second scenario template.

In some embodiments, the first penetration testing campaign and the second penetration testing campaign are both based on a common scenario template.

In some such embodiments, the penetration testing system is controlled by a user interface of a computing device, and the method for executing the penetration testing campaigns further comprises: receiving, by the penetration testing system and via the user interface of the computing device, one or more manually-entered inputs, the one or more manually-entered inputs explicitly defining at least one of (i) a type of a validation method to be used for validating all vulnerabilities in the first penetration testing campaign that is based on the common scenario template, and (ii) a type of a validation method to be used for validating all vulnerabilities in the second penetration testing campaign that is based on the common scenario template.

A penetration testing system is disclosed herein for subjecting a networked system to first and second penetration testing campaigns such that (i) both penetration testing campaigns are performed by the penetration testing system; (ii) the first penetration testing campaign employs only active validation for validating vulnerabilities of network nodes of the networked system; and (iii) the second penetration testing campaign employs only passive validation for validating vulnerabilities of network nodes of the networked system. The presently disclosed penetration testing system comprises: a. a remote computing device comprising a computer memory and one or more processors, the remote computing device in networked communication with multiple network nodes of the networked system; b. a non-transitory computer-readable storage medium containing program instructions, wherein execution of the program instructions by the one or more processors of the remote computing device performs all of the following during the first and second penetration testing campaigns: i. execute the first penetration testing campaign by the remote computing device, the executing of the first penetration testing campaign comprising causing one or more validation operations for validating vulnerabilities for network nodes of the networked system, wherein the methods of validation used for all validation operations included in the first penetration testing campaign are active validation methods; and ii. execute the second penetration testing campaign by the remote computing device, the executing of the second penetration testing campaign comprising causing one or more validation operations for validating vulnerabilities for network nodes of the networked system, wherein the methods of validation used for all validation operations included in the second penetration testing campaign are passive validation methods; wherein the execution of the program instructions by the one or more processors of the remote computing device further performs: report at least one security vulnerability of the networked system determined to exist based on at least one member selected from the group consisting of (1) results of the executing of the first penetration testing campaign, and (2) results of the executing of the second penetration testing campaign, wherein the reporting comprises performing at least one operation selected from the group consisting of (i) causing a display device to display a report containing information about the at least one security vulnerability of the networked system, (ii) storing the report containing information about the at least one security vulnerability of the networked system in a file, and (iii) electronically transmitting the report containing information about the at least one security vulnerability of the networked system.

BRIEF DESCRIPTION OF THE DRAWINGS

FIGS. 9 and 10 show flow-charts of different methods of penetration testing of a networked system according to embodiments of the invention.

FIG. 11 shows examples of the respective timing of first and second penetration testing campaigns according to the method of FIG. 10.

FIGS. 13A-C, 14A-D, and 15A-D are flow-charts of different methods of penetration testing of a networked system according to embodiments of the invention.

DETAILED DESCRIPTION OF EMBODIMENTS

This disclosure should be interpreted according to the definitions in the "Definitions Section" at the end of the specification. In case of a contradiction between the definitions in the "Definitions Section" at the end of the specification and other sections of this disclosure, the "Definitions Section" at the end of the specification section should prevail.

In case of a contradiction between the "Definitions Section" at the end of the specification and a definition or a description in any other document, including in another document incorporated in this disclosure by reference, the "Definitions Section" at the end of the specification should prevail, even if the definition or the description in the other document is commonly accepted by a person of ordinary skill in the art.

Discussion of FIGS. 3,4A-H

Figure 4A:
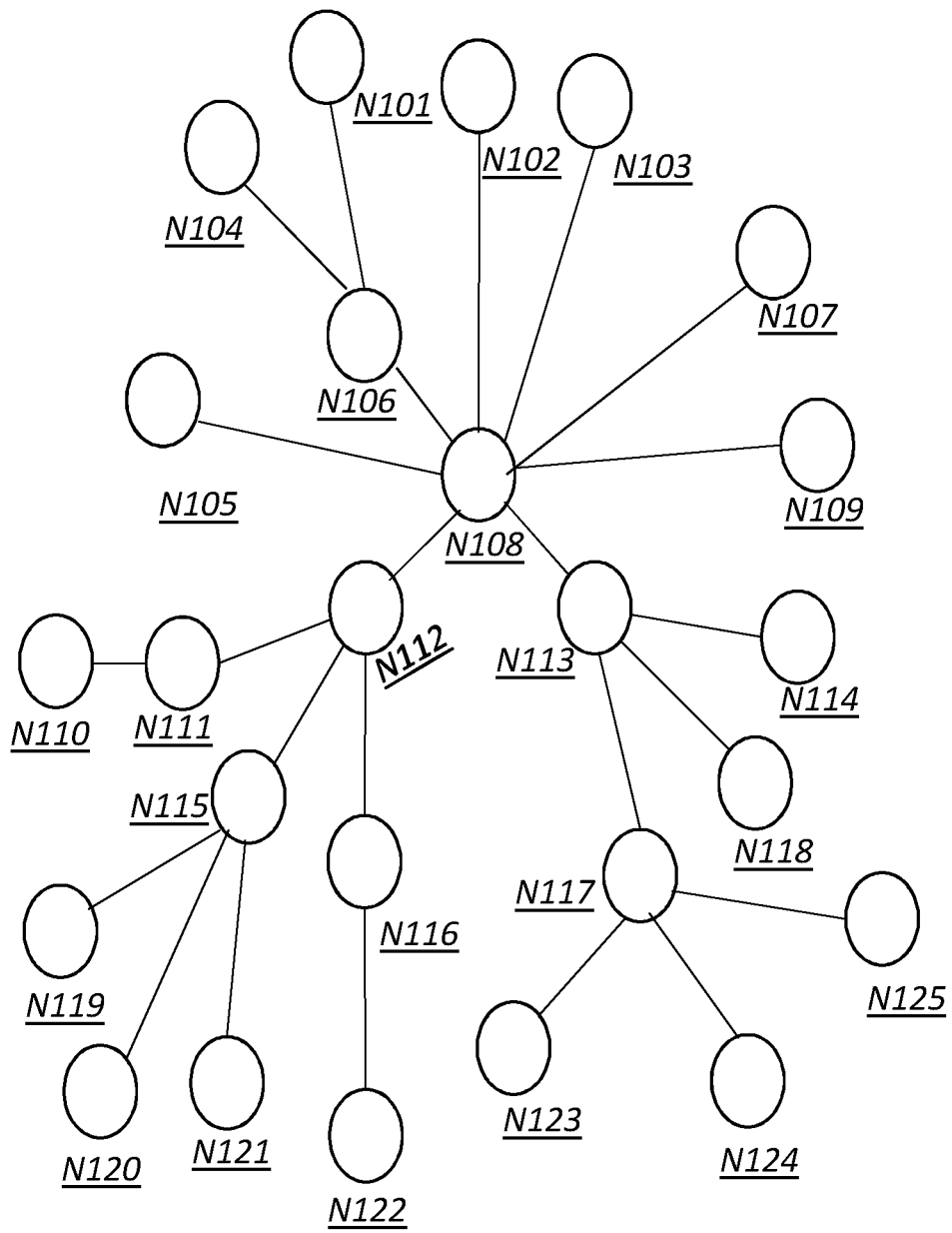
FIGS. 4A-4H illustrate examples where network-nodes are tested using passive and active methods of validation during a penetration testing campaign.

Embodiments of the invention relate to penetration testing of networked systems, such as networked system 200 illustrated in FIG. 4A.

Penetration testing systems test networked systems. For example, the networked system 200 comprises a plurality of network nodes (referred to simply as "nodes") in communication with each other—e.g. see FIG. 4A.

In prior art penetration testing systems, a penetration testing campaign performs or emulates an attack of a potential attacker, starting from an initial state in which no network node of the tested networked system is compromised. The attacker is assumed to start by compromising a first network node (e.g. node N122 of FIG. 4B), then to take advantage of the already-compromised first node and compromise a second network node, then to take advantage of the already-compromised first and second nodes and compromise a third network node, and so on.

Figure 3:
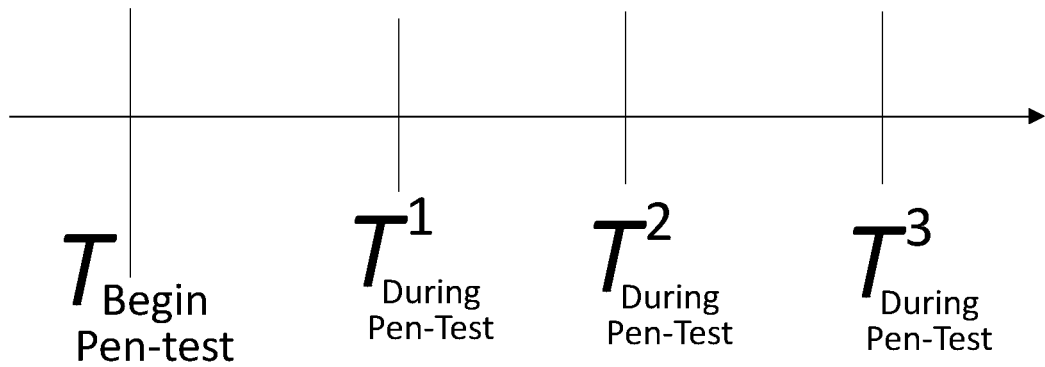
FIG. 3 illustrates a timeline related to the examples of FIGS. 4A-4H.

FIGS. 3 and 4A-4D relate to an example of penetration testing of a networked system. FIG. 3 shows a timeline—i.e. the penetration test begins at a time labelled as $T_{Begin\ Pen\text{-}Test}$. Subsequent points in time, during the penetration test, are labelled in FIG. 3 as $T^1_{During\ Pen\text{-}Test}$, $T^2_{During\ Pen\text{-}Test}$ and $T^3_{During\ Pen\text{-}Test}$.

FIG. 4A shows an example networked system 200 comprising a plurality of 25 network nodes labelled N101, N102 . . . N124. In the present document, a network node may be referred to simply as 'node'—'network node' and 'node' are interchangeable.

Figure 1A:
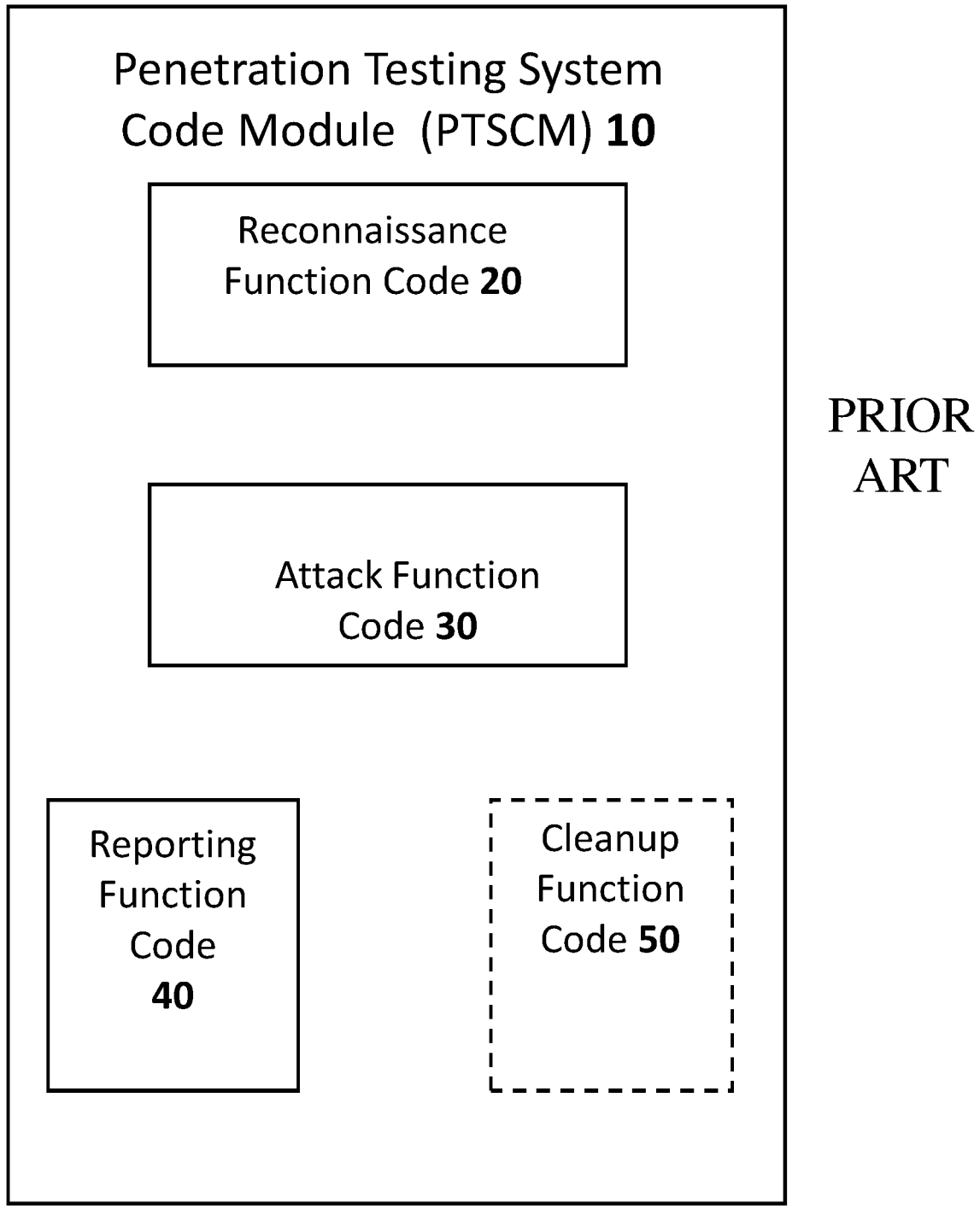
FIG. 1A (PRIOR ART) is a block diagram of code modules of a typical penetration testing system.
Figure 1B:
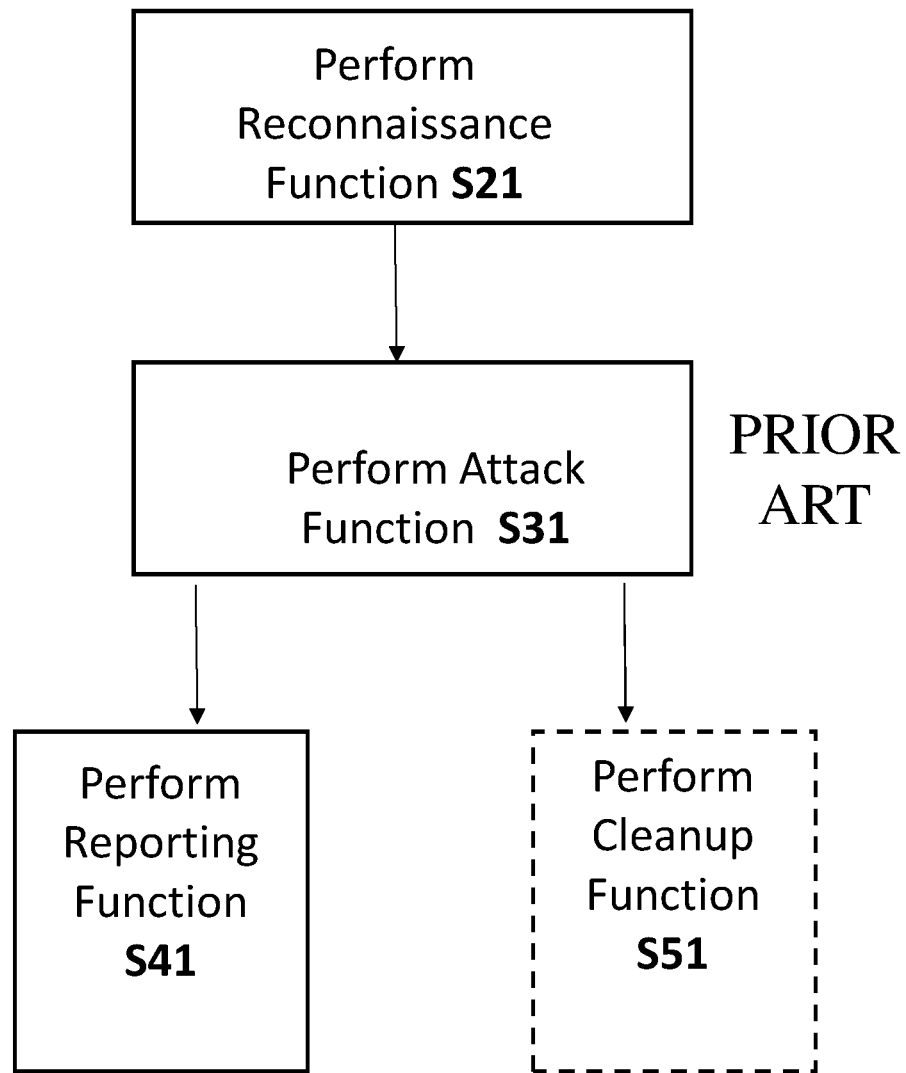
FIG. 1B (PRIOR ART) is a related flow-chart.
Figure 2:
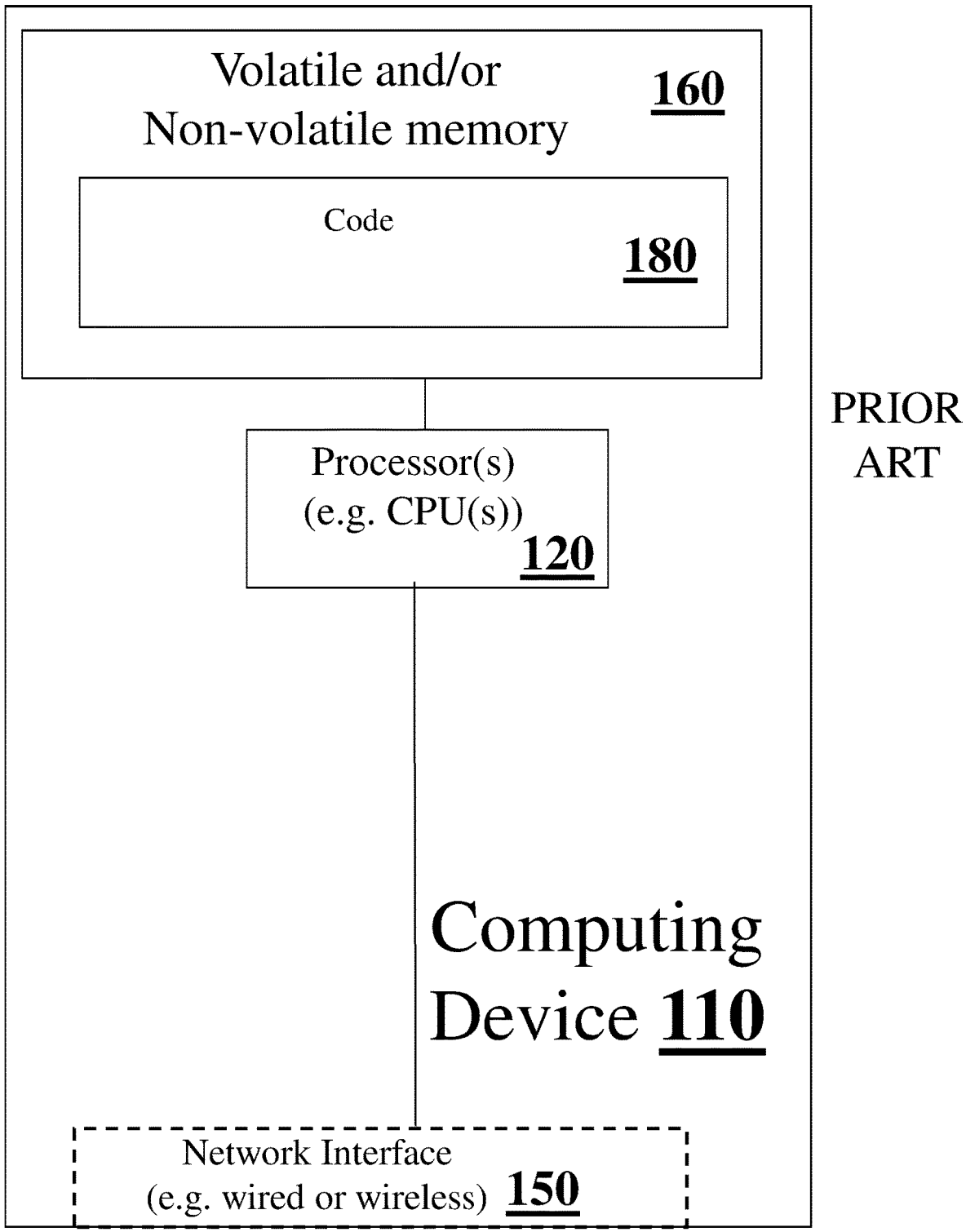
FIG. 2 (PRIOR ART) illustrates a prior art computing device.

Each network node may be a different computing device 110 (e.g., as shown in FIG. 2). Two network nodes are "immediate neighbors" of each other if and only if they have a direct communication link between them that does not pass through any other network node.

In FIG. 4A, initially—i.e. at time $T_{Begin\ Pen\text{-}Test}$ when the penetration test begins—none of the network-nodes have yet been targeted by the penetration testing system.

Figure 4B:
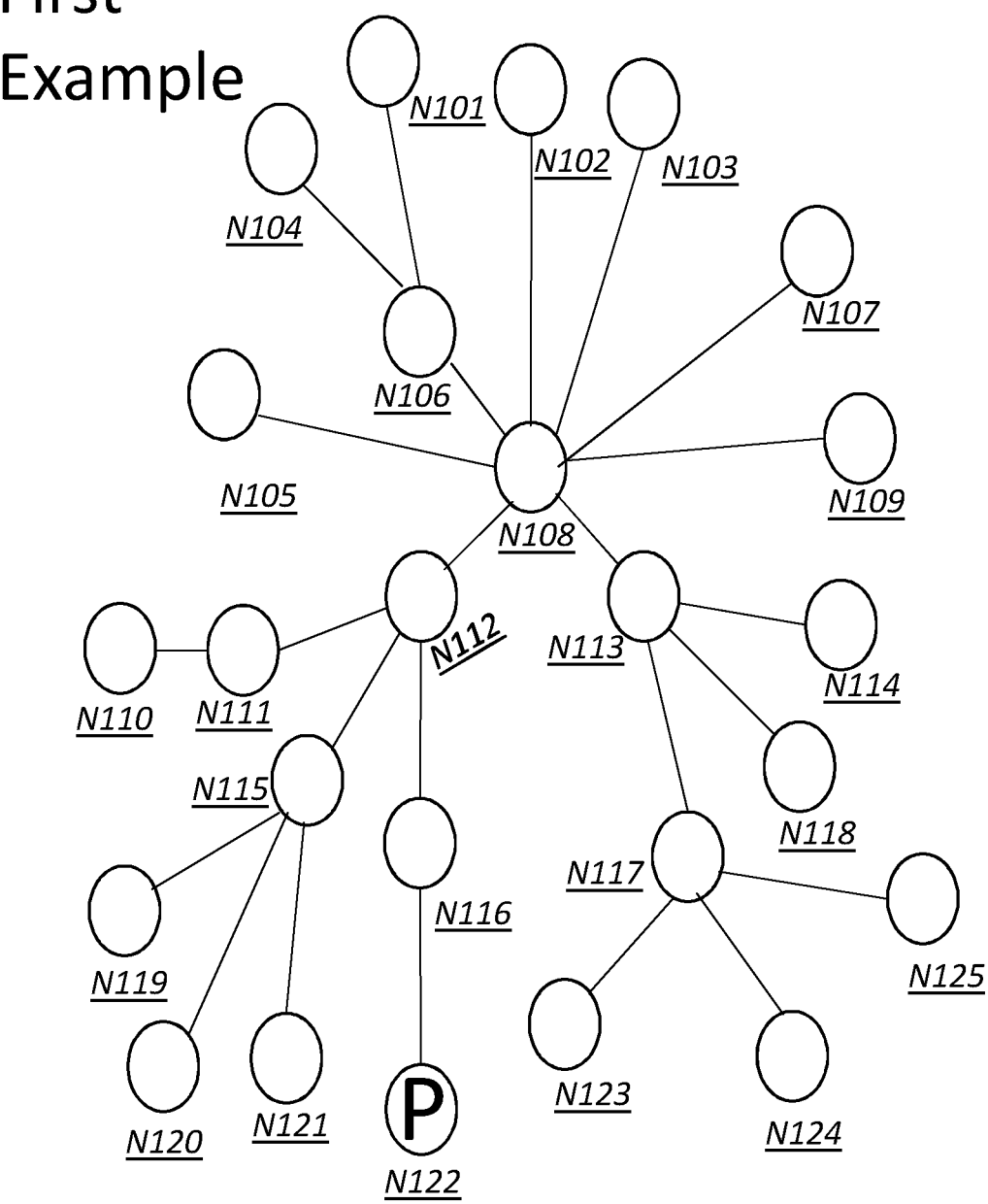
Figure 4C:
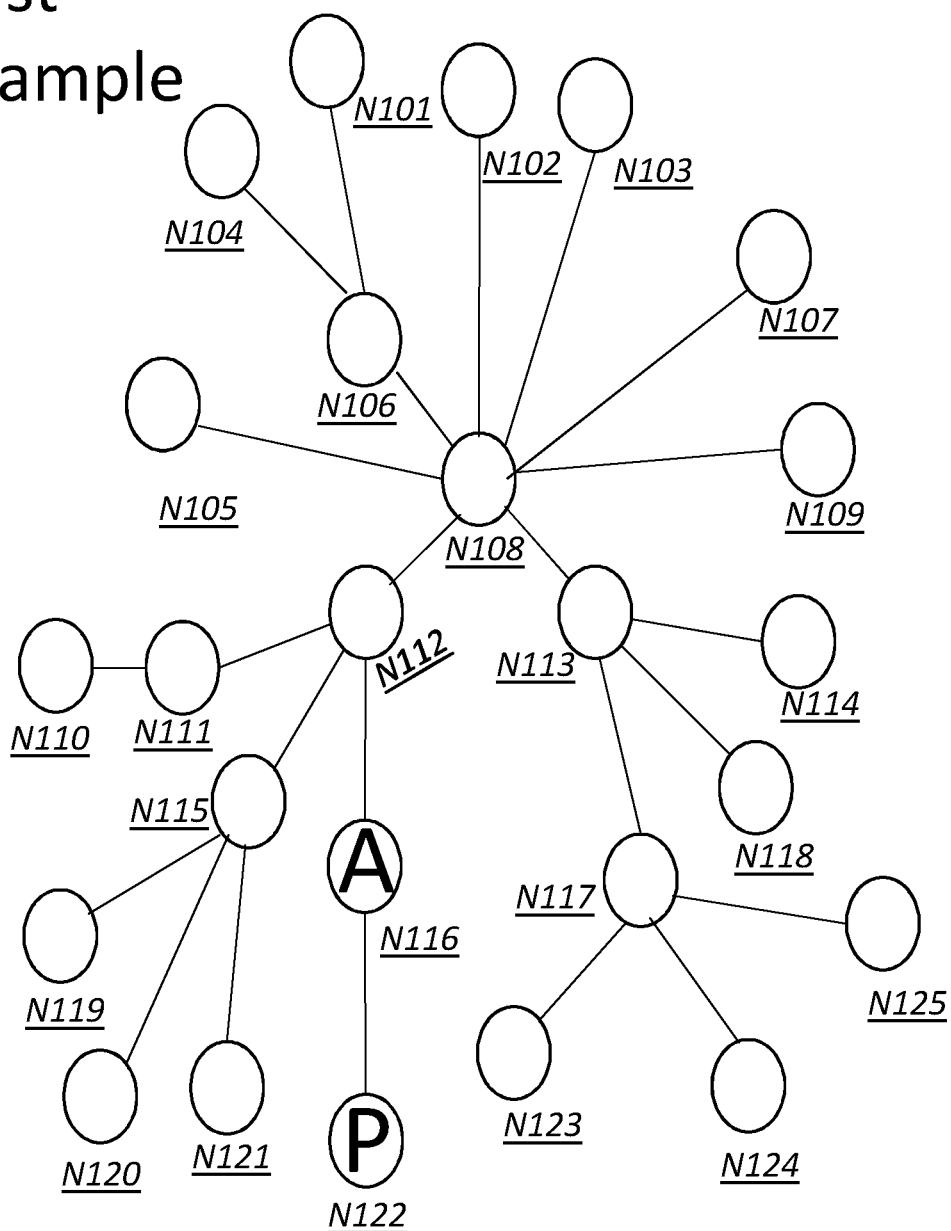
Figure 4D:
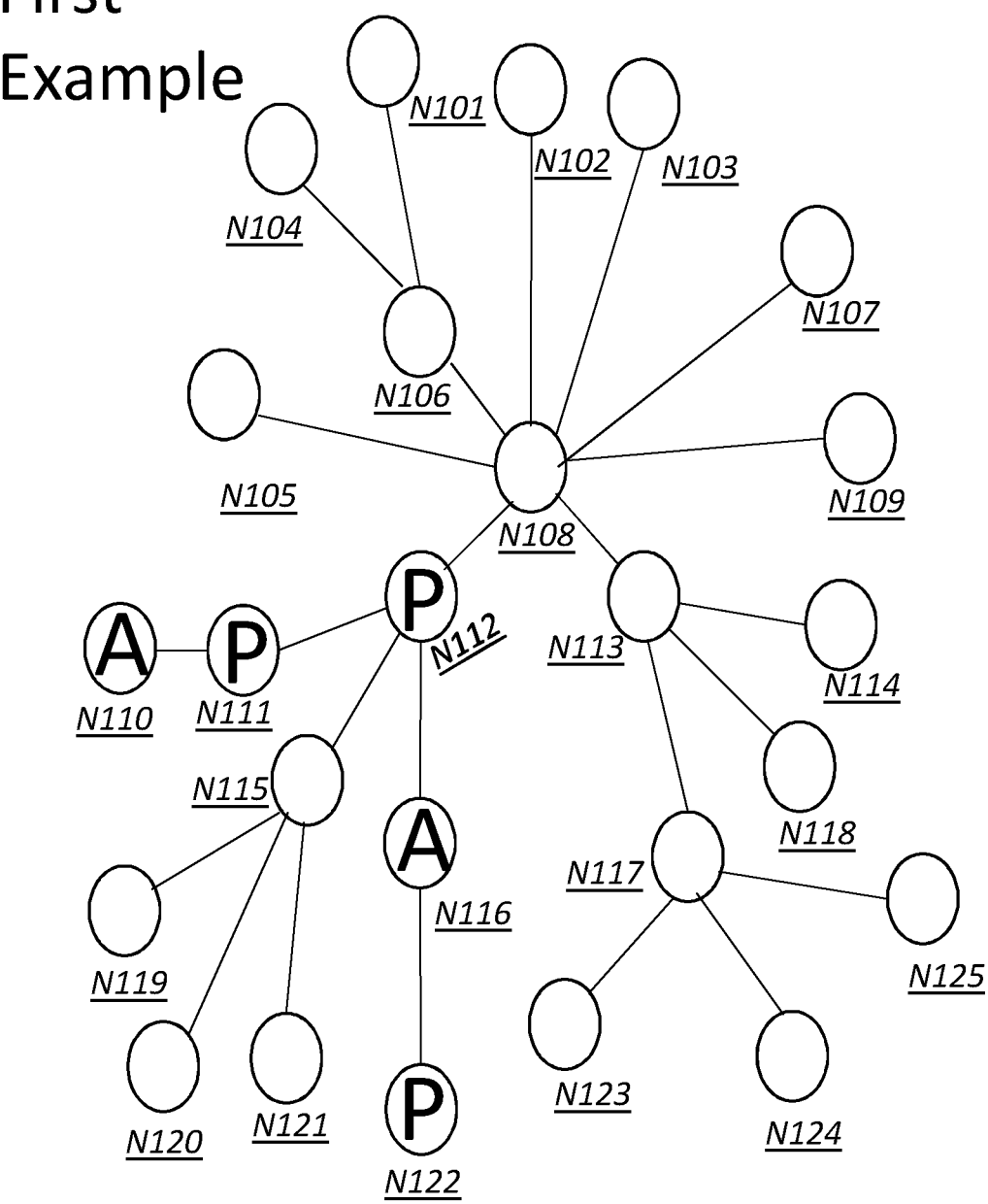

According to the first example illustrated in FIGS. 4B-D, between time $T_{Begin\ Pen\text{-}Test}$ and $T^1_{During\ Pen\text{-}Test}$, network node N122 is targeted for compromising and is validated by passive validation, e.g., emulation, of a vulnerability as part of a penetration testing campaign—this is indicated in FIG. 4B by the "P" marking of node N122. Between time $T^1_{During\ Pen\text{-}Test}$ and $T^2_{During\ Pen\text{-}Test}$, network node N116 is targeted for compromising and is validated by active validation, e.g., by an actual attack on the node by the penetration testing system, as indicated by the 'A' in node N116 in FIG. 4C. Between time $T^2_{During\ Pen\text{-}Test}$ and $T^3_{During\ Pen\text{-}Test}$, network nodes N112, N110 and N111 are targeted for compromising and are validated by either active or passive validation as indicated by the A's and P's in FIG. 4D. The penetration testing campaign is performed by the penetration testing system 500. In this example we are assuming that all the validation operations are successful and each of them results in the corresponding target node becoming compromised or determined to be compromisable.

Figure 4E:
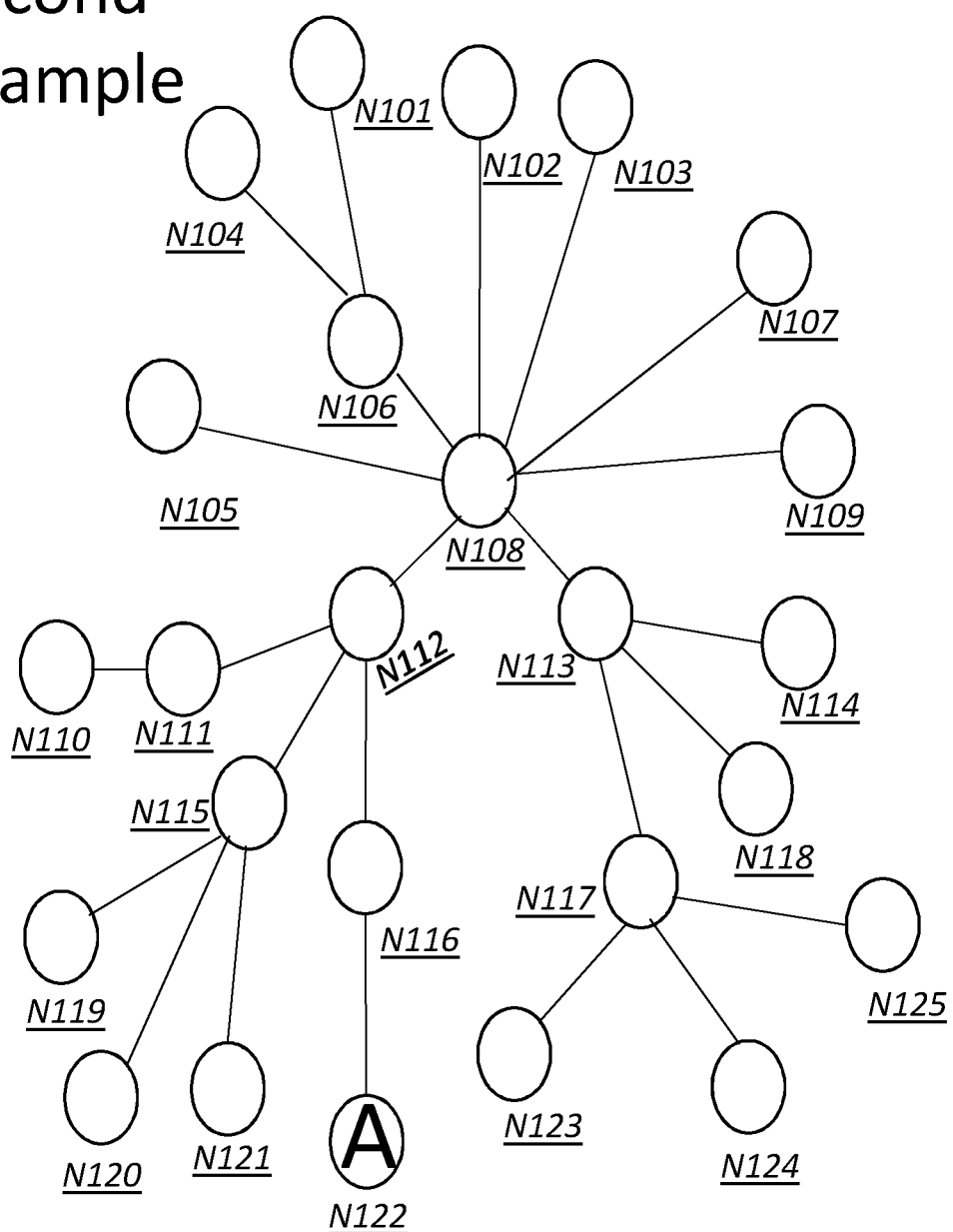
Figure 4F:
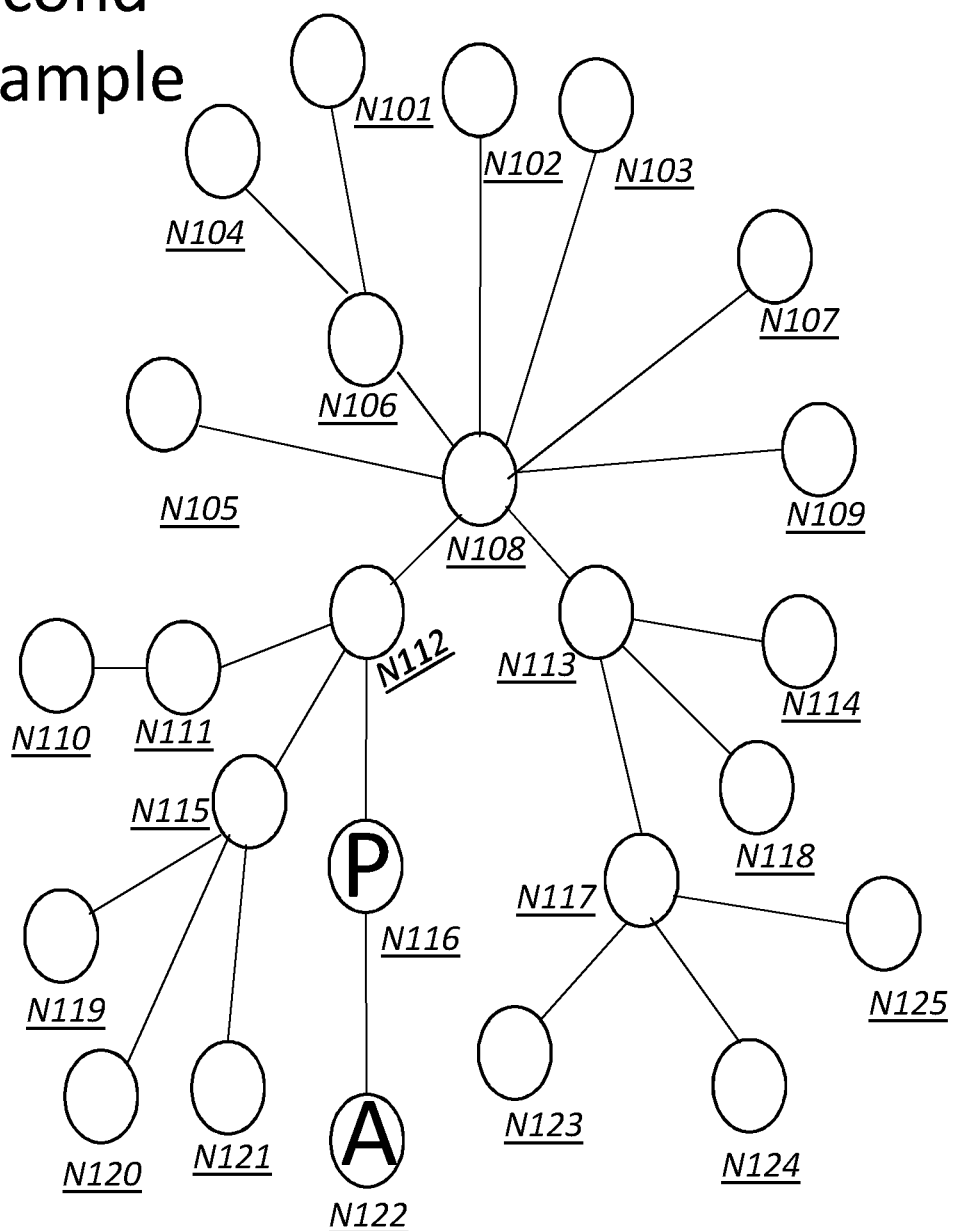
Figure 4G:
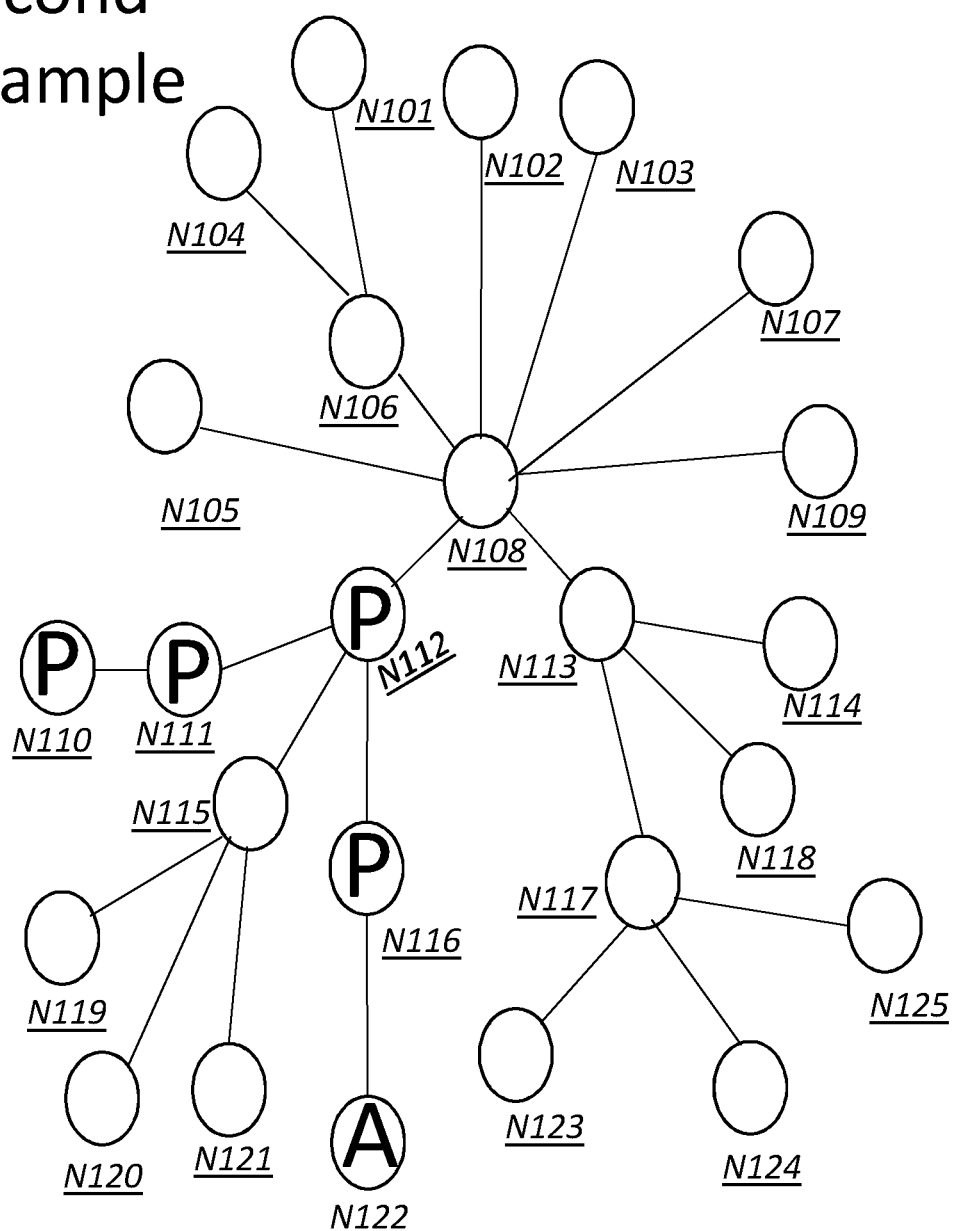
Figure 4H:
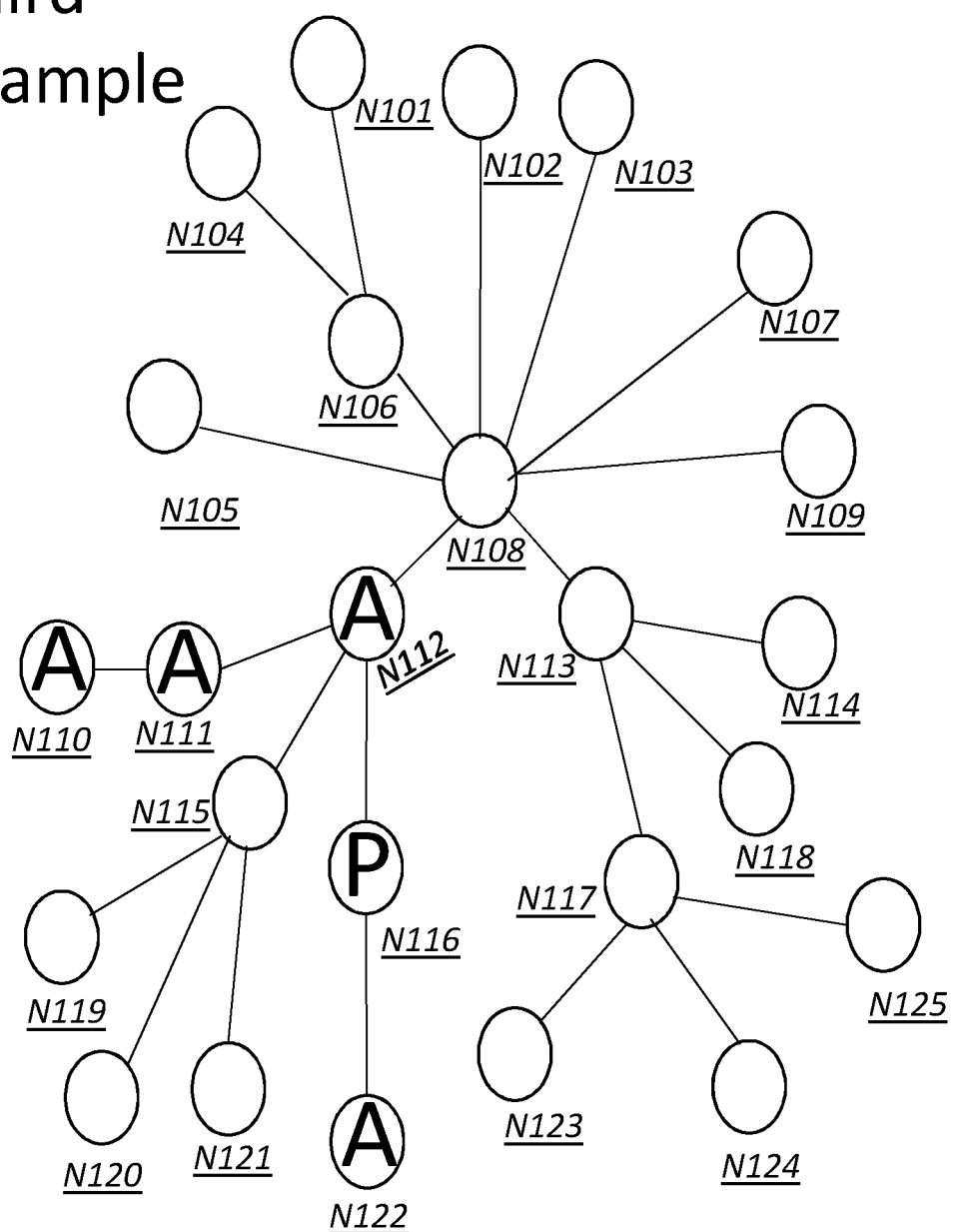

According to the second example illustrated in FIGS. 4E-G, the first network node N122 is validated by active validation (as opposed to the first example where N122 is validated by passive validation), the second network node N116 is validated by passive validation, and by $T^3_{During\ Pen\text{-}Test}$ network nodes N112, N110 and N111 are also validated by passive validation. According to the third example illustrated in FIG. 4H, network nodes N112, N110 and N111 are all validated by active validation. FIG. 4G is an example of a penetration testing campaign that tends toward the use of passive validation except under certain circumstances where the use of active validation is deemed preferable or necessary. FIG. 4H is an example of the opposite—a penetration testing campaign that tends toward the use of active validation except under certain circumstances where the use of passive validation is deemed preferable or necessary.

Figure 5:
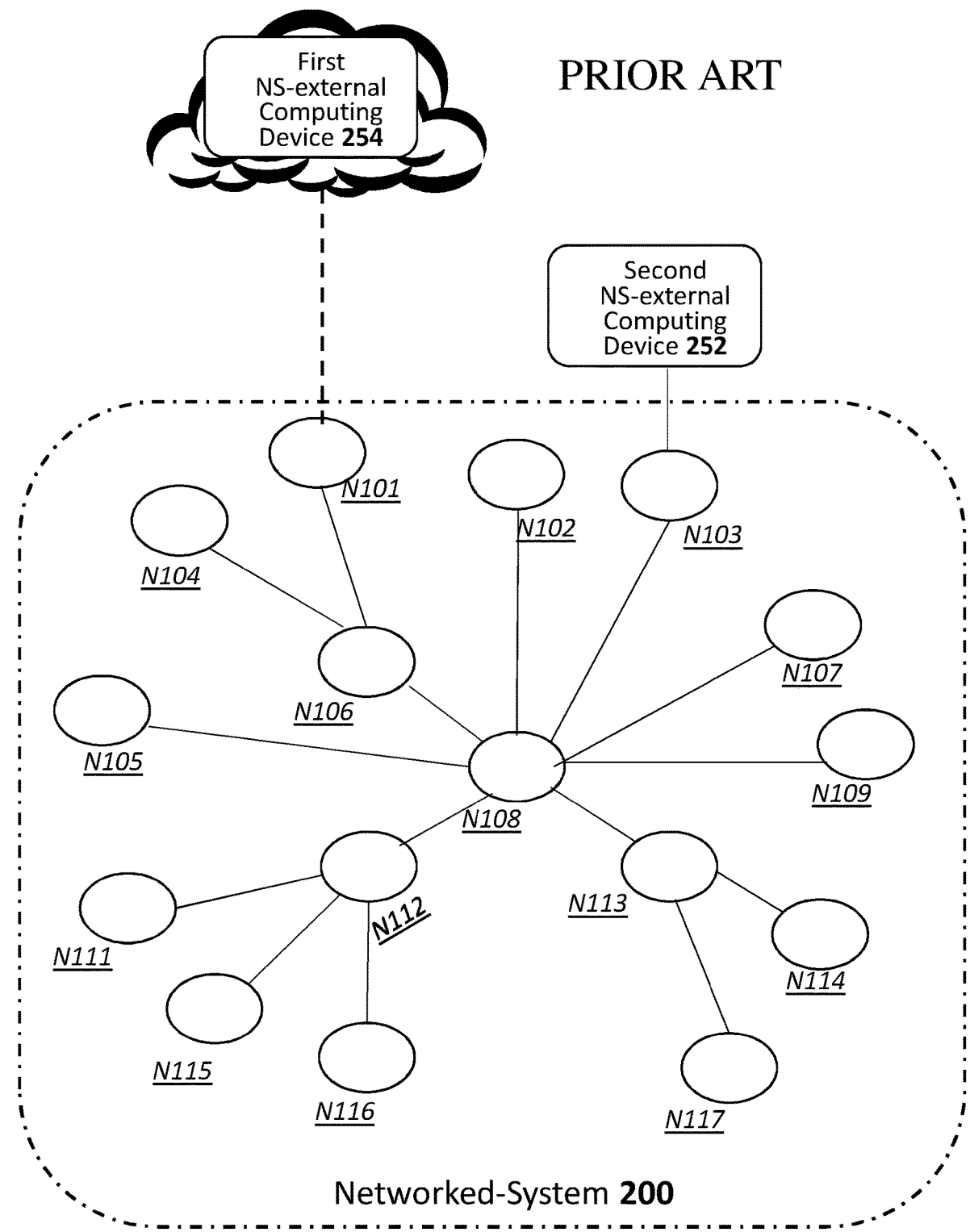
FIG. 5 (PRIOR ART) illustrates a prior art example of a networked system that may be subjected to a penetration test—the networked system comprises a plurality of network nodes.

FIG. 5 illustrates one example of a networked system 200 that may be subjected to penetration testing. The networked system comprises a plurality of nodes—in the example of FIG. 5, 16 nodes are illustrated, each labeled by the letter "N" followed by an integer, similar to FIGS. 4A-H. Also illustrated in FIG. 5 are two external computing devices 254, 252 that reside outside the networked system 200. Computing device 254 resides 'in the cloud' relative to the networked system 200, while computing device 252 is in communication with the networked system 200 via a local-area network (LAN).

Both of nodes 254 and 252 are "networked system external"—i.e. outside of networked system 200. The term 'networked system external' is abbreviated as "NS-external".

In the present document, a network node may be referred to simply as 'node'—'network node' and 'node' are interchangeable. Each network node may be a different computing device 110 illustrated in FIG. 2.

Figure 6:
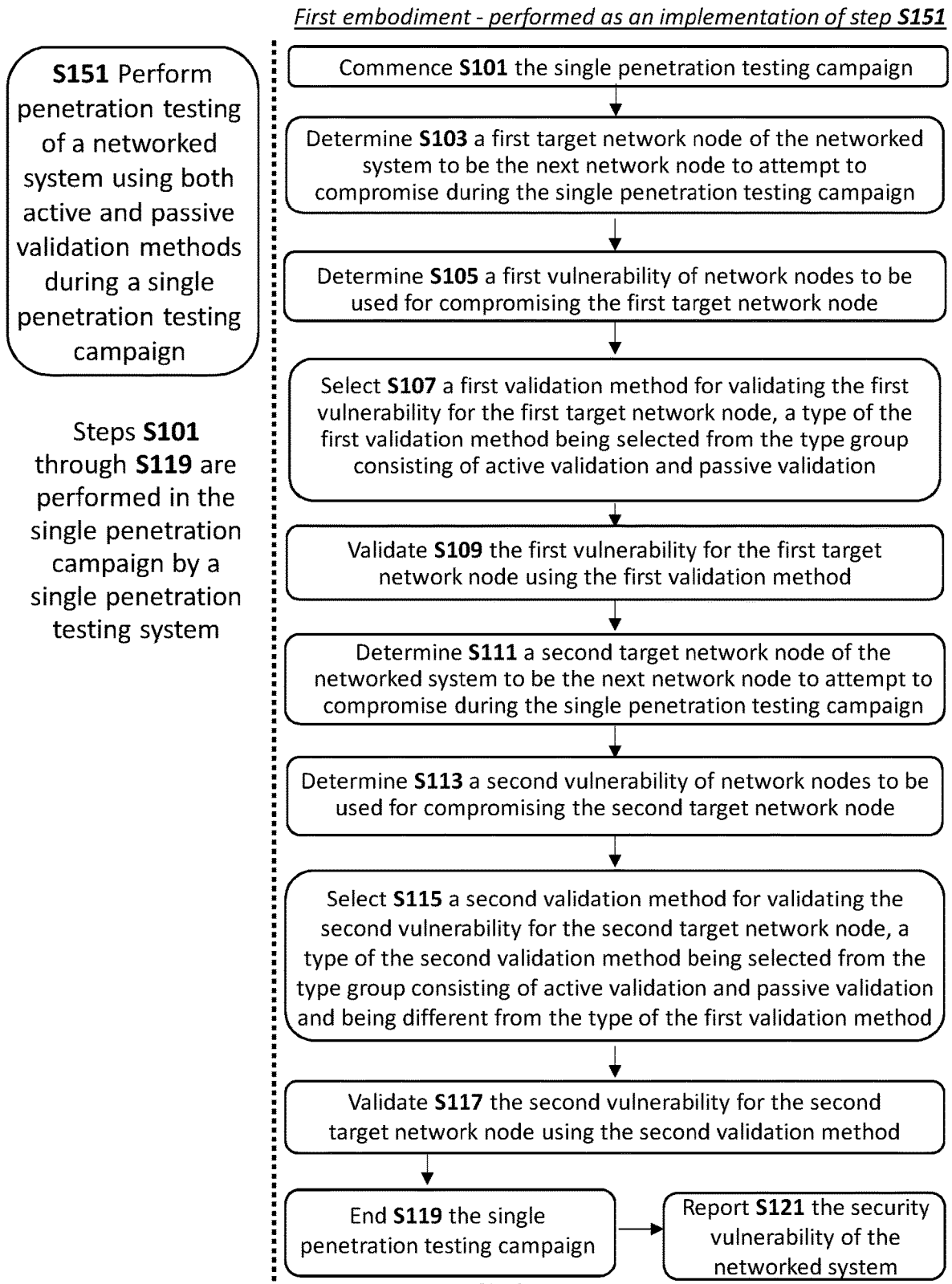
FIG. 6 shows a flow-chart of a method of penetration testing of a networked system according to embodiments of the invention.

Discussion of FIG. 6

FIG. 6 is a flowchart of a method of performing penetration testing by a single penetration testing system that uses both active and passive validation methods. It shows one method in which penetration testing using both active and passive validation methods is performed in a single penetration testing campaign. The reader is referred to the definition of "penetration testing campaign" in the Definitions Section. All of the steps are performed by a single penetration testing system, e.g., penetration testing system 500 of FIG. 4A-H.

In step S151 of FIG. 6, a networked system, e.g., networked system 200 of FIG. 5 is subjected to a penetration test using both active and passive validation methods during a single penetration testing campaign, and by a single penetration testing system.

The right side of FIG. 6 is a flowchart of a method of implementing the penetration testing campaign of step S151 according to a first embodiment.

In step S101, a penetration testing campaign is commenced. In some cases, a penetration testing campaign is commenced automatically by the penetration testing system based on a programmed schedule having a start time, and either an end time or a pre-programmed duration. Alternatively, a penetration testing campaign can be commenced manually—i.e. by a testing operator entering a command to begin the campaign. Besides starting time and duration (or ending time), a penetration testing campaign can have a set of unique characteristics based on its goals and methods. In a non-limiting example, a penetration testing campaign can be designed to determine whether a specific highly confidential file can be reached by an attacker and exported out of the networked system.

In step S103, a first target network node is selected—i.e. determined to be the next target node for an attempt to compromise during the single penetration campaign. Typically, during a penetration testing campaign the selection of the next target network node is done according to a lateral movement strategy employed in the penetration testing campaign. See the definition of "lateral movement strategy" in the Definitions Section.

In one particular non-limiting example, in the first iteration of the penetration testing campaign (when no network nodes are known to be compromisable) step S103 is performed to select a network node having a direct connection to the outside world—e.g. N101 of FIG. 5.

In another non-limiting example, when an iteration of the penetration testing campaign is performed after some network nodes are already known to be compromisable, step S103 is performed to select a network node that has a direct connection to one of the compromisable nodes.

In step S105, a potential vulnerability is selected based on the target node. Thus, in one example, if the target node selected in step S103 happens to be a Windows XP® node, then a vulnerability specific to MacOs® nodes would not be selected but a vulnerability specific to any Windows® node (or to Windows XP®) in particular) may be selected.

Validation of the vulnerability for any given target network node can be performed either using an active (e.g., actual attack) validation method or a passive (e.g., simulated attack) validation method. In step S107, a first validation method is selected for validating the first vulnerability for the first target network node. The first validation method is either active validation or passive validation. Examples of network nodes at which an active validation method has been chosen include Nodes N116 in FIGS. 4C-D, N110 in FIGS. 4D and 4H, N122 in FIGS. 4E-H, and N111 and N112 in FIG. 4H. Examples of network nodes at which a passive validation method has been chosen include Nodes N122 in FIGS. 4B-D, N111 and N112 in FIGS. 4D and 4G, N116 in FIGS. 4F-H, and N110 in FIG. 4G. In the "First Additional Discussion" section below, several examples are provided of selection of validation methods.

In step S109, the first vulnerability for the first target network node is validated using the first validation method as selected in step S107.

At some other point during the penetration testing campaign, a second target network node (e.g. other than the first target network node) which the penetration testing system will try to compromise is determined in step S111. As mentioned earlier, the selection of the target network node is done according to a lateral movement strategy employed in the penetration testing campaign. A penetration testing campaign can select subsequent nodes in an order that emulates the progress of an attacker through the networked system 200. For example, an attacker frequently moves on to attempt to compromise a next node which is in communication with an already compromised node (e.g., the network node most recently compromised).

In step S113, a second vulnerability of network nodes, to be used for compromising the second target network node, is determined.

In step S115, a second validation method is selected for validating the second vulnerability for the second target network node. The second validation method can be either active or passive. If an active validation method was selected as the first validation method in step S107, then the second validation method is selected to be a passive validation method. Conversely, if a passive validation method was selected as the first validation method in step S107, then the second validation method is selected to be an active validation method. Thus, in a single penetration testing campaign, by a single penetration system, both active and passive validation methods can be selected and performed. For example, in FIG. 4C, it can be seen that by $T^2_{During\ Pen-Test}$, an active validation method has been employed to validate a vulnerability for Node N116, and a passive validation method has been used to validate a vulnerability for Node N122.

In step S117, the second vulnerability for the second target network node (the node determined in step S111) is validated using the second validation method as selected in step S115.

In step S119, the single penetration testing campaign is terminated, either in accordance with a programmed duration or ending time as discussed earlier, or manually by a user, or by achieving its goal of determining a vulnerability ahead of the scheduled ending time. The skilled artisan will appreciate that the penetration testing campaign can encompass the testing/validation of more than two nodes as described here, and, for example, can encompass all of the nodes in a networked system 200.

In step S121, the following is performed: reporting, by the penetration testing system, at least one security vulnerability determined to exist in the networked system by the executing of the single penetration testing campaign, wherein the reporting comprises at least one of (A) causing a display device to display a report containing information about the at least one security vulnerability of the networked system, (B) storing the report containing information about the at least one security vulnerability of the networked system in a file and (C) electronically transmitting the report containing information about the at least one security vulnerability of the networked system.

FIG. 6 will be further discussed below with reference to the following non limiting examples.

Figure 7A:
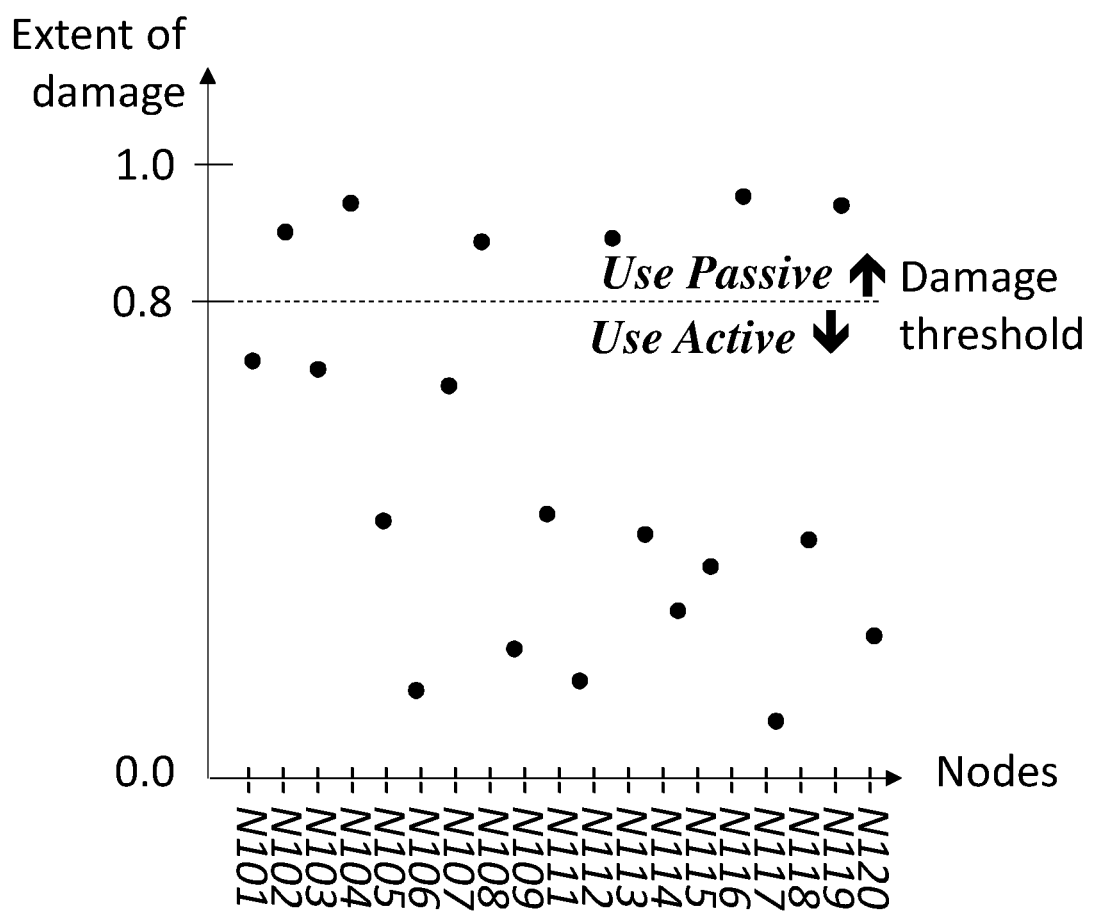
FIGS. 7A, 7B and 8 are illustrative graphs of expected damage and risk factors, respectively, associated with performing active validation at the various network nodes.
Figure 7B:
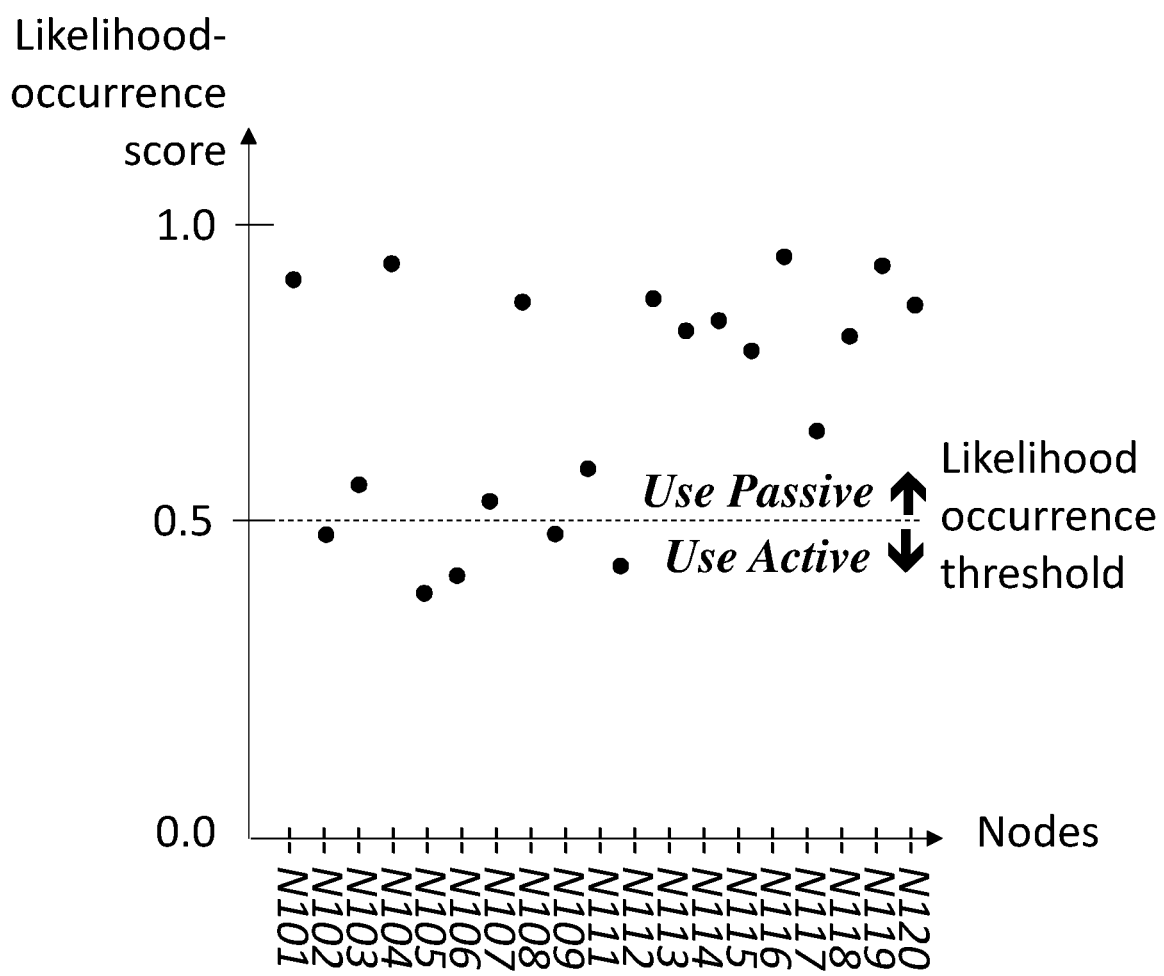

First Additional Discussion of FIG. 6, and Discussion of FIGS. 7A-7B

In some embodiments, it can be preferable to primarily use an active (actual attack) method of validation, in order to determine the existence of any possible vulnerability with the highest reliability. In some embodiments it can be preferable to primarily use a passive (e.g., emulation) method so as to avoid actually compromising network nodes during the testing. In some embodiments, the first and second validation methods are respectively selected in accordance with the first and second vulnerabilities. Even when active methods are preferred, it can be that certain vulnerabilities can be satisfactorily validated using passive methods. Conversely, even when passive methods are preferred, it can be that certain vulnerabilities can only be satisfactorily validated using active methods.

Other, non-technical considerations may come into play when selecting a validation method for a particular vulnerability for a particular network node, such as in the following non-exhaustive illustrative examples: (A) The identity of the node's user—is it someone with access to top-level confidential data, or someone with little or no access to confidential data? Is it the company's CEO whose use of the node cannot be interrupted by an actual attack method? (B) the department within which the node operates—is it a legal or financial department, which have computers storing the company's most sensitive information, or a marketing department with critical customer data, or perhaps an engineering department with the specs and drawings of the company's next generation of products? Or maybe the node belongs to the office manager, whose computer only stores cleaning schedules and orders for office supplies?

It might not be reasonable to make ad hoc decisions about each and every computer in a networked system before commencing a penetration testing campaign. Similarly, it might not be reasonable to make ad hoc decisions about each and every potential vulnerability included the penetration testing system's vulnerabilities knowledge base. However, it is possible to characterize vulnerabilities, with or without co-consideration of the corresponding network nodes, according to a parameter corresponding to the maximum damage (financial, technical, etc.) that would be incurred should a given node be compromised by a given vulnerability. Thus, the method of FIG. 6 can include determining an extent of the damage.

In one non-limiting example, a damage scale is established wherein 0.0 means 'no damage' and 1.0 means 'irreparable or irreversible damage'. A maximum 'allowable' damage threshold can be set. Any node and vulnerability for which a successful actual attack would result in damage above the threshold would trigger validation by simulation/evaluation. For nodes and vulnerabilities below the threshold, an active method of validation may be used.

In an illustrative first penetration testing campaign, the damage threshold may be set at a moderate 0.5. However, in the first campaign it may be discovered that this threshold is too low and nearly every single validation is performed using a passive validation method, including some nodes and vulnerabilities where use of an active validation method is objectively (i.e. through detailed pre- or post-analysis) deemed necessary. In a second illustrative campaign, the damage threshold may be set at an extreme 0.9. In this iteration it may be discovered that this threshold is too high as nearly every single validation is performed using an active validation method, including some nodes and vulnerabilities where use of an active validation method exposes the tested networked system to unnecessary risk of damage. In a third iteration, a damage threshold of 0.7 may be determined to be optimal for the networked system in which the penetration testing campaign is being carried out.

In one non-limiting implementation of the above example, a look-up table may be established and made available to a penetration testing system for determining the extent of expected damage from using active validation for validating any given vulnerability, regardless of the identity of the attacked node. Such a table may be arranged so as to be indexed by the type of vulnerability determined (regardless of the attacked node), where the table returns a damage 'score' based on the type of vulnerability. Multiple vulnerability types may be combined into a joint entry in order to save space, if they share a common attribute and correspond to the same damage score (e.g. multiple vulnerabilities that are all attempting to achieve execution of remote code in the attacked node, but each of them achieving the common goal using a different technique). As explained above, the damage score is a numerical representation of the expected extent or severity of damage from using active validation for the specific type of vulnerability. The damage score can be calculated or determined on any scale, linear or otherwise—for example the 0.0 to 1.0 scale described above. Whatever scale is used, it is created in such a way that a maximum-damage threshold is established somewhere on the scale. An example of an entry in such table is an entry that tells the penetration testing system that any node against which the "ARP Spoofing" technique is employed for active validation corresponds to a damage score of 0.4.

In another non-limiting implementation of the above example, a two-dimensional look-up table may be established and made available to a penetration testing system for determining the extent of expected damage from using active validation for validating any combination of a given vulnerability and a given network node. Such a table may be arranged as having multiple columns, each column corresponding to a specific node or to a specific class of nodes and containing entries for all vulnerability types. As in the above one-dimensional table example, multiple vulnerability types may be combined into a joint entry in order to save space, if they share a common attribute and correspond to the same damage score. The node that is involved in the validation determines the table's column and the vulnerability involved in the validation determines the row within the column. The indexed entry in the table contains the resulting damage score. An example of a row of entries in such table is a row that tells the penetration testing system that actively validating the "ARP Spoofing" technique against the CEO's computer corresponds to a damage score of 0.8, actively validating the "ARP Spoofing" technique against any node residing in the finance group corresponds to a damage score of 0.6, actively validating the "ARP Spoofing" technique against any other node using the Windows XP operating system corresponds to a damage score of 0.5 and actively validating the "ARP Spoofing" technique against any other node corresponds to a damage score of 0.4.

FIG. 7A is an illustrative graph according to a non-limiting example, summarizing data of a specific penetration testing campaign showing the extent of damage expected at each node from using an actual-attack validation of a respective vulnerability that is determined at each node during that specific penetration testing campaign. For each node, at least one vulnerability is determined (in Step S105 or S113), and is validated (in Step S109 or S117) during the execution of the specific penetration testing campaign. In the example of FIG. 7A, a damage threshold is set equal to 0.8. In other words, if the expected extent of damage as a result of using an active method of validation is greater than the maximum allowable damage of the 0.8 threshold, a possibly less reliable but presumably safer passive method of validation is used.

To illustrate: The leftmost data point in the FIG. 7A graph (for Node N101) shows that a vulnerability determined (e.g., in Step S105 of FIG. 6) as the one to be used for compromising Node N101 has an expected damage extent of about 0.7 (i.e., on the 0.0-1.0 scale) if validated in the penetration testing campaign using an active validation method. Since the expected extent of damage (from using an active validation method) is below the maximum allowable damage threshold of 0.8, an active validation method can be used. On the other hand, the vulnerability determined (e.g., in step S113) for compromising Node N102 (the second leftmost data point) has an expected damage extent of 0.9 if validated using an active method of validation—higher than the max. damage threshold of 0.8. Thus, according to the example of FIG. 7A, a passive validation method is selected for validating the vulnerability at Node N102.

In the example of FIG. 7A, the networked system comprises 20 network nodes overall (numbered N101 through N120), and 6 out of the 20 nodes have expected damage over the damage threshold based on the vulnerability/-ies determined to be used for compromising the respective nodes during the specific penetration testing campaign. A passive validation method is therefore selected for testing at each of these 6 nodes, while active validation methods are used at the other 14 nodes.

Additionally or alternatively, the method of FIG. 6 can include determining the likelihood of damage. FIG. 7B is an illustrative graph according to another non-limiting example, summarizing data of a specific penetration testing campaign showing the likelihood of damage occurring at each node from using an actual-attack validation of a respective vulnerability determined at each node during that specific penetration testing campaign. For each node, at least one vulnerability is determined (in Step S105 or S113), and is validated (Step S109 or S117) during the execution of the specific penetration testing campaign. In the example of FIG. 7B, a likelihood-occurrence threshold is set equal to 0.5—in other words, if the chance of damage occurring as a result of using an active method of validation translates to a likelihood-occurrence score greater than 0.5, a passive method of validation is used instead. A likelihood-occurrence score can be a linear translation of probability, e.g., 50% chance equals a score of 0.5. Alternatively a likelihood-occurrence score can be calculated using a non-linear function—for example, so as to skew the scores higher or lower, or closer or further from the mean, etc.

To illustrate: The leftmost data point in the FIG. 7B graph (for Node N101) shows that a vulnerability determined (e.g., in Step S105 of FIG. 6) as the one to be used for compromising Node N101 is associated with likelihood-occurrence score of 0.9—i.e., if a linear scale is used for determining the likelihood-occurrence scores, there is a 90% likelihood of damage actually occurring if the vulnerability is validated in the penetration testing campaign using an active validation method. Since this likelihood is well above the likelihood-occurrence threshold of 0.5, a passive validation method is used. On the other hand, the vulnerability determined (e.g., in step S113) for compromising Node N102 (the second leftmost data point) is associated with a likelihood-occurrence score of only 0.48—a little lower than the likelihood-occurrence threshold of 0.5. Thus, according to the example, an active validation method can be used for validating the vulnerability at Node N102.

In the example of FIG. 7B, the networked system comprises 20 network nodes (numbered N101 through N120), and 5 out of the 20 nodes have damage likelihood-occurrence scores under the likelihood-occurrence threshold based on the vulnerability/-ies determined to be used for compromising the various nodes during the specific penetration testing campaign. An active validation method is therefore selected for testing at each of these 5 nodes, while passive validation methods are used at the other 15 nodes.

Figure 8:
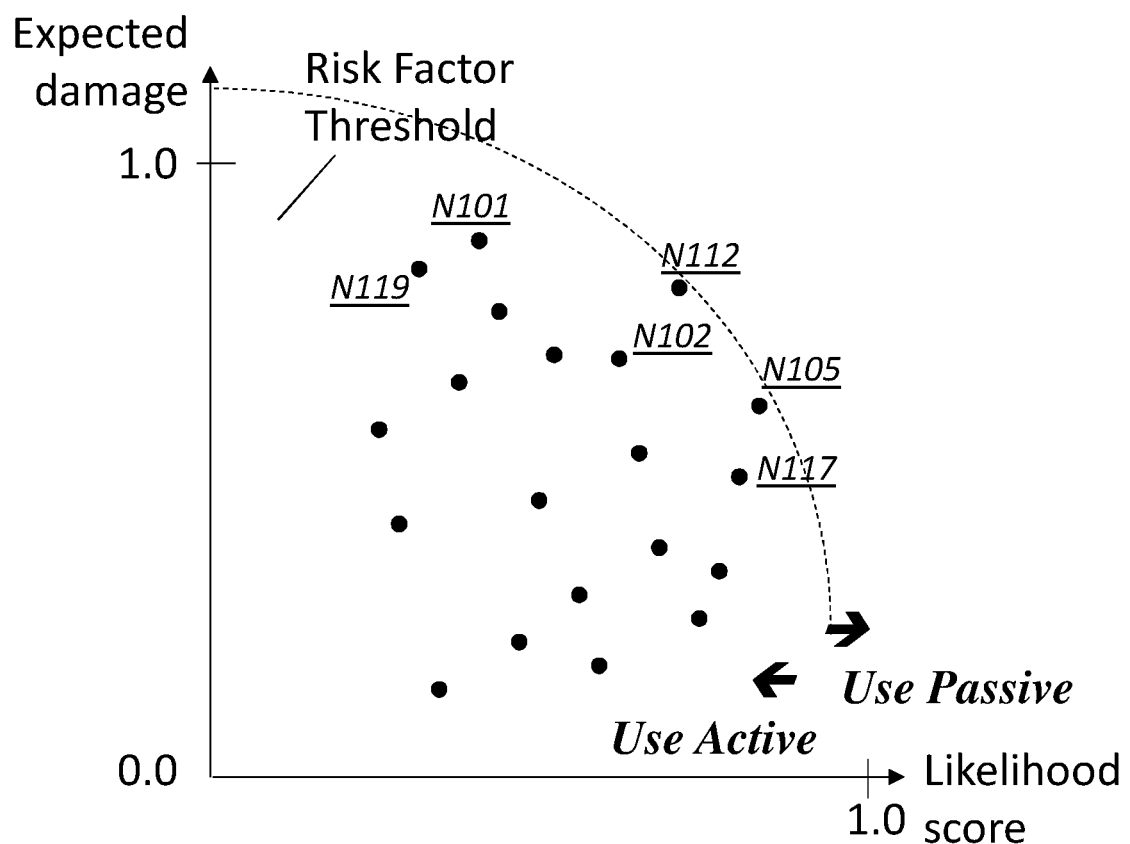

Second Additional Discussion of FIG. 6, and Discussion of FIG. 8

In other embodiments, potential damage to network nodes from using an active method of validation to validate a vulnerability can be assessed with more than a single parameter as was the case in the preceding paragraphs and in FIGS. 7A and 7B. In an example, a representative damage score for a given node/vulnerability validation can be calculated based on both the extent and likelihood of expected damage from employing an active validation method to validate a vulnerability at a given network node. The representative damage score can be calculated individually for each single validation—i.e. for each node/vulnerability pair in a specific penetration testing campaign.

FIG. 8 is an illustrative graph according to a non-limiting example, wherein a risk score is a determined combination of expected extent of damage and likelihood of damage. A threshold curve is plotted, under which active validation can be used and above which passive validation is preferred because of the extent and/or likelihood (as jointly represented in the determined risk score) of the expected damage from a node being compromised if a determined vulnerability is validated using an active validation method. In FIG. 8, points are plotted for 20 nodes of a networked system. Nodes N101, N112 and N105 are outside (above) the risk factor threshold curve and according to the example the vulnerabilities at those nodes must be validated using a passive validation method. Nodes N102 and N117 are both lying on the threshold curve. Whether they can be validated using an active validation method depends on whether the threshold in the example is defined as 'active validation method is permitted if risk factor value is no greater than threshold value' or 'active validation method is permitted if risk factor value is below the threshold'. Node N119 and all of the nodes represented by the unlabeled data points are within (under) the threshold and in accordance with this example can be validated using an active validation method.

It should be obvious that the threshold curve shown in FIG. 8 is only one way of representing a combination of parameters that make a risk factor for a node for a given vulnerability. Moreover, in other examples, the curve can have a different shape, and other parameters can enter into the combination of parameters that make up the risk factor.

Figure 9:
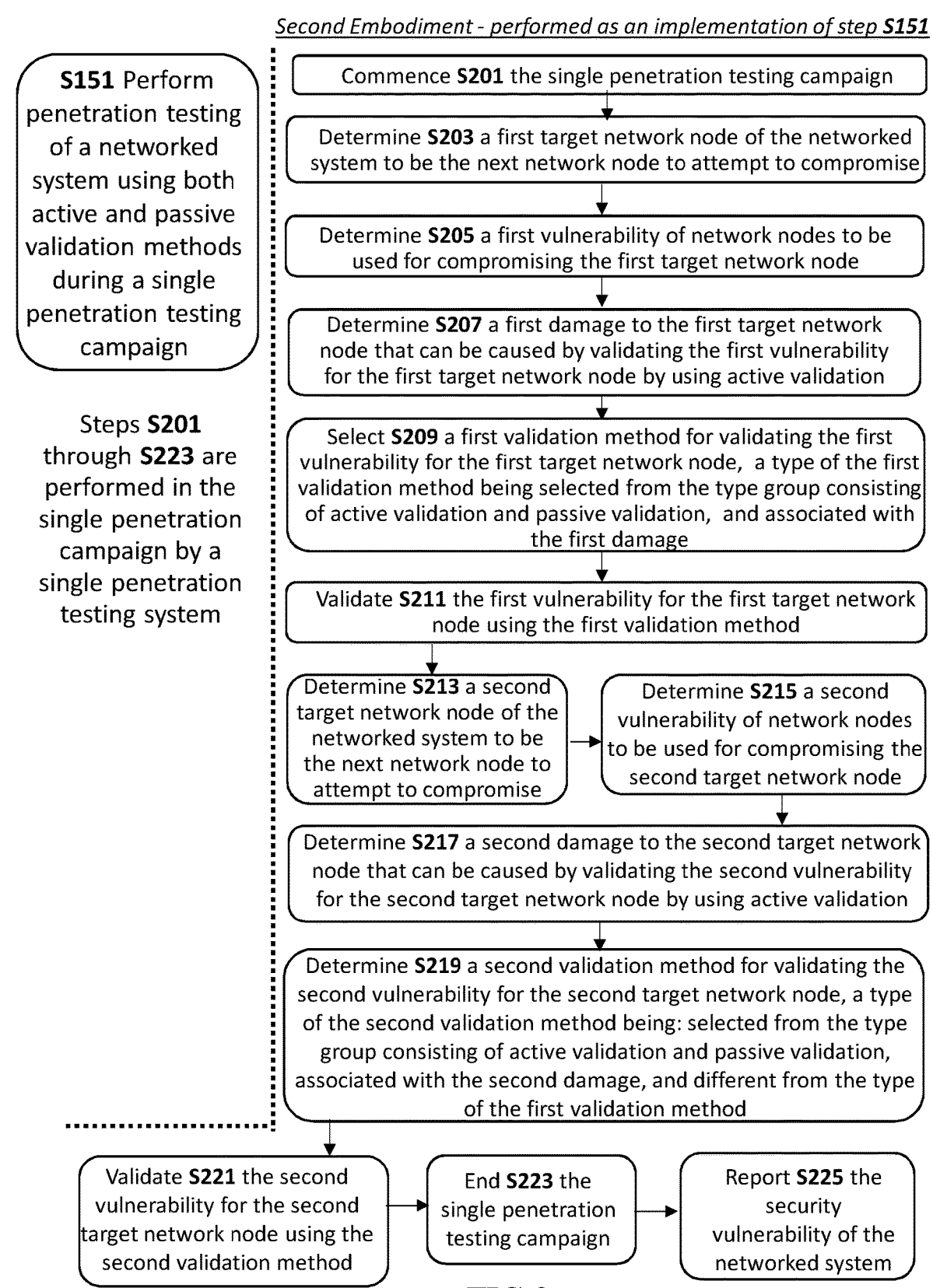

Discussion of FIG. 9

FIG. 9 is a flowchart of another method of performing penetration testing by a penetration testing system that uses both active and passive validation methods. It shows another method in which penetration testing using both active and passive validation methods is performed in a single penetration testing campaign. The reader is referred to the definition of "penetration testing campaign" in the Definitions Section. The steps of the method are performed by a single penetration testing system.

In step S151 of FIG. 9, which is the same step S151 of FIG. 6, a networked system, e.g., networked system 200 of FIG. 5 is subjected to a penetration test using both active and passive validation methods during a single penetration testing campaign.

The right side of FIG. 9 is a flowchart of a method of implementing the penetration testing campaign of step S151 according to a second embodiment.

In step S201, a penetration testing campaign is commenced, either automatically by the penetration testing system based on a programmed schedule or manually by a user.

In step S203, a first target network node is selected—i.e. determined to be the next target node for an attempt to compromise during the single penetration campaign.

In step S205, a first potential vulnerability is selected based on the target node.

Validation of the first vulnerability in the first target network node can be performed either using an active (e.g., actual attack) validation method or a passive (e.g., simulated attack) validation method. Validation using an active method can lead to various kinds damage—including, but not exhaustively, financial and/or operational damage—by actually compromising the node, and this damage can be assessed before selecting a validation method for the respective vulnerability at each node. In step S207, a first damage to the first target network node, which can be caused by validating the first vulnerability for the first target network node by using active validation, is determined. This determination of the first damage is then taken into account when selecting a first validation method. The reader is referred to the first and second additional discussions of FIG. 6, as well as FIGS. 7A, 7B and 8 for examples of how assessing potential damage from compromising a node (i.e.—actually attacking a node using an active validation method) can be used in selecting the type of validation to use. Thus, in step S209, a first validation method is selected for validating the first vulnerability for the first target network node. The type of the first validation method is selected from the type group consisting of active validation and passive validation, and is associated with the first damage, i.e.—the selection takes into account the determination, in step S207, of the damage that can occur when an active validation method is used for validating the first vulnerability for the first target node.

In step S211, the first vulnerability for the first target network node is validated using the first validation method as selected in step S209.

At a second point during the single penetration testing campaign, a second target network node (e.g. different from the first target node) which the penetration testing system will try to compromise is determined in step S213. As mentioned earlier in the discussion of FIG. 6, the selection of the target network node may be carried out according to a lateral movement strategy employed in the penetration testing campaign.

In step S215, a second vulnerability of network nodes, to be used for compromising the second target network node, is determined.

In step S217, a second damage to the second target network node, which can be caused by validating the second vulnerability for the second target network node by using active validation, is determined. This determination of the second damage is then taken into account when selecting a second validation method in step S219.

In step S219, a second validation method is selected for validating the second vulnerability for the second target network node. The second validation method can be either active or passive. If an active validation method was selected as the first validation method in step S209, then the second validation method is selected to be a passive validation method. Conversely, if a passive validation method was selected as the first validation method in step S209, them the second validation method is selected to be an active validation method. Thus, in a single penetration testing campaign, and by a single penetration system, both active and passive validation methods can be selected and performed. In step S221, the second vulnerability for the second target network node is validated using the second validation method selected in step S219.

In step S223, the single penetration testing campaign is terminated, either in accordance with a programmed duration or ending time as discussed earlier, or manually by a user, or by achieving its goal of determining a vulnerability ahead of the scheduled ending time. The skilled artisan will appreciate that the penetration testing campaign can encompass the testing/validation of more than two nodes as described here, and, for example, can encompass all of the nodes in a networked system 200.

In step S225, the following is performed: reporting, by the penetration testing system, at least one security vulnerability determined to exist in the networked system by the executing of the single penetration testing campaign, wherein the reporting comprises at least one of (A) causing a display device to display a report containing information about the at least one security vulnerability of the networked system, (B) storing the report containing information about the at least one security vulnerability of the networked system in a file and (C) electronically transmitting the report containing information about the at least one security vulnerability of the networked system.

Discussion of FIGS. 10 and 11

FIG. 10 is a flowchart of a method of performing penetration testing by a penetration testing system that uses both active and passive validation methods. It shows a method in which penetration testing using both active and passive validation methods is performed in two penetration testing campaigns. The reader is referred to the definition of "penetration testing campaign" in the Definitions Section. The steps of the method are performed by a single penetration testing system.

In step S153 of FIG. 10, a single networked system, e.g., networked system 200 of FIG. 5, is subjected to a penetration test using both active and passive validation methods during first and second penetration testing campaigns, and by a single penetration testing system. According to Step S153, the first penetration testing campaign employs only active validation for validating vulnerabilities of network nodes of the single networked system, and the second penetration testing campaign employs only passive validation for validating vulnerabilities of network nodes of the single networked system.

The right side of FIG. 10 is a flowchart of a method of implementing the penetration testing campaigns of step S153 according to an embodiment.

In step S301, the first penetration testing campaign is executed by the single penetration testing system. The executing of the first penetration testing campaign comprises performing one or more validation operations for validating vulnerabilities for network nodes of the single networked system, wherein the methods of validation used for all validation operations included in the first penetration testing campaign are active validation methods.

In step S302, the second penetration testing campaign is executed by the single penetration testing system. The executing of the second penetration testing campaign comprises performing one or more validation operations for validating vulnerabilities for network nodes of the single networked system, wherein the methods of validation used for all validation operations included in the second penetration testing campaign are passive validation methods.

In step S305, the following is performed: reporting, by the penetration testing system, at least one security vulnerability determined to exist in the networked system by the executing of the first and second penetration testing campaigns, wherein the reporting comprises at least one of (A) causing a display device to display a report containing information about the at least one security vulnerability of the networked system, (B) storing the report containing information about the at least one security vulnerability of the networked system in a file and (C) electronically transmitting the report containing information about the at least one security vulnerability of the networked system.

The method of FIG. 10 employs a first penetration testing campaign which uses active validation methods, and a second penetration testing campaign which uses passive validation methods; both campaigns are run by a single penetration testing system in a single networked system. The first and second penetration testing campaigns can be conducted sequentially, in parallel, overlapping, or any combination thereof.

FIG. 11 illustrates non-limiting examples of how the first and second penetration testing campaigns can temporally relate to each other. Example 1 shows the second penetration testing campaign commencing sequentially after the first campaign. It should be obvious that the two campaigns can be one right after the other or, as shown, with a gap in time between the conclusion of the first campaign and the beginning of the second campaign. Example 2 illustrates the possibility of overlap, where the second penetration testing campaign commences while the first penetration testing campaign is still running. Example 3 shows the two campaigns substantially running in parallel. The two penetration testing campaigns are shown as having unequal durations and staggered start times, but in other examples they may have equal durations and/or simultaneous starting times. Example 4 is similar to Example 2 but with the second (passive method) penetration testing campaign commencing first and the first campaign (active methods) starting while the second campaign is still running.

In any of the methods disclosed herein, the penetration testing system 500 can be controlled by a user interface (not shown) of a computing device 110. Any of the methods can additionally include a step (like all other steps, performed by the penetration testing system 500) of receiving, via the user interface of the computing device 110, one or more manually-entered inputs. In the method discussed in connection with the flowchart of FIG. 6, the one or more manually-entered inputs can explicitly define a type of a validation method to be used for validating the first vulnerability, and/or a type of a validation method to be used for validating the second vulnerability. In the method discussed in connection with the flowchart of FIG. 9, the one or more manually-entered inputs can explicitly define a type of a validation method associated with the first damage, and/or a type of a validation method associated with the second damage. In the method discussed in connection with the flowchart of FIG. 10, the first and second penetration campaigns can both be based on a common scenario template. In such an embodiment, the one or more manually-entered inputs can explicitly define a type of a validation method to be used for validating all vulnerabilities in the first penetration testing campaign that is based on the common scenario template, and/or a type of a validation method to be used for validating all vulnerabilities in the second penetration testing campaign that is based on the common scenario template.

First Additional Discussion

The proposed solution is a penetration testing system that provides flexible control of the method of validation of potential vulnerabilities that is to be employed—whether validation by actual attack (active validation) or validation by simulation/evaluation (passive validation).

In a first embodiment, each potential vulnerability has a validation method associated with it (e.g. active validation or passive validation), and different potential vulnerabilities may have different validation methods, even during the execution of the same penetration testing campaign. That is, during the execution of a given penetration testing campaign, some vulnerabilities are validated by actual attack, while other vulnerabilities are validated by simulation/evaluation. For example, during the execution of a given penetration testing campaign, a first vulnerability that takes advantage of a weakness in a software driver of an I/O device and might cause a temporary disabling of the output device is validated by actual attack, while a second vulnerability that takes advantage of a weakness in Microsoft Word and might cause corruption of one or more user files is validated by simulation/evaluation. This embodiment addresses the first flexibility issue presented above.

In a first implementation of the first embodiment, the user is given control over the method of validation of each vulnerability. Each vulnerability in the system's knowledge base has a default method of validation associated with it, but the user interface of the penetration testing system provides means for the user to change the validation method currently associated with a vulnerability, selectively for each vulnerability. The change by the user may be temporary for only a single campaign execution, or it may be permanent and remain in effect until explicitly changed again.

In a second implementation of the first embodiment, the vendor of the penetration testing system decides which method of evaluation is associated with each specific vulnerability because it is considered to be more suitable for that specific vulnerability, and the user of the penetration testing system cannot override this decision. For example, the vendor may set the validation method of a first potential vulnerability that might result in a crash of a target network node to be validation by simulation/evaluation, while setting the validation method of a second potential vulnerability that might result in exporting a certain file to validation by actual attack.

In a second embodiment, vulnerabilities are handled according to the damaging operation resulting from their successful exploitation. Each damaging operation has a method of validation associated with it, and different damaging operations may be associated with different validation methods, even during the execution of the same penetration testing campaign. This embodiment eliminates the tedious task of separately associating a validation method with each one of the many potential vulnerabilities typically included in a vulnerabilities knowledge base of a penetration testing system. For example, during the execution of a given penetration testing campaign, some vulnerabilities (that might cause some damaging operations) are validated by actual attack, while other vulnerabilities (that might cause other damaging operations) are validated by simulation/evaluation. Whenever a vulnerability has to be validated, its damaging operation is determined, and the vulnerability is validated using the validation method associated with its damaging operation. Examples of damaging operations caused by vulnerabilities are corrupting of a system file, exporting of a user file, exporting of a passwords file, crashing down a network node, temporary disabling of an I/O device, etc. As an example, all vulnerabilities that might cause a temporary disabling of an I/O device are validated by actual attack, while all vulnerabilities that might cause corruption of a user file are validated by simulation/evaluation. This embodiment also addresses the first flexibility issue presented above.

In a first implementation of the second embodiment, the user is given control over the method of validation associated with each damaging operation. Each damaging operation has a default method of validation associated with it, but the user interface of the penetration testing system provides means for the user to change the validation method currently associated with a damaging operation, selectively for each damaging operation. The change by the user may be temporary for only a single campaign execution, or it may be permanent and remain in effect until explicitly changed again.

In a second implementation of the second embodiment, the vendor of the penetration testing system decides which method of validation is associated with each specific damaging operation because it is considered to be more suitable for that specific damaging operation, and the user of the penetration testing system cannot override this decision. For example, the vendor may set the validation method of all vulnerabilities that might result in a crash of the target network node to be validation by simulation/evaluation, while setting the validation method of all vulnerabilities that might result in exporting a system file to validation by actual attack.

In a third embodiment, each execution of a penetration testing campaign has a method of validation associated with it, so that all the vulnerabilities validated during the execution of the campaign are validated using that campaign-associated validation method. Different campaigns may have different validation methods. In some implementations, the same scenario template may be the basis for multiple campaigns executed at different points in time while having different validation methods associated with them. This embodiment addresses the second and third flexibility issues presented above.

In a first implementation of the third embodiment, the user is given control over the method of validation associated with each penetration testing campaign. The user interface of the penetration testing system provides means for the user to select the validation method associated with either the next campaign or with all campaigns that are based on a scenario template, selectively for each scenario template. That is, when selecting a scenario template in order to define a penetration testing campaign to execute, the user is given an option to select the validation method to be associated with that campaign, thus overriding any validation method previously defined for that scenario template.

If the scenario template is created by the user of the penetration testing system, then during the creation process the user selects the validation method that is to be associated with the newly-created scenario template. If the scenario template is selected from a library of scenario templates provided by the vendor of the penetration testing system or from a library of scenario templates previously defined by a user, then the current user may override the validation method previously associated with the scenario template (by the vendor, by another user, or by himself) and select a new validation method to be associated with the scenario template. The user selection may be temporary and be in effect only for a single campaign execution, or it may be permanent and stay in effect for all executions of campaigns that are based on the scenario template until a different selection is explicitly made.

In a second implementation of the third embodiment, the creator of a scenario template (either the vendor of the penetration testing system or a user of it) decides which method of validation is associated with the currently-created scenario template, and the user of the penetration testing system cannot later override this decision.

In any of the above embodiments, the considerations according to which a method of validation is selected for a given vulnerability, a given damaging operation, a given scenario template or a given campaign may be based on any type of reasoning. Specific examples are:
1. Based on the type of damaging operation caused to the tested networked system as a result of successfully exploiting the vulnerability.
2. Based on the probability of being successful in exploiting the vulnerability.
3. Based on the importance of the vulnerability (for example, a vulnerability that is frequently used by attackers in recent weeks vs. a vulnerability that is rarely used).
4. Based on the level of reliability desired for the conclusion of the validation of the vulnerability.
5. Based on the goal of the attacker of the campaign or the scenario template.
6. Based on the time of day of executing the campaign.
7. Based on a weighted combination of two or more of the above factors.

Figure 12:
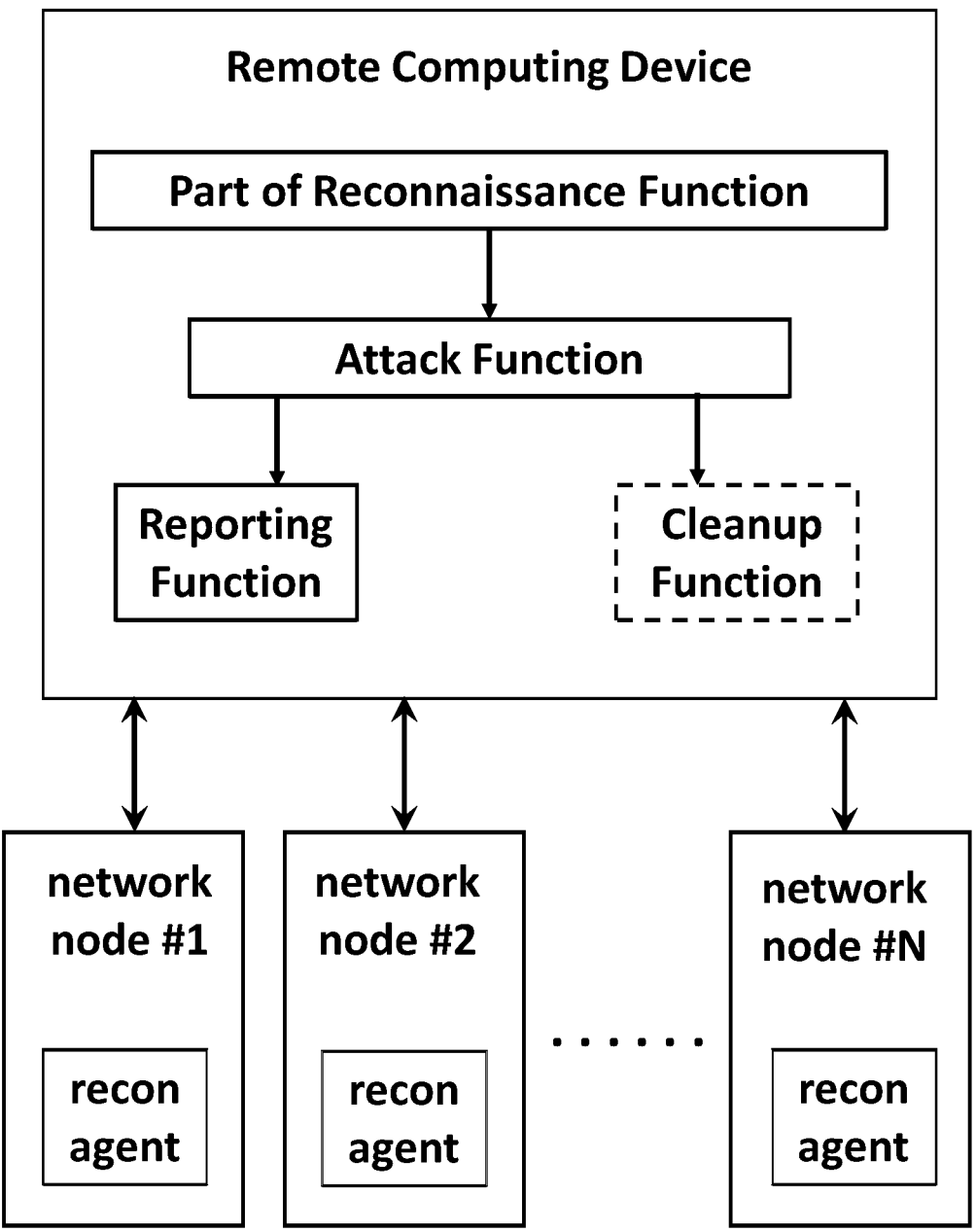
FIG. 12 is a block diagram of reconnaissance agent penetration testing.

As an example, in a penetration testing system that employs local reconnaissance agents installed in network nodes of the tested networked system (as shown in FIG. 12, and as disclosed in U.S. patent application Ser. Nos. 15/681,782, 15/874,429, 15/940,376, and 15/983,309, and U.S. patent Ser. No. 10/038,711 which are all herein incorporated in this application by reference in their entirety), using the proposed solution results in the steps of each iteration of the penetration testing process being:
   a. Collecting data from the reconnaissance client agents installed on some or all already-compromised nodes.
   b. Based on the collected data (and the vulnerabilities knowledge base of the penetration testing system), choosing the network node that will be the next target node for compromising.
   c. Based on the chosen target node, choosing the vulnerability that is the most likely to succeed in compromising the chosen target node.
   d. Selecting the method of validation to be used for validating the success of the chosen vulnerability for the chosen target node. The selection is based on one or more of (i) the method of validation assigned to the chosen vulnerability, (ii) the method of validation assigned to the damaging operation associated with the chosen vulnerability, or (iii) the method of validation assigned to the current penetration testing campaign, depending on the embodiment.
   e. Validating the success of the chosen vulnerability for the chosen target node using the selected method of validation. If the selected method of validation is actual attack, then the validating includes attempting to exploit the vulnerability against the chosen target node and then collecting data from the reconnaissance client agent installed on the chosen target node. The collected data depends on the chosen vulnerability and includes data of the chosen target node that is relevant for checking the success of compromising the chosen target node by the chosen vulnerability. If the selected method of validation is simulation/evaluation, then the validating is achieved in the remote computing device of the penetration testing system, without attempting to exploit the vulnerability against the chosen target node. The validating may include collecting data from the reconnaissance client agent installed on the chosen target node.
   f. If necessary, updating the state of the campaign according to the result of the validation.
   g. If not end of campaign, proceed to the next iteration of the penetration testing campaign.

Second Additional Discussion

Figure 13B:
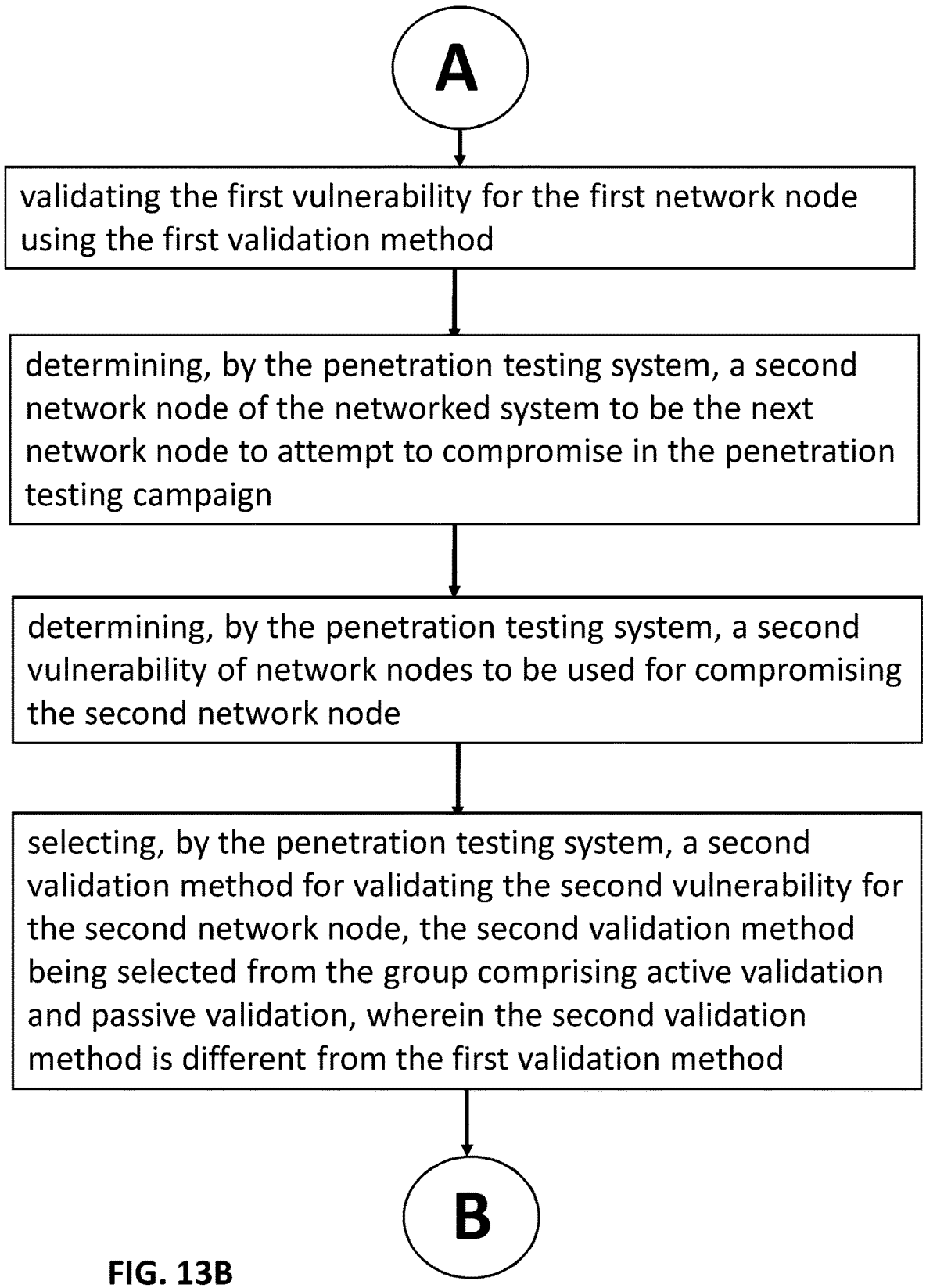
Figure 13C:
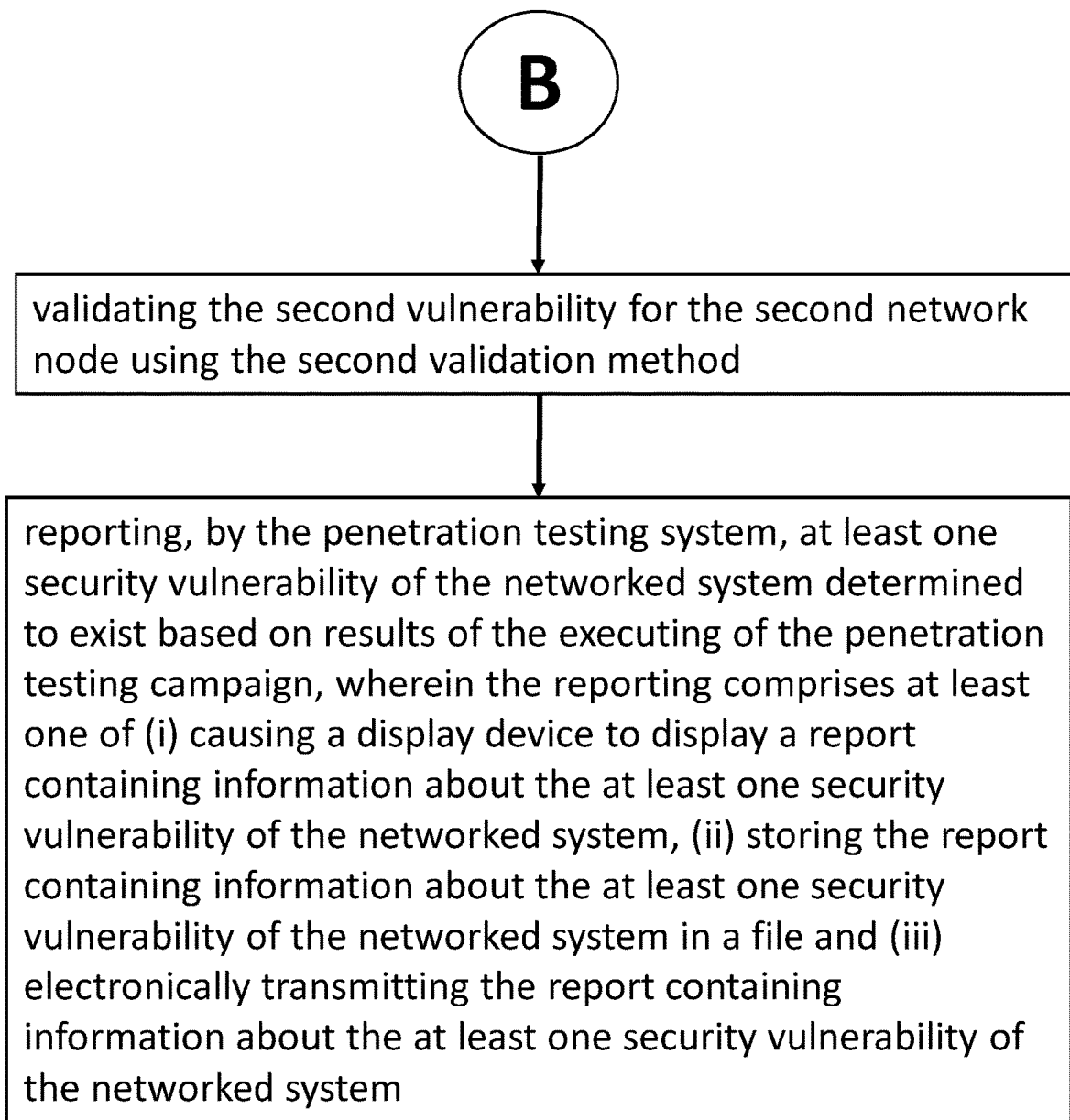
Figure 14B:
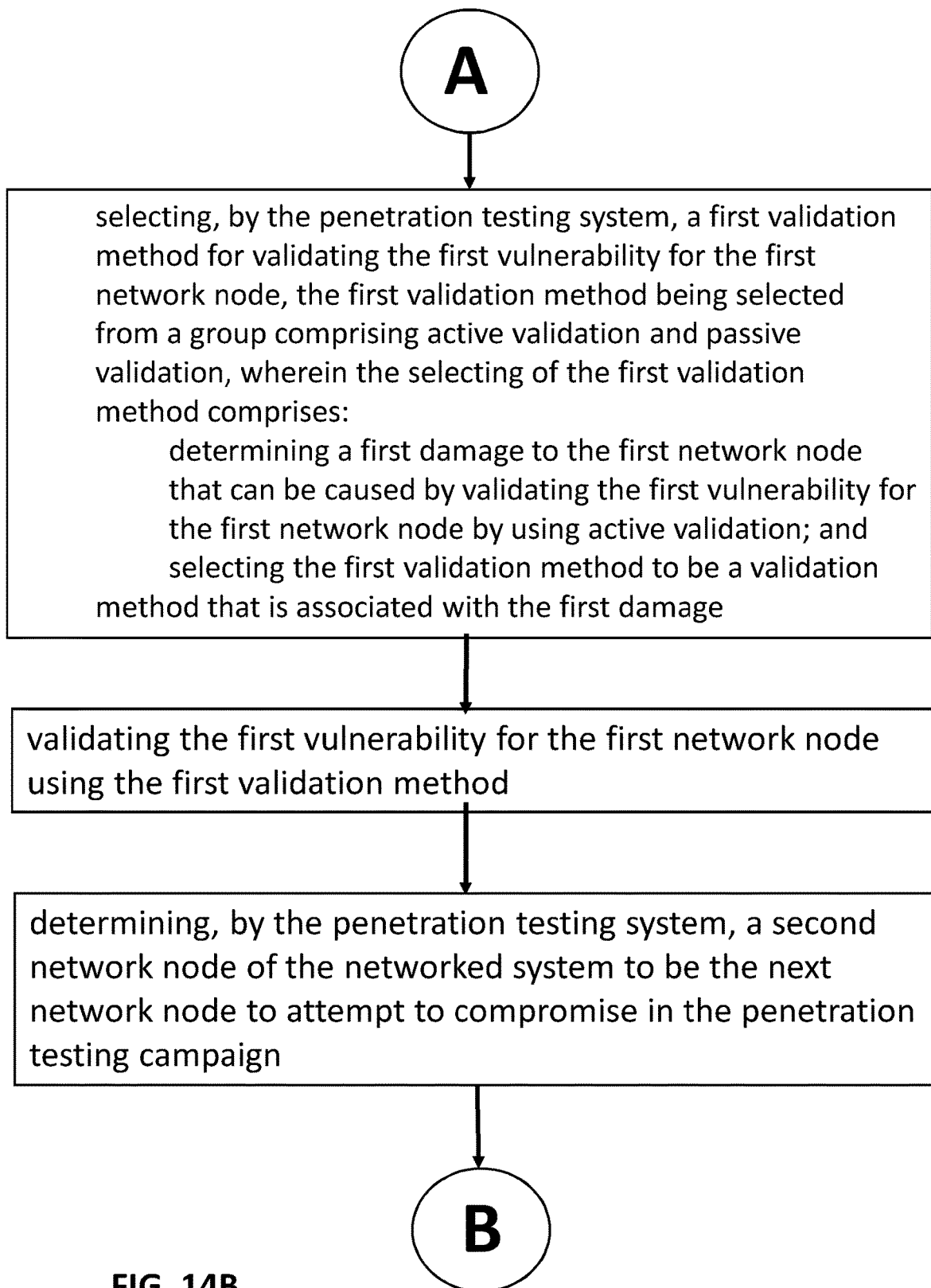
Figure 14C:
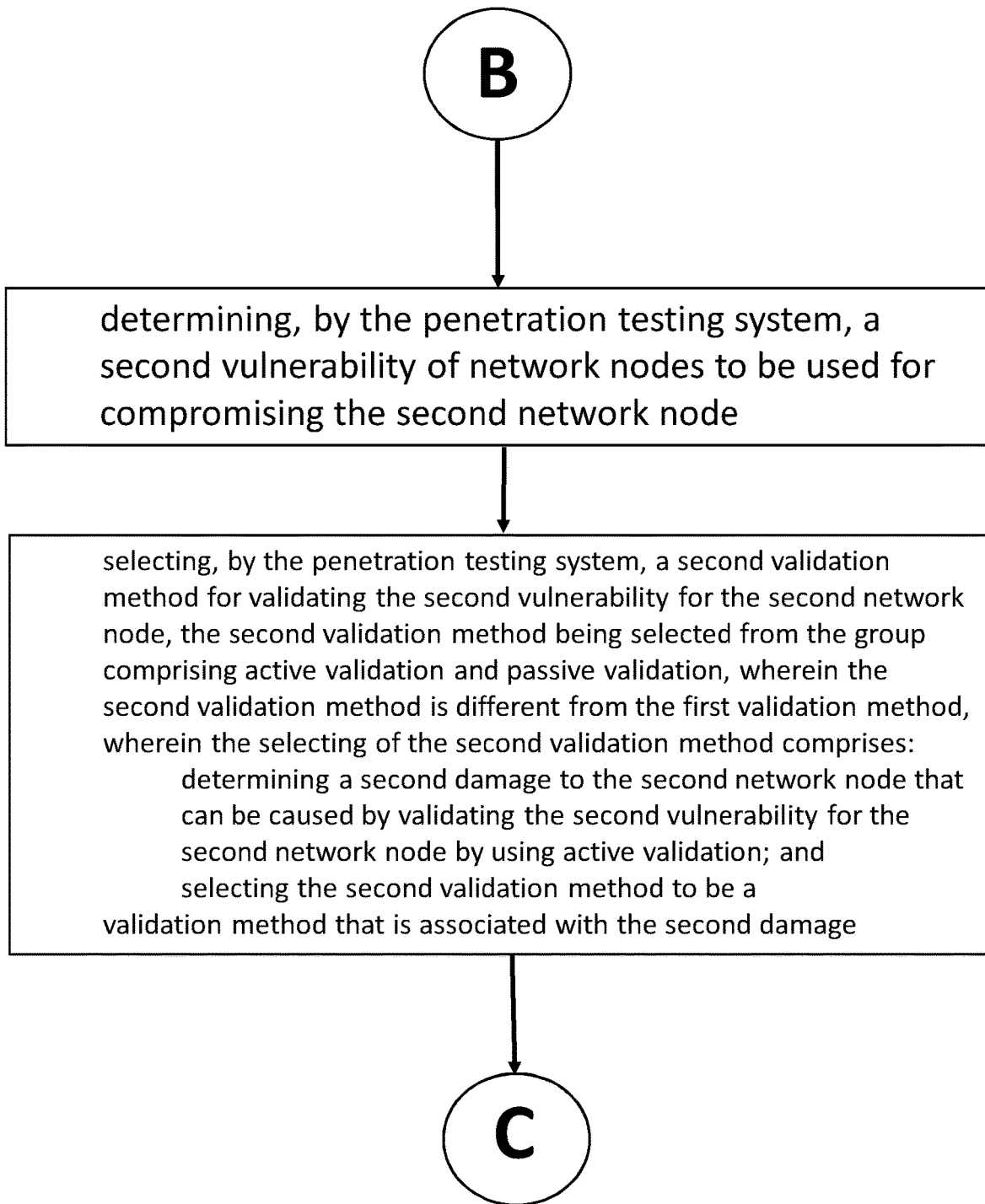
Figure 14D:
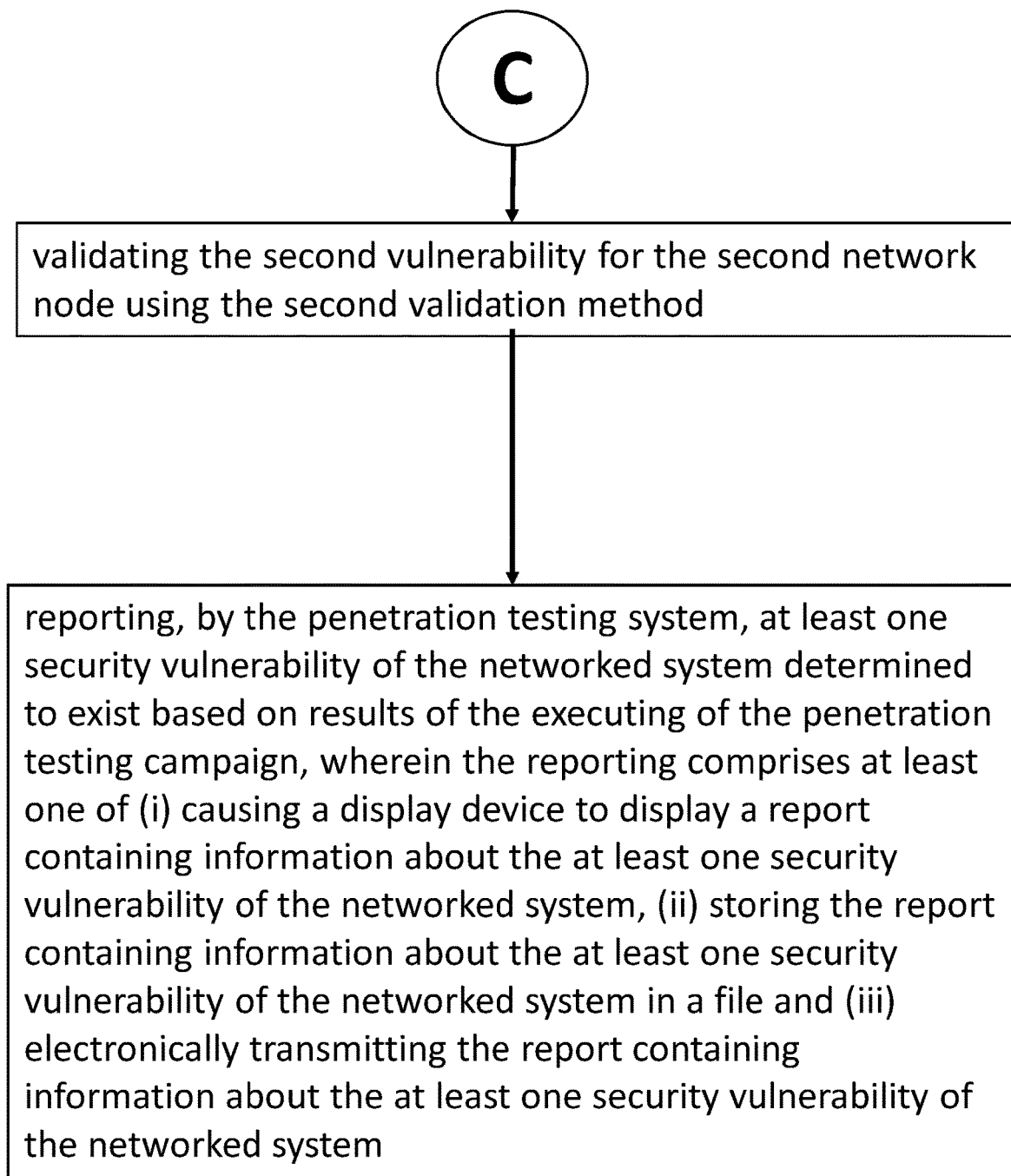
Figure 15B:
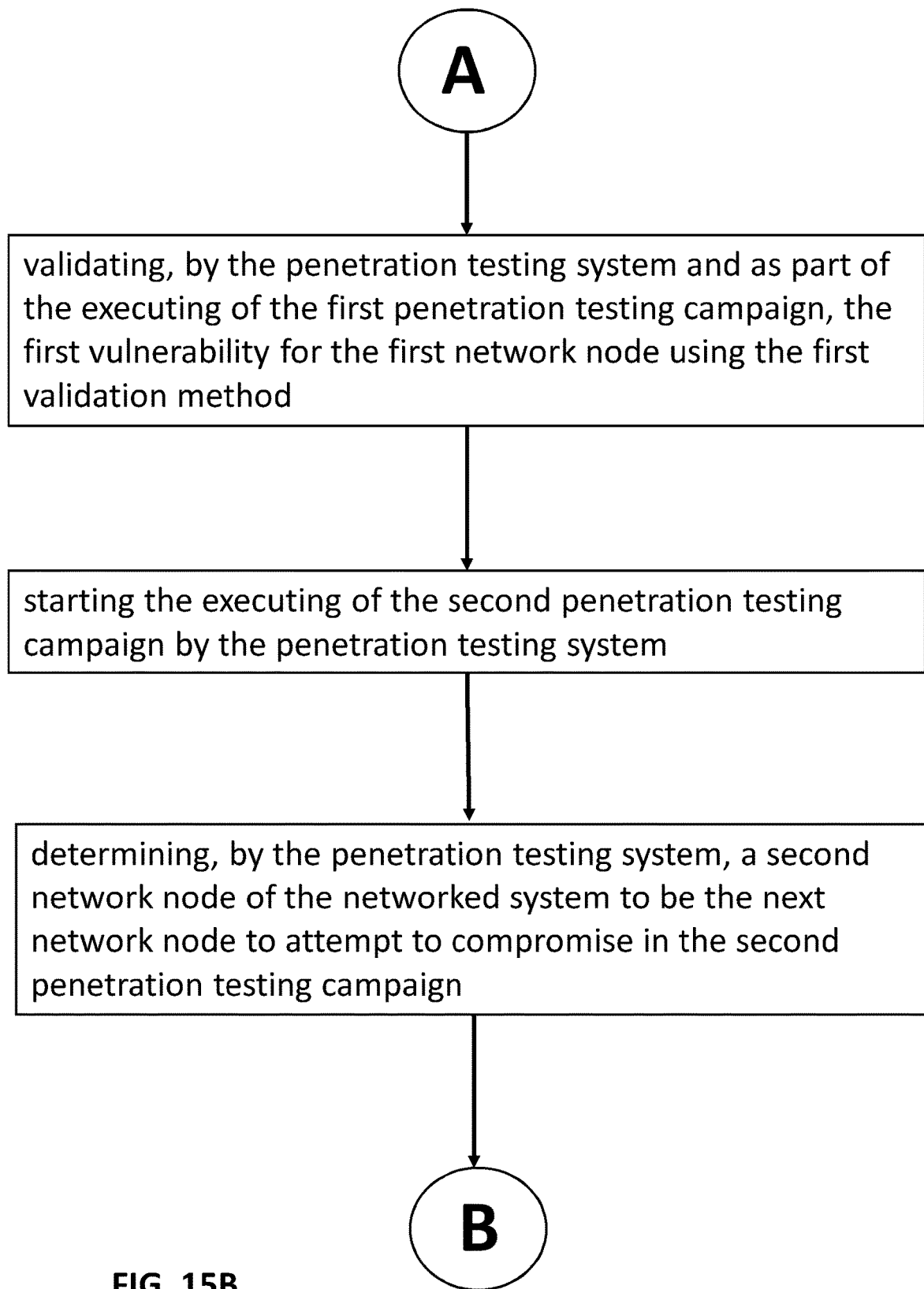
Figure 15C:
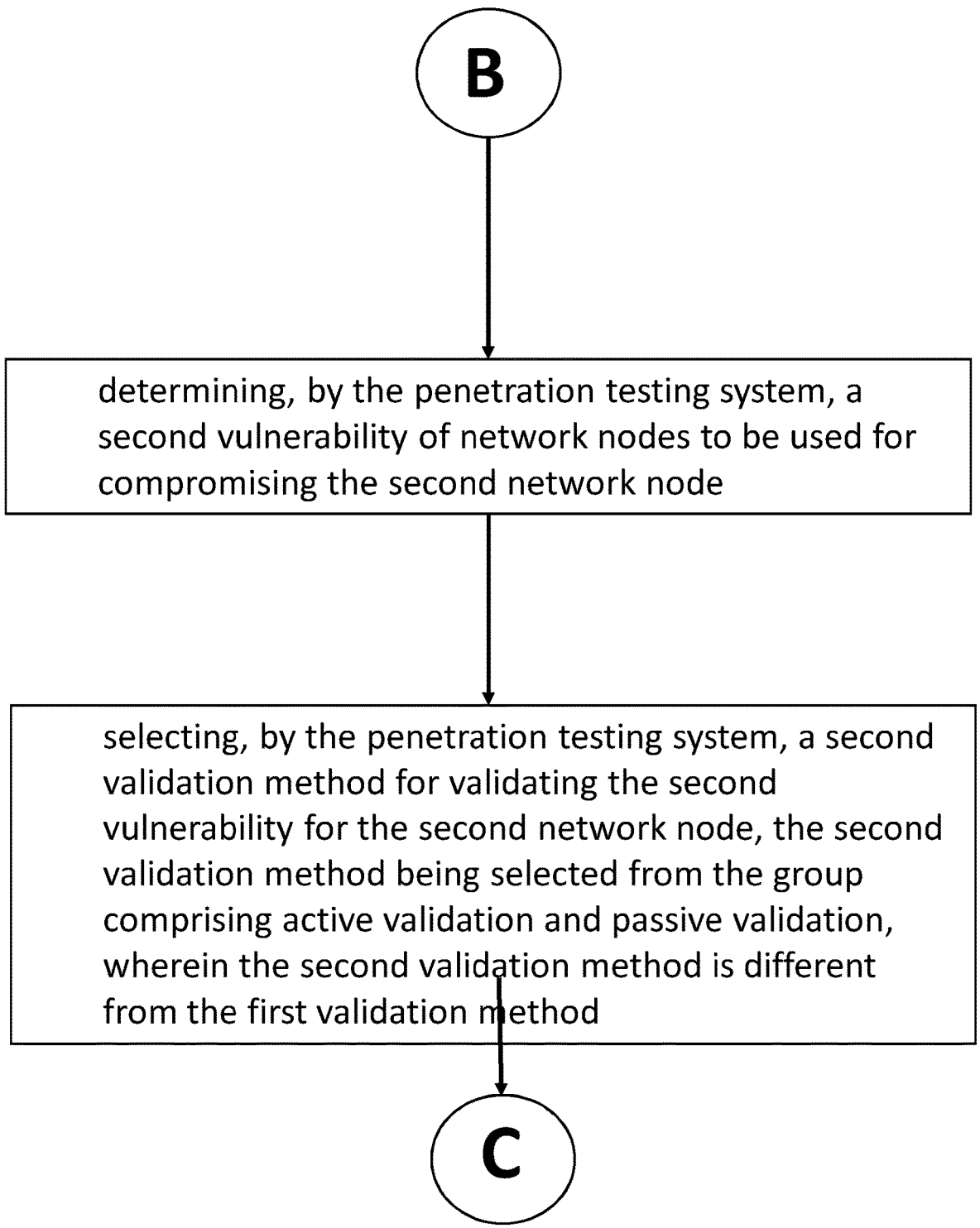
Figure 15D:
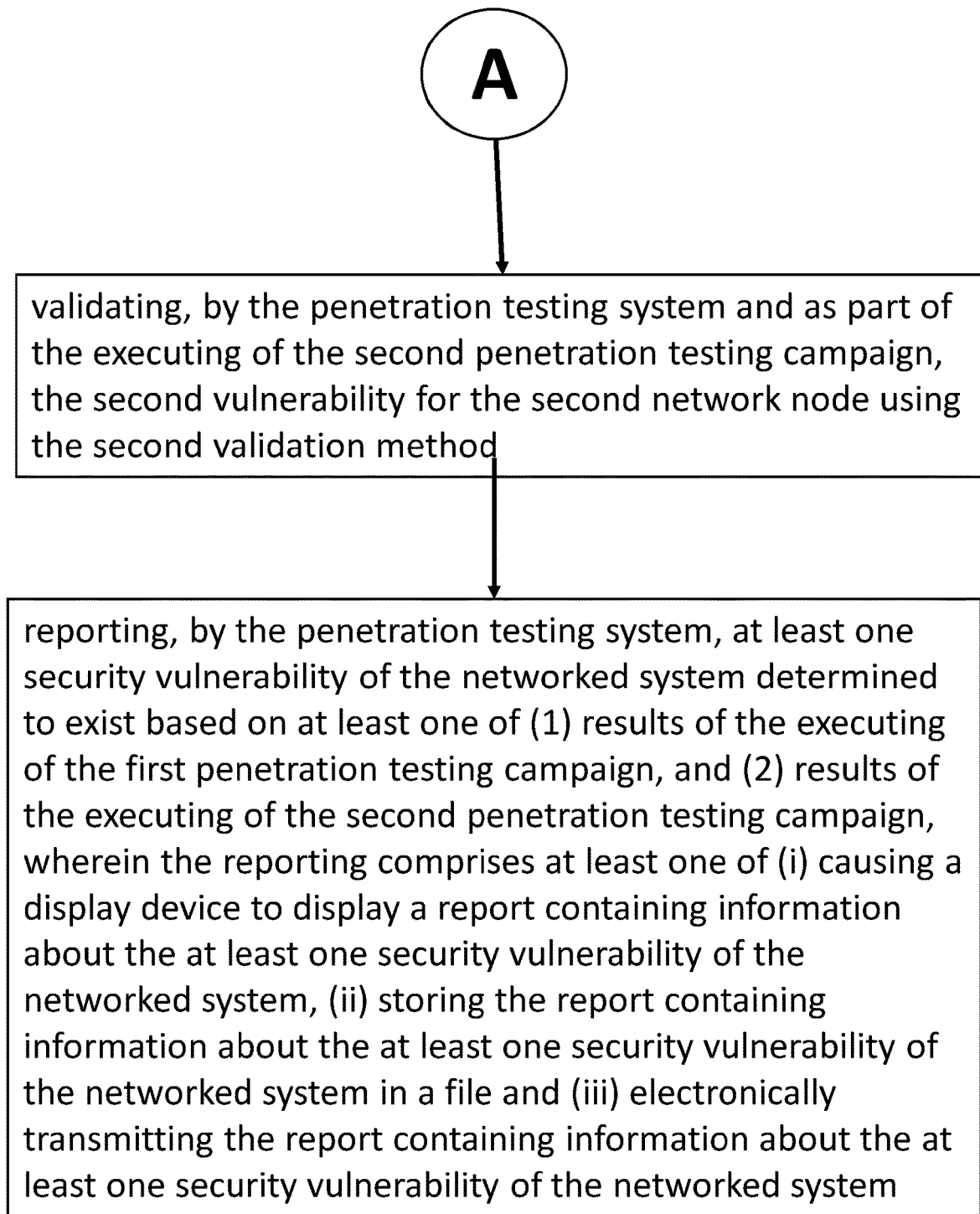

We propose a first method (see FIGS. 13A-13C) that is most useful for executing a penetration testing campaign for testing a networked system, wherein the executing of the penetration testing campaign includes validating two different vulnerabilities for corresponding two different network nodes of the networked system by two different validation methods, the method for executing the penetration testing campaign comprising:
   a. starting the executing of the penetration testing campaign by the penetration testing system;
   b. determining, by the penetration testing system, a first network node of the networked system to be the next network node to attempt to compromise in the penetration testing campaign;
   c. determining, by the penetration testing system, a first vulnerability of network nodes to be used for compromising the first network node;
   d. selecting, by the penetration testing system, a first validation method for validating the first vulnerability for the first network node, the first validation method being selected from a group comprising active validation and passive validation;
   e. validating the first vulnerability for the first network node using the first validation method;
   f. determining, by the penetration testing system, a second network node of the networked system to be the next network node to attempt to compromise in the penetration testing campaign;
   g. determining, by the penetration testing system, a second vulnerability of network nodes to be used for compromising the second network node;
   h. selecting, by the penetration testing system, a second validation method for validating the second vulnerability for the second network node, the second validation method being selected from the group comprising active validation and passive validation, wherein the second validation method is different from the first validation method;
   i. validating the second vulnerability for the second network node using the second validation method;

j. reporting, by the penetration testing system, at least one security vulnerability of the networked system determined to exist based on results of the executing of the penetration testing campaign, wherein the reporting comprises at least one of (i) causing a display device to display a report containing information about the at least one security vulnerability of the networked system, (ii) storing the report containing information about the at least one security vulnerability of the networked system in a file and (iii) electronically transmitting the report containing information about the at least one security vulnerability of the networked system.

The identity of the first vulnerability may uniquely determine the first validation method, and the identity of the second vulnerability may uniquely determine the second validation method.

The penetration testing system may be controlled by a user interface of a computing device, and the method for executing the penetration testing campaign may further comprise:
  k. receiving, by the penetration testing system and via the user interface of the computing device, one or more manually-entered inputs, the one or more manually-entered inputs explicitly defining at least one of (i) a validation method to be used for validating the first vulnerability, and (ii) a validation method to be used for validating the second vulnerability.

We also propose a second method (see FIGS. 14A-14D) that is most useful for executing a penetration testing campaign for testing a networked system, wherein the executing of the penetration testing campaign includes validating two different vulnerabilities for corresponding two different network nodes of the networked system by two different validation methods, the method for executing the penetration testing campaign comprising:
  a. starting the executing of the penetration testing campaign by the penetration testing system;
  b. determining, by the penetration testing system, a first network node of the networked system to be the next network node to attempt to compromise in the penetration testing campaign;
  c. determining, by the penetration testing system, a first vulnerability of network nodes to be used for compromising the first network node;
  d. selecting, by the penetration testing system, a first validation method for validating the first vulnerability for the first network node, the first validation method being selected from a group comprising active validation and passive validation, wherein the selecting of the first validation method comprises:
    i. determining a first damage to the first network node that can be caused by validating the first vulnerability for the first network node by using active validation;
    ii. selecting the first validation method to be a validation method that is associated with the first damage;
  e. validating the first vulnerability for the first network node using the first validation method;
  f. determining, by the penetration testing system, a second network node of the networked system to be the next network node to attempt to compromise in the penetration testing campaign;
  g. determining, by the penetration testing system, a second vulnerability of network nodes to be used for compromising the second network node;
  h. selecting, by the penetration testing system, a second validation method for validating the second vulnerability for the second network node, the second validation method being selected from the group comprising active validation and passive validation, wherein the second validation method is different from the first validation method, wherein the selecting of the second validation method comprises:
    i. determining a second damage to the second network node that can be caused by validating the second vulnerability for the second network node by using active validation;
    ii. selecting the second validation method to be a validation method that is associated with the second damage;
  i. validating the second vulnerability for the second network node using the second validation method;
  j. reporting, by the penetration testing system, at least one security vulnerability of the networked system determined to exist based on results of the executing of the penetration testing campaign, wherein the reporting comprises at least one of (i) causing a display device to display a report containing information about the at least one security vulnerability of the networked system, (ii) storing the report containing information about the at least one security vulnerability of the networked system in a file and (iii) electronically transmitting the report containing information about the at least one security vulnerability of the networked system.

The identity of the first damage may uniquely determine the first validation method, and the identity of the second damage may uniquely determine the second validation method. The penetration testing system may be controlled by a user interface of a computing device, and the method for executing the penetration testing campaign may further comprise:
  k. receiving, by the penetration testing system and via the user interface of the computing device, one or more manually-entered inputs, the one or more manually-entered inputs explicitly defining at least one of (i) a validation method associated with the first damage, and (ii) a validation method associated with the second damage.

We also propose a third method (see FIGS. 15A-15D) that is most useful for executing penetration testing campaigns for testing a networked system, wherein the executing of the penetration testing campaigns includes executing a first penetration testing campaign using a first validation method for validating vulnerabilities of network nodes of the networked system, and executing a second penetration system campaign for testing the networked system using a second validation method for validating vulnerabilities of network nodes of the networked system, the second validation method being different from the first validation method, the method for executing the penetration testing campaigns comprising:
  a. starting the executing of the first penetration testing campaign by the penetration testing system;
  b. determining, by the penetration testing system, a first network node of the networked system to be the next network node to attempt to compromise in the first penetration testing campaign;
  c. determining, by the penetration testing system, a first vulnerability of network nodes to be used for compromising the first network node;
  d. selecting, by the penetration testing system, a first validation method for validating the first vulnerability for the first network node, the first validation method being selected from a group comprising active validation and passive validation;
e. validating, by the penetration testing system and as part of the executing of the first penetration testing campaign, the first vulnerability for the first network node using the first validation method;
f. starting the executing of the second penetration testing campaign by the penetration testing system;
g. determining, by the penetration testing system, a second network node of the networked system to be the next network node to attempt to compromise in the second penetration testing campaign;
h. determining, by the penetration testing system, a second vulnerability of network nodes to be used for compromising the second network node;
i. selecting, by the penetration testing system, a second validation method for validating the second vulnerability for the second network node, the second validation method being selected from the group comprising active validation and passive validation, wherein the second validation method is different from the first validation method;
j. validating, by the penetration testing system and as part of the executing of the second penetration testing campaign, the second vulnerability for the second network node using the second validation method;
k. reporting, by the penetration testing system, at least one security vulnerability of the networked system determined to exist based on at least one of (1) results of the executing of the first penetration testing campaign, and (2) results of the executing of the second penetration testing campaign, wherein the reporting comprises at least one of (i) causing a display device to display a report containing information about the at least one security vulnerability of the networked system, (ii) storing the report containing information about the at least one security vulnerability of the networked system in a file and (iii) electronically transmitting the report containing information about the at least one security vulnerability of the networked system.

In a first case, the first penetration testing campaign may be based on a first scenario template, the second penetration testing campaign may be based on a second scenario template, and the second scenario template may be different from the first scenario template.

In that first case, the identity of the first scenario template may uniquely determine the first validation method, and the identity of the second scenario template may uniquely determine the second validation method.

Also in that first case, the penetration testing system may be controlled by a user interface of a computing device, and the method for executing the penetration testing campaigns may further comprise:
  l. receiving, by the penetration testing system and via the user interface of the computing device, one or more manually-entered inputs, the one or more manually-entered inputs explicitly defining at least one of (i) a validation method to be used for validating vulnerabilities in a penetration testing campaign that is based on the first scenario template, and (ii) a validation method to be used for validating vulnerabilities in a penetration testing campaign that is based on the second scenario template.

Also in that first case, the one or more manually-entered inputs may explicitly define at least one of (i) a validation method to be used for validating vulnerabilities in all penetration testing campaigns that are based on the first scenario template, and (ii) a validation method to be used for validating vulnerabilities in all penetration testing campaigns that are based on the second scenario template.

In a second case, the first penetration testing campaign and the second penetration testing campaign may be both based on a common scenario template.

In that second case, the penetration testing system may be controlled by a user interface of a computing device, and the method for executing the penetration testing campaigns may further comprise:
  l. receiving, by the penetration testing system and via the user interface of the computing device, one or more manually-entered inputs, the one or more manually-entered inputs explicitly defining a validation method to be used for validating vulnerabilities in a penetration testing campaign that is based on the common scenario template.

Also in that second case, the one or more manually-entered inputs may explicitly define a validation method to be used for validating vulnerabilities in all penetration testing campaigns that are based on the common scenario template.

Definitions

This disclosure should be interpreted according to the definitions below.

In case of a contradiction between the definitions in this Definitions section and other sections of this disclosure, this section should prevail.

In case of a contradiction between the definitions in this section and a definition or a description in any other document, including in another document incorporated in this disclosure by reference, this section should prevail, even if the definition or the description in the other document is commonly accepted by a person of ordinary skill in the art.

1. "computing device"—Any device having a processing unit into which it is possible to install code that can be executed by the processing unit. The installation of the code may be possible even while the device is operative in the field or it may be possible only in the factory.
2. "peripheral device"—Any device, whether a computing device or not, that provides input or output services to at least one other device that is a computing device. Examples of peripheral devices are printers, plotters, scanners, environmental sensors, smart-home controllers, digital cameras, speakers and display screens. A peripheral device may be directly connected to a single computing device or may be connected to a communication system through which it can communicate with one or more computing devices. A storage device that is (i) not included in or directly connected to a single computing device, and (ii) accessible by multiple computing devices, is a peripheral device.
3. "network" or "computing network"—A collection of computing devices and peripheral devices which are all connected to common communication means that allow direct communication between any two of the devices without requiring passing the communicated data through a third device. The network includes both the connected devices and the communication means. A network may be wired or wireless or partially wired and partially wireless.
4. "networked system" or "networked computing system"—One or more networks that are interconnected so that communication is possible between any two devices of the one or more networks, even if they do not belong to the same network. The connection between different networks of the networked system may be achieved through dedicated computing devices, and/or through computing devices that belong to multiple networks of the networked system and also have other functionality in addition to connecting between networks. The networked system includes the one or more networks, any connecting computing devices and also peripheral devices accessible by any computing device of the networked system. Note that a single network is a networked system having only one network, and therefore a network is a special case of a networked system.

5. "module"—A portion of a system that implements a specific task. A module may be composed of hardware, software or any combination of both. For example, in a module composed of both hardware and software, the hardware may include a portion of a computing device, a single computing device or multiple computing devices, and the software may include software code executed by the portion of the computing device, by the single computing device or by the multiple computing devices. A computing device associated with a module may include one or more processors and computer readable storage medium (non-transitory, transitory or a combination of both) for storing instructions or for executing instructions by the one or more processors.

6. "network node of a networked system" or "node of a networked system"—Any computing device or peripheral device that belongs to the networked system.

7. "security vulnerability of a network node" or "vulnerability of a network node"-A weakness which allows an attacker to compromise the network node. A vulnerability of a network node may be caused by one or more of a flawed configuration of a component of the network node, a flawed setting of a software module in the network node, a bug in a software module in the network node, a human error while operating the network node, having trust in an already-compromised other network node, and the like.

A weakness that allows an attacker to compromise a network node only conditionally, depending on current conditions in the network node or in the networked system in which the network node resides, is still a vulnerability of the network node, but may also be referred to as a "potential vulnerability of the network node". For example, a vulnerability that compromises any network node running the Windows 7 Operating System, but only if the network node receives messages through a certain Internet port, can be said to be a vulnerability of any Windows 7 network node, and can also be said to be a potential vulnerability of any such node. Note that in this example the potential vulnerability may fail in compromising the node either because the certain port is not open (a condition in the node) or because a firewall is blocking messages from reaching the certain port in the node (a condition of the networked system).

8. "security vulnerability of a networked system" or "vulnerability of a networked system"—A weakness which allows an attacker to compromise the networked system. A vulnerability of a networked system may be caused by one or more of a vulnerability of a network node of the networked system, a flawed configuration of a component of the networked system, a flawed setting of a software module in the networked system, a bug in a software module in the networked system, a human error while operating the networked system, and the like.

A weakness that allows an attacker to compromise a networked system only conditionally, depending on current conditions in the networked system, is still a vulnerability of the networked system, but may also be referred to as a "potential vulnerability of the networked system". For example, if a network node of the networked system has a potential vulnerability then that vulnerability can be said to be a vulnerability of the networked system, and can also be said to be a potential vulnerability of the networked system.

9. "validating a vulnerability" or "validating a potential vulnerability" (for a given network node or for a given networked system)—Verifying that the vulnerability compromises the given network node or the given networked system under the conditions currently existing in the given network node or the given networked system.

The validation of the vulnerability may be achieved by actively attempting to compromise the given network node or the given networked system and then checking if the compromising attempt was successful. Such validation is referred to as "active validation".

Alternatively, the validation of the vulnerability may be achieved by simulating the exploitation of the vulnerability or by otherwise evaluating the results of such exploitation without actively attempting to compromise the given network node or the given networked system. Such validation is referred to as "passive validation". Note that just assuming that a vulnerability will succeed in compromising a given network node or a given networked system under current conditions without executing either active validation or passive validation, is not considered as validating the vulnerability.

10. "vulnerability management"—A cyclical practice of identifying, classifying, remediating, and mitigating vulnerabilities of network nodes in a networked system.

11. "penetration testing" or "pen testing" (in some references also known as "red team assessment" or "red team testing", but in other references those terms referring to a red team have a different meaning than "penetration testing")—A process in which a networked system is evaluated in order to determine if it can be compromised by an attacker by utilizing one or more security vulnerabilities of the networked system. If it is determined that the networked system can be compromised, then the one or more security vulnerabilities of the networked system are identified and reported.

Unlike a vulnerability management process which operates at the level of isolated vulnerabilities of individual network nodes, a penetration test may operate at a higher level which considers vulnerabilities of multiple network nodes that might be jointly used by an attacker to compromise the networked system.

A penetration testing process involves at least the following functions: (i) a reconnaissance function, (ii) an attack function, and (iii) a reporting function. It should be noted that the above functions do not necessarily operate sequentially according to the above order, but may operate in parallel or in an interleaved mode.

Unless otherwise explicitly specified, a reference to penetration testing should be understood as referring to automated penetration testing.

12. "automated penetration testing"—Penetration testing in which at least one of the reconnaissance function, the attack function and the reporting function is at least partially automated.

13. "penetration testing system"—A system capable of performing penetration testing, regardless if composed of hardware, software or combination of both.

14. "reconnaissance function" or "recon function"—The function in a penetration testing process that handles collection of data about the tested networked system. The collected data may include internal data of one or more network nodes of the tested networked system. Additionally, the collected data may include data about communication means of the tested networked system and about peripheral devices of the tested networked system. The collected data may also include data that is only indirectly related to the tested networked system, for example business intelligence data about the organization owning the tested networked system, collected in order to use it for assessing importance of resources of the networked system.

The functionality of a reconnaissance function may be implemented by any combination of (i) software executing in a remote computing device, where the remote computing device may probe the tested networked system for the purpose of collecting data about it, (ii) hardware and/or software simulating or duplicating the tested networked system, (iii) a reconnaissance agent software module executing in one or more network nodes of the tested networked system.

15. "attack function"—The function in a penetration testing process that handles determination of whether one or more security vulnerabilities exist in the tested networked system. The determination is based on data collected by the reconnaissance function of the penetration testing. The attack function generates data about each of the identified security vulnerabilities, if any.

The functionality of an attack function may be implemented by any combination of (i) software executing in a remote computing device, where the remote computing device may attack the tested networked system for the purpose of verifying that it can be compromised, (ii) hardware and/or software simulating or duplicating the tested networked system, (iii) an attack agent software module executing in one or more network nodes of the tested networked system.

The methods used by an attack function may include executing a real attack on the tested networked system by attempting to change at least one setting, mode or state of a network node or of a hardware or software component of a network node, in order to verify that the tested networked system may be compromised. In such case, the attempt may result in actually compromising the tested networked system. Alternatively, the methods used by an attack function may be such that whenever there is a need to verify whether a setting, a mode or a state of a network node or of a hardware or software component of a network node can be changed in a way that compromises the tested networked system, the verification is done by simulating the effects of the change or by otherwise evaluating them without ever actually compromising the tested networked system.

16. "reporting function"—The function in a penetration testing process that handles reporting of results of the penetration testing. The reporting comprises at least one of (i) causing a display device to display a report including information about the results of the penetration testing, (ii) recording a report including information about the results of the penetration testing in a file, and (iii) electronically transmitting a report including information about the results of the penetration testing.

The functionality of a reporting function may be implemented by software executing in a remote computing device, for example in the computing device implementing the attack function of the penetration testing.

17. "recovery function" or "clean-up function"—The function in a penetration testing process that handles cleaning-up after a penetration test. The recovery includes undoing any operation done during the penetration testing process that results in compromising the tested networked system.

The functionality of a recovery function may be implemented by any combination of (i) software executing in a remote computing device, for example in the computing device implementing the attack function of the penetration testing, (ii) an attack agent software module executing in one or more network nodes of the tested networked system.

18. "a campaign of penetration testing" or "penetration testing campaign" or just "campaign"—A specific run of a specific test of a specific networked system by the penetration testing system.

An execution of a campaign must end by one of the following: (i) determining by the penetration testing system that the goal of the attacker was reached by the campaign, (ii) determining by the penetration testing system that the goal of the attacker cannot be reached by the campaign, (iii) if the campaign is assigned a time limit, exceeding the time limit by the campaign, and (iv) manually terminating the campaign by a user of the penetration testing system.

19. "results of a penetration testing campaign"—Any output generated by the penetration testing campaign. This includes, among other things, data about any security vulnerability of the networked system tested by the penetration testing campaign that is detected by the campaign. It should be noted that in this context the word "results" is used in its plural form regardless of the amount of output data generated by the penetration testing campaign, including when the output consists of data about a single security vulnerability.

20. "information item of a campaign"—A variable data item that a penetration testing system must know its value before executing the campaign. Note that a data item must be able to have different values at different campaigns in order to be considered an information item of the campaign. If a data item always has the same value for all campaigns, it is not an information item of the campaign, even if it must be known and is being used by the penetration testing system when executing the campaign.

An information item of a campaign is either a primary information item of the campaign or a secondary information item of the campaign.

A type of an attacker and a goal of an attacker are examples of information items of a campaign. Another example of an information item of a campaign that is more complex than the previous two simple examples is a subset of the network nodes of the networked system that is assumed to be already compromised at the time of beginning the penetration testing campaign, with the subset defined either by an explicit selection of network nodes or by a Boolean condition each node of the subset has to satisfy.

A value of an information item may be composed either of a simple value or of both a main value and one or more auxiliary values. If a specific main value of an information item requires one or more auxiliary values that complete the full characterization of the value, then the combination of the main value and the one or more auxiliary values together is considered to be the value assigned to the information item. For example, for a "goal of the attacker" information item, after a user selects a main value of "exporting a specific file from whatever node having a copy of it", the user still has to provide a file name as an auxiliary value in order for the goal information item to be fully characterized. In this case the combination of "exporting a specific file from whatever node having a copy of it" and the specific file name is considered to be the value of the "goal of the attacker" information item.

21. "primary information item of a campaign"—An information item of the campaign which is completely independent of previously selected values of other information items of the campaign. In other words, the options available to a user for selecting the value of a primary information item of the campaign are not dependent on any value previously selected for any another information item of the campaign. For example, the options available to the user for selecting a goal of the attacker are independent of values previously selected for any other information item of the campaign, and therefore the goal of the attacker is a primary information item of the campaign.

22. "secondary information item of a campaign"—An information item of the campaign which depends on at least one previously selected value of another information item of the campaign. In other words, the options available to a user for selecting the value of a secondary information item of the campaign depend on at least one value previously selected for another information item of the campaign. For example, the options available to the user for selecting a capability of an attacker may depend on the previously selected value of the type of the attacker. For a first type of attacker the available capabilities to select from may be a first group of capabilities, while for a second type of attacker the available capabilities to select from may be a second group of capabilities, different from the first group. Therefore, a capability of the attacker is a secondary information item of the campaign.

23. "specifications of a campaign" or "scenario"—A collection of values assigned to all information items of the campaign. As having a value for each information item of a campaign is essential for running it, a campaign of a penetration testing system cannot be run without providing the penetration testing system with full specifications of the campaign. A value of an information item included in the specifications of a campaign may be manually selected by a user or may be automatically determined by the penetration testing system. In the latter case, the automatic determination by the system may depend on one or more values selected by the user for one or more information items of the campaign, or it may be independent of any selection by the user. For example, the selection of the capabilities of the attacker may automatically be determined by the system based on the user-selected type of the attacker, and the lateral movement strategy of the attacker may be automatically determined by the system independently of any user selection.

24. "pre-defined scenario", "pre-defined test scenario", "scenario template" or "template scenario"—A scenario that exists in storage accessible to a penetration testing system before the time a campaign is started, and can be selected by a user of the penetration testing system for defining a campaign of penetration testing. A pre-defined scenario may be created and provided by the provider of the penetration testing system and may be part of a library of multiple pre-defined scenarios. Alternatively, a pre-defined scenario may be created by the user of the penetration testing system using a scenario editor provided by the provider of the penetration testing system.

A penetration testing system may require that a campaign of penetration testing that is based on a pre-defined scenario must have all its values of information items taken from the pre-defined scenario, with no exceptions. Alternatively, a penetration testing system may allow a user to select a pre-defined scenario and then override and change one or more values of information items of a campaign that is based on the pre-defined scenario.

25. "attacker" or "threat actor"—An entity, whether a single person, a group of persons or an organization, that might conduct an attack against a networked system by penetrating it for uncovering its security vulnerabilities and/or for compromising it.

26. "a type of an attacker"—A classification of the attacker that indicates its main incentive in conducting attacks of networked systems. Typical values for a type of an attacker are state-sponsored, opportunistic cyber criminal, organized cyber criminal and insider.

An attacker can have only a single type.

27. "a capability of an attacker"—A tool in the toolbox of the attacker. A capability describes a specific action that the attacker can perform. Examples of capabilities are copying a local file of a network node and exporting it to the attacker out of the networked system and remotely collecting database information from an SQL server of the networked system. In some systems, selecting a type of an attacker causes a corresponding default selection of capabilities for that type of attacker, but the user may have an option to override the default selection and add or delete capabilities.

An attacker can have one or multiple capabilities.

28. "a goal of an attacker"—What the attacker of a campaign is trying to achieve when attacking a targeted networked system. In other words, what is the criterion according to which the attacker will judge whether the attack was a success or a failure and/or to what extent was it a success or a failure. Selecting a type of an attacker may cause a default selection of a goal for that attacker, but the user may have an option to override the default selection. An attacker can have one or multiple goals.

29. "a lateral movement strategy of an attacker"—A decision logic applied by the attacker of a campaign for selecting the next network node to try to compromise. During a penetration testing campaign, the attacker is assumed to make progress by an iterative process in which in each iteration he selects the next node to attack, based on the group of network nodes he already controls (i.e. that are already compromised). If the attack on the selected node is successful, that node is added to the group of nodes that are already compromised, and another iteration starts. If the attempt to compromise the selected node fails, another node is selected, either according to some other rule or randomly.

It should be noted that all types of penetration testing systems, whether using simulated penetration testing, actual attack penetration testing or some other form of penetration testing, must use a lateral movement strategy. In the case of a penetration testing system that actually attacks the tested networked system, the lateral movement strategy selects the path of attack actually taken through the networked system. In the case of a penetration testing system that simulates or evaluates the results of attacking the tested networked system, the lateral movement strategy selects the path of attack taken in the simulation or the evaluation through the networked system. Therefore in the above explanation, the term "attack" should be understood to mean "actual attack or simulated attack", the term "already controls" should be understood to mean "already controls or already determined to be able to control", the term "already compromised" should be understood to mean "already compromised or already determined to be compromisable", etc.

A simple example of a lateral movement strategy is a "depth first" strategy. In such strategy, the next network node to try to compromise is an immediate neighbor of the last network node that was compromised that is not yet compromised (provided such neighbor node exists). Two network nodes are "immediate neighbors" of each other if and only if they have a direct communication link between them that does not pass through any other network node.

Another simple example is a "breadth search" strategy. In such strategy, the next network node to try to compromise is a network node whose distance from the first node compromised by the campaign is the smallest possible. The distance between two network nodes is the number of network nodes along the shortest path between them, plus one. A path is an ordered list of network nodes in which each pair of adjacent nodes in the list is a pair of immediate neighbors. Thus, the distance between two immediate neighbors is one.

An example of a more advanced lateral movement strategy is a strategy that is applicable when a goal of the attacker is related to a resource of the networked system that resides in a specific network node. In such case the next network node to try to compromise may be selected by determining the shortest path in the networked system leading from an already compromised node to the specific node containing the desired resource, and picking the first node on this path to be the next node to try to compromise. Note that if the shortest path has a length of one (which happens when the specific node is an immediate neighbor of an already compromised node), then the next node to try to compromise is the specific node containing the desired resource. Another example of a lateral movement strategy is a strategy that gives priority to network nodes satisfying a specific condition, for example nodes that are known to have a specific weakness, such as running the Windows XP operating system. In such case the next node to try to compromise is a node that satisfies the condition and is also an immediate neighbor of an already compromised node (if such node exists). Selecting a type of an attacker may cause a default selection of a lateral movement strategy for that attacker, but the user may have an option to override the default selection.

An attacker can only have a single lateral movement strategy.

30. "penetration testing by simulation" or "simulated penetration testing"—Penetration testing in which (i) the functionality of the reconnaissance function is fully implemented by software executing by a remote computing device and/or by hardware and/or software simulating or duplicating the tested networked system, where the remote computing device may probe the tested networked system for the purpose of collecting data about it, as long as this is done without risking compromising the tested networked system, and (ii) the methods used by the attack function are such that whenever there is a need to verify whether a setting, a mode or a state of a network node or of a hardware or software component of a network node can be changed in a way that compromises the tested networked system, the verification is done by simulating the effects of the change or by otherwise evaluating them without risking compromising the tested networked system.

31. "penetration testing by actual attack" or "actual attack penetration testing" or "penetration testing by actual exploit" or "actual exploit penetration testing"—Penetration testing in which (i) the functionality of the reconnaissance function is fully implemented by (A) software executing in a remote computing device, where the remote computing device may probe the tested networked system for the purpose of collecting data about it even if this risks compromising the tested networked system, and/or by (B) software executing in one or more network nodes of the tested networked system that analyzes network traffic and network packets of the tested networked system for collecting data about it, and (ii) the methods used by the attack function include executing a real attack on the tested networked system by attempting to change at least one setting, mode or state of a network node or of a hardware or software component of a network node in order to verify that the tested networked system may be compromised, such that the attempt may result in compromising the tested networked system.

32. "penetration testing by reconnaissance agents" or "reconnaissance agent penetration testing"—Penetration testing in which (i) the functionality of the reconnaissance function is at least partially implemented by a reconnaissance agent software module installed and executed in each one of multiple network nodes of the tested networked system, where the data collected by at least one instance of the reconnaissance agent software module includes internal data of the network node in which it is installed, and the data collected by at least one instance of the reconnaissance agent software module is at least partially collected during the penetration testing process, and (ii) the methods used by the attack function are such that whenever there is a need to verify whether a setting, a mode or a state of a network node or of a hardware or software component of a network node can be changed in a way that compromises the tested networked system, this is done by simulating the effects of the change or by otherwise evaluating them without risking compromising the tested networked system.

33. "reconnaissance client agent", "reconnaissance agent" or "recon agent"—A software module that can be installed on a network node and can be executed by a processor of that network node for partially or fully implementing the reconnaissance function of a penetration test. A reconnaissance agent must be capable, when executed by a processor of the network node in which it is installed, of collecting data at least about some of the events occurring in the network node. Such events may be internal events of the network node or messages sent out of the network node or received by the network node. A reconnaissance agent may be capable of collecting data about all types of internal events of its hosting network node. Additionally, it may be capable of collecting other types of data of its hosting network node. A reconnaissance agent may additionally be capable of collecting data about other network nodes or about other components of a networked system containing the hosting network node. A reconnaissance agent may be persistently installed on a network node, where "persistently" means that once installed on a network node the reconnaissance agent survives a reboot of the network node. Alternatively, a reconnaissance agent may be non-persistently installed on a network node, where "non-persistently" means that the reconnaissance agent does not survive a reboot of the network node and consequently should be installed again on the network node for a new penetration test in which the network node takes part, if the network node was rebooted since the previous penetration test in which it took part.

34. "attack client agent" or "attack agent"—A software module that can be installed on a network node and can be executed by a processor of that network node for partially or fully implementing the attack function of a penetration test. Typically, an attack agent is installed by an actual attack penetration testing system in a network node that it had succeeded to compromise during a penetration test. Once installed on such network node, the attack agent may be used as a tool for compromising other network nodes in the same networked system. In such case, the attack agent may include code that when executed by a processor of the compromised network node compromises another network node that is adjacent to it in the networked system, possibly taking advantage of the high level of trust it may have from the point of view of the adjacent network node. Another type of an attack agent may include code that when executed by a processor of a network node determines whether that network node would be compromised if a given operation is performed.

35. "penetration testing software module" or "remote computing device penetration testing software module"—A software module that implements the full functionality of a penetration testing system, except for the functionality implemented by (i) reconnaissance agents, (ii) attack agents, and (iii) hardware and/or software simulating or duplicating the tested networked system, if such components are used in the implementation of the penetration testing system. The penetration testing software module may be installed and executed on a single computing device or comprise multiple software components that reside on multiple computing devices. For example, a first component of the penetration testing software module may implement part or all of the reconnaissance function and be installed and executed on a first computing device, a second component of the penetration testing software module may implement part or all of the attack function and be installed and executed on a second computing device, and a third component of the penetration testing software module may implement the reporting function and be installed and executed on a third computing device.

36. "internal data of a network node"—Data related to the network node that is only directly accessible to code executing by a processor of the network node and is only accessible to any code executing outside of the network node by receiving it from code executing by a processor of the network node. Examples of internal data of a network node are data about internal events of the network node, data about internal conditions of the network node, and internal factual data of the network node.

37. "internal event of/in a network node"—An event occurring in the network node whose occurrence is only directly detectable by code executing by a processor of the network node. Examples of an internal event of a network node are an insertion of a USB drive into a port of the network node, and a removal of a USB drive from a port of the network node. An internal event may be a free event or a non-free event.

It should be noted that the term "an event of X" refers to any occurrence of an event of the type X and not to a specific occurrence of it. For referring to a specific occurrence of an event of type X one should explicitly say "an occurrence of event of X". Thus, a software module which looks for detecting insertions of a USB drive into a port is "detecting an event of USB drive insertion", while after that module had detected such event it may report "an occurrence of an event of USB drive insertion".

38. "internal condition of/in a network node"—A Boolean condition related to the network node which can only be directly tested by code executing by a processor of the network node. Examples of an internal condition of a network node are whether the local disk of the terminal node is more than 98% full or not, and whether a USB drive is currently inserted in a port of the network node.

39. "internal factual data of/in a network node" or "internal facts of a network node"-Facts related to the network node which can only be directly found by code executing by a processor of the network node. Examples of factual data of a network node are the version of the firmware of a solid-state drive installed in the network node, the hardware version of a processor of the network node, and the amount of free space in a local disk of the network node.

40. "resource of a networked system"—A file in a network node of the networked system, a folder in a network node of the networked system, credentials of a user of the networked system, a peripheral device of a network node of the networked system, or a peripheral device directly attached to a network of the networked system.

41. "compromising a network node"—Successfully causing execution of an operation in the network node that is not allowed for the entity requesting the operation by the rules defined by an administrator of the network node, or successfully causing execution of code in a software module of the network node that was not predicted by the vendor of the software module. Examples for compromising a network node are reading a file without having read permission for it, modifying a file without having write permission for it, deleting a file without having delete permission for it, exporting a file out of the network node without having permission to do so, getting an access right higher than the one originally assigned without having permission to get it, getting a priority higher than the one originally assigned without having permission to get it, changing a configuration of a firewall network node such that it allows access to other network nodes that were previously hidden behind the firewall without having permission to do it, and causing execution of software code by utilizing a buffer overflow. As shown by the firewall example, the effects of compromising a certain network node are not necessarily limited to that certain network node. In addition, executing successful ARP spoofing, denial-of-service, man-in-the-middle or session-hijacking attacks against a network node are also considered compromising that network node, even if not satisfying any of the conditions listed above in this definition.

42. "ARP spoofing"—a technique for compromising a target network node in which an attacker sends a false Address Resolution Protocol (ARP) reply message to the target network node. The aim is to associate an attacker's MAC address (either a MAC address of the node sending the false ARP reply message or a MAC address of another node controlled by the attacker) with the IP address of another host, such as the default gateway, causing any traffic sent by the target node and meant for that IP address to be sent to the attacker instead. ARP spoofing may allow an attacker to intercept data frames on a network, modify the traffic, or stop all traffic to a certain node. Often the attack is used as an opening for other attacks, such as denial-of-service, man-in-the-middle, or session-hijacking attacks.

43. "denial-of-service attack"—a cyber-attack where an attacker seeks to make a service provided by a network node to other network nodes unavailable to its intended users either temporarily or indefinitely. The denial-of-service attack may be accomplished by flooding the node providing the targeted service with superfluous requests in an attempt to overload it and prevent some or all legitimate requests from being fulfilled. Alternatively, the denial-of-service attack may be accomplished by causing some or all of the legitimate requests addressed to the targeted service to not reach their destination.

44. "man-in-the-middle attack"—a cyber-attack where an attacker secretly relays and possibly alters the communication between two network nodes who believe they are directly communicating with each other. One example of man-in-the-middle attacks is active eavesdropping, in which the attacker makes independent connections with the victims and relays messages between them to make them believe they are communicating directly with each other, when in fact the entire communication session is controlled by the attacker. The attacker must be able to intercept all relevant messages passing between the two victims and inject new ones.

45. "session-hijacking attack"—a cyber-attack where a valid communication session between two network nodes in a networked system is used by an attacker to gain unauthorized access to information or services in the networked computer system.

46. "compromising a networked system"—Compromising at least one network node of the networked system or successfully causing execution of an operation in the networked system that is not allowed for the entity requesting the operation by the rules defined by an administrator of the networked system. Examples for operations in the networked system that may not be allowed are exporting a file out of the networked system without having permission to do so, sending a file to a network printer without having permission to do so, and copying a file from one network node to another network node without having permission to do so.

47. "compromising a software application"—Successfully causing the software application to execute an operation that is not allowed for the entity requesting the operation by the rules defined by an administrator of the network node on which the software application is installed or by a vendor of the software application, or successfully causing the execution of code in the software application that was not predicted by the vendor of the software application. Examples for compromising a software application are changing a configuration file controlling the operation of the software application without having permission for doing so, and activating a privileged function of the software application without having permission for doing so. In addition, causing the software application to execute a macro without checking rights of the macro code to do what it is attempting to do is also considered compromising that software application, even if not satisfying any of the conditions listed above in this definition.

48. "administrator of a network node"—Any person that is authorized, among other things, to define or change at least one rule controlling at least one of an access right, a permission, a priority and a configuration in the network node.

49. "administrator of a networked system"—Any person that is authorized, among other things, to define or change at least one rule controlling at least one of an access right, a permission, a priority and a configuration in the networked system. Note that an administrator of a networked system may also be an administrator of one or more of the network nodes of the networked system.

50. "remote computing device" or "penetration testing remote computing device" (with respect to a given networked system)—A computing device that executes software implementing part or all of the penetration testing software module that is used for testing the given networked system.

A remote computing device may be (i) outside of the given networked system, or (ii) inside the given networked system. In other words, a remote computing device is not necessarily physically remote from the given networked system. It is called "remote" to indicate its functionality is logically separate from the functionality of the given networked system.

A remote computing device may (i) be a dedicated computing device that is dedicated only to doing penetration testing, or (ii) also implement other functionality not directly related to penetration testing.

A remote computing device is not limited to be a single physical device with a single processing unit. It may be implemented by multiple separate physical devices packaged in separate packages that may be located at different locations. Each of the separate physical devices may include one or multiple processing units. A remote computing device may be (i) a physical computing device, or (ii) a virtual machine running inside a physical computing device on top of a hosting operating system.

51. "damaging a file"—Changing the file in a way that the file cannot be recovered to its original form without having extra information. Examples of specific ways of damaging a file are (i) deleting the file, (ii) removing the first 100 bytes of the file, (iii) changing the order of bytes in the file (without removing any of them), (iv) encrypting the file using a secret key, etc.

Note that changing the access rights of a file is not considered damaging the file.

52. "damaging a network node"—Carrying out an operation related to the network node that is not allowed by the owner of the network node and that causes a change of state in the network node or in some resource related to the network node.

Examples of operations damaging a network node are: (i) damaging a file residing in the network node, (ii) exporting a file (or a portion of it) residing in the network node out of the network node, (iii) shutting down the network node, (iv) shutting down or disabling a service provided by the network node, or (v) closing or disabling a software application executing in the network node.

53. "explicitly selecting"—Directly and clearly selecting, by a human user, of one option out of multiple options available to the human user, leaving no room for doubt and not relying on making deductions by a computing device.

Examples of explicit selections are (i) selection of a specific type of an attacker from a drop-down list of types, (ii) selection of specific one or more attacker capabilities by marking one or more check boxes in a group of multiple check boxes corresponding to multiple attacker capabilities, and (iii) reception for viewing by a user of a recommendation automatically computed by a computing device for a value of an information item and actively approving by the user of the recommendation for using the value, provided that the approving user has an option of rejecting the recommendation and selecting a different value for the information item.

Examples of selections that are not explicit selections are (i) selection of specific one or more attacker capabilities by selecting a specific scenario of a penetration testing system from a pre-defined library of scenarios, where the specific scenario includes an attacker having the one or more capabilities, and (ii) selection of specific one or more attacker capabilities by selecting a specific goal of an attacker, accompanied by a deduction by a computing device concluding that the specific one or more attacker capabilities must be selected because they are essential for the attacker to succeed in meeting the specific goal.

54. "automatically selecting"—Selecting, by a computing device, of one option out of multiple options, without receiving from a human user an explicit selection of the selected option. It should be noted that the selecting of an option is an automatic selecting even if the computing device is basing the selection on one or more explicit selections by the user, as long as the selected option itself is not explicitly selected by the user. It should also be noted that receiving from a user of an approval for a recommendation which is otherwise automatically selected without giving the user an ability to override the recommendation does not make the selection a non-automatic selection.

An example of an automatic selection is a selection by a computing device of one or more attacker capabilities by (a) receiving from a user an explicit selection of a specific scenario of a penetration testing system from a pre-defined library of scenarios, (b) determining by the computing device that the specific scenario includes an attacker having the one or more capabilities, and (c) deducing by the computing device that the user wants to select the one or more attacker capabilities.

An example of a selection that is not an automatic selection is a selection of a value for an information item by (a) calculating by a computing device of a recommended value for the information item, (b) displaying the recommendation to a user, and (c) receiving from the user an explicit approval to use the recommended value of the information item, provided that the approving user has an option of rejecting the recommendation and selecting a different value for the information item.

55. "defensive application"—A software application whose task is to defend the network node in which it is installed against potential attackers. A defensive application may be a passive defensive application, in which case it only detects and reports penetration attempts into its hosting network node but does not attempt to defend against the detected attacks. Alternatively, a defensive application may be an active defensive application, in which case it not only detects penetration attempts into its hosting network node but also attempts to defend its hosting node against the detected attacks by activating at least one counter-measure.

56. "user interface"—A man-machine interface that does at least one of (i) providing information to a user, and (ii) receiving input from the user. Towards this end, any user interface includes at least one of (i) an input device (e.g. touch-screen, mouse, keyboard, joystick, camera) for receiving input from the user, and (ii) an output device (e.g. display screen such as a touch-screen, speaker) for providing information to the user. A user interface typically also includes executable user-interface code for at least one of (i) causing the output device to provide information to the user (e.g. to display text associated with radio-buttons or with a check list, or text of a drop-down list) and (ii) processing user-input received via the input device.

In different examples, the executable code may be compiled-code (e.g. in assembly or machine-language), interpreted byte-code (e.g. Java byte-code), or browser-executed code (e.g. JavaScript code) that may be sent to a client device from a remote server and then executed by the client device.

57. "user interface of a computing device"—A user interface that is functionally attached to the computing device and serves the computing device for interacting with the user.

An input device of a user interface of a computing device may share a common housing with the computing device (e.g. a touch-screen of a tablet), or may be physically separate from the computing device and be in communication with it, either through a physical port (e.g. a USB port) or wirelessly (e.g. a wireless mouse). An output device of a user interface of a computing device may share a common housing with the computing device (e.g. a touch-screen of a tablet), or may be physically separate from the computing device and be in communication with it, either through a physical port (e.g. an HDMI port) or wirelessly.

User-interface code of a user interface of a computing device is stored in a memory accessible to the computing device and is executed by one or more processors of the computing device. In one example related to web-based user interfaces, at least some of this code may be received from a remote server and then locally executed by the computing device which functions as a client. In another example related to locally-implemented user interfaces, all of the user-interface code is pre-loaded onto the computing device.

58. "setting a campaign to be based on a pre-defined scenario"—Selecting the values of the information items of the campaign at least partially according to the corresponding values of the information items of the pre-defined scenario. The setting includes assigning to every information item of the campaign the value of the corresponding information item of the pre-defined scenario. Optionally, after the assigning, the setting may further include manually overriding and changing one or more of the assigned values of the information items of the campaign.

59. "random selection"—A selection that depends on a random or pseudo-random factor. Different possible outcomes in a random selection do not necessarily have the same probabilities of being selected.

60. "subset/subgroup of a given set/group" or "sub-set/sub-group of a given set/group"—A set/group that satisfies the condition that that every member of it is also a member of the given set/group. Unless otherwise stated, a subset/subgroup may be empty and contain no members at all. Unless otherwise stated, a subset/subgroup of a given set/group may contain all the members of the given set/group and be equal to the given set/group.

61. "proper subset/subgroup of a given set/group" or "proper sub-set/sub-group of a given set/group"—A subset/subgroup of the given set/group that is not equal to the given set/group. In other words, there is at least one member of the given set/group that is not a member of the subset/subgroup.

62. "or"—A logical operator combining two Boolean input conditions into a Boolean compound condition, such that the compound condition is satisfied if and only if at least one of the two input conditions is satisfied. In other words, if condition C=condition A or condition B, then condition C is not satisfied when both condition A and condition B are not satisfied, but is satisfied in each of the following cases: (i) condition A is satisfied and condition B is not satisfied, (ii) condition A is not satisfied and condition B is satisfied, and (iii) both condition A and condition B are satisfied.

63. "one of A and B"—If A and B are specific items, then "one of A and B" is equivalent to "only A or only B, but not both". For example, "one of John and Mary" is equivalent to "only John or only Mary, but not both John and Mary". If A and B are categories, then "one of A and B" is equivalent to "only one of A or only one of B, but not both one of A and one of B". For example, "one of a dog and a cat" is equivalent to "only one dog or only one cat, but not both one dog and one cat". Similarly, if A and B are specific items, then "at least one of A and B" is equivalent to "only A or only B, or both A and B". For example, "at least one of John and Mary" is equivalent to "only John or only Mary, or both John and Mary". If A and B are categories, then "at least one of A and B" is equivalent to "only at least one of A or only at least one of B, or both at least one of A and at least one of B". For example, "at least one of a dog and a cat" is equivalent to "only at least one dog or only at least one cat, or both at least one dog and at least one cat".

Note that in "one of dogs and cats", "dogs" and "cats" are not categories but specific groups (i.e. specific items). Therefore, "one of dogs and cats" is equivalent to "only dogs or only cats, but not both dogs and cats". Similarly, "at least one of dogs and cats" is equivalent to "only dogs or only cats, or both dogs and cats".

If A, B and C are specific items, then "one of A, B and C" is equivalent to "only A or only B or only C, but not a combination of two or three members of the group consisting of: A, B and C", and "at least one of A, B and C" is equivalent to "only A or only B or only C, or any combination of two or three members of the group consisting of: A, B and C".

If A, B and C are categories, then "one of A, B and C" is equivalent to "only one of A or only one of B or only one of C, but not a combination of two or three members of the group consisting of: one of A, one of B and one of C", and "at least one of A, B and C" is equivalent to "only at least one of A or only at least one of B or only at least one of C, or any combination of two or three members of the group consisting of: one of A, one of B and one of C".

If the list following the "one of" or the "at least one of" contains more than three members, then the previous definitions are again applicable, with the appropriate modifications that extrapolate the above logic.

Note that "one or more of" is equivalent to "at least one of", and the two terms are synonyms.

CONCLUDING COMMENT

All references cited herein are incorporated by reference in their entirety. Citation of a reference does not constitute an admission that the reference is prior art.

It is further noted that any of the embodiments described above may further include receiving, sending or storing instructions and/or data that implement the operations described above in conjunction with the figures upon a computer readable medium. Generally speaking, a computer readable medium (e.g. non-transitory medium) may include storage media or memory media such as magnetic or flash or optical media, e.g. disk or CD-ROM, volatile or non-volatile media such as RAM, ROM, etc.

Having thus described the foregoing exemplary embodiments it will be apparent to those skilled in the art that various equivalents, alterations, modifications, and improvements thereof are possible without departing from the scope and spirit of the claims as hereafter recited. In particular, different embodiments may include combinations of features other than those described herein. Accordingly, the claims are not limited to the foregoing discussion.

What is claimed is:

1. A method for subjecting a single networked system to first and second penetration testing campaigns such that (i) both penetration testing campaigns are performed by a single penetration testing system; (ii) the first penetration testing campaign employs only active validation for validating vulnerabilities of network nodes of the single networked system; and (iii) the second penetration testing campaign employs only passive validation for validating vulnerabilities of network nodes of the single networked system, the method comprising:
- a. executing the first penetration testing campaign by the single penetration testing system, the executing of the first penetration testing campaign comprising performing one or more validation operations for validating vulnerabilities for network nodes of the single networked system, wherein the methods of validation used for all validation operations included in the first penetration testing campaign are active validation methods;
- b. executing the second penetration testing campaign by the single penetration testing system, the executing of the second penetration testing campaign comprising performing one or more validation operations for validating vulnerabilities for network nodes of the single networked system, wherein the methods of validation used for all validation operations included in the second penetration testing campaign are passive validation methods, and
- c. reporting, by the single penetration testing system, at least one security vulnerability of the single networked system determined to exist based on at least one member selected from the group consisting of (1) results of the executing of the first penetration testing campaign, and (2) results of the executing of the second penetration testing campaign, wherein the reporting comprises performing at least one operation selected from the group consisting of (i) causing a display device to display a report containing information about the at least one security vulnerability of the single networked system, (ii) storing the report containing information about the at least one security vulnerability of the single networked system in a file, and (iii) electronically transmitting the report containing information about the at least one security vulnerability of the single networked system,
    wherein the first penetration testing campaign is based on a first scenario template, the second penetration testing campaign is based on a second scenario template, and the second scenario template is different from the first scenario template.

2. The method of claim 1, wherein the second penetration testing campaign commences after the first penetration testing campaign has concluded.

3. The method of claim 1, wherein the first penetration testing campaign commences after the second penetration testing campaign has concluded.

4. The method of claim 1, wherein the first and second penetration testing campaigns are performed at least partially simultaneously.

5. The method of claim 1, wherein the identity of the first scenario template uniquely determines the use of active validation for all validation operations included in the first penetration testing campaign, and the identity of the second scenario template uniquely determines the use of passive validation for all validation operations included in the second penetration testing campaign.

6. The method of claim 1, wherein the penetration testing system is controlled by a user interface of a computing device, and the method for executing the penetration testing campaigns further comprises:
    receiving, by the penetration testing system and via the user interface of the computing device, one or more manually-entered inputs, the one or more manually-entered inputs explicitly defining at least one of (i) a type of a validation method to be used for validating all vulnerabilities in the first penetration testing campaign that is based on the first scenario template, and (ii) a type of a validation method to be used for validating all vulnerabilities in the second penetration testing campaign that is based on the second scenario template.

7. The method of claim 1, wherein the penetration testing system is controlled by a user interface of a computing device, and the method for executing the penetration testing campaigns further comprises:
    receiving, by the penetration testing system and via the user interface of the computing device, one or more manually-entered inputs, the one or more manually-entered inputs explicitly defining at least one of (i) a type of a validation method to be used for validating vulnerabilities in all penetration testing campaigns that are based on the first scenario template, and (ii) a type of a validation method to be used for validating vulnerabilities in all penetration testing campaigns that are based on the second scenario template.

8. A penetration testing system for subjecting a networked system to first and second penetration testing campaigns such that (i) both penetration testing campaigns are performed by the penetration testing system; (ii) the first penetration testing campaign employs only active validation for validating vulnerabilities of network nodes of the networked system; and (iii) the second penetration testing campaign employs only passive validation for validating vulnerabilities of network nodes of the networked system, the penetration testing system comprising:
- a. a remote computing device comprising a computer memory and one or more processors, the remote computing device in networked communication with multiple network nodes of the networked system; and
- b. a non-transitory computer-readable storage medium containing program instructions, wherein execution of the program instructions by the one or more processors of the remote computing device performs all of the following:
    - i. executing the first penetration testing campaign by the remote computing device, the executing of the first penetration testing campaign comprising performing one or more validation operations for validating vulnerabilities for network nodes of the networked system, wherein the methods of validation used for all validation operations included in the first penetration testing campaign are active validation methods;
    - ii. executing the second penetration testing campaign by the remote computing device, the executing of the second penetration testing campaign comprising performing one or more validation operations for validating vulnerabilities for network nodes of the networked system, wherein the methods of validation used for all validation operations included in the second penetration testing campaign are passive validation methods, and
    - iii. reporting at least one security vulnerability of the networked system determined to exist based on at least one member selected from the group consisting of (1) results of the executing of the first penetration testing campaign, and (2) results of the executing of the second penetration testing campaign, wherein the reporting comprises performing at least one operation selected from the group consisting of (i) causing a display device to display a report containing information about the at least one security vulnerability of the networked system, (ii) storing the report containing the report containing information about the at least one security vulnerability of the networked system in a file, and (iii) electronically transmitting the report containing information about the at least one security vulnerability of the networked system, wherein the first penetration testing campaign is based on a first scenario template, the second penetration testing campaign is based on a second scenario template, and the second scenario template is different from the first scenario template.

9. The penetration testing system of claim 8, wherein the execution of the program instructions by the one or more processors of the remote computing device causes the second penetration testing campaign to commence after the first penetration testing campaign had concluded.

10. The penetration testing system of claim 8, wherein the execution of the program instructions by the one or more processors of the remote computing device causes the first penetration testing campaign to commence after the second penetration testing campaign had concluded.

11. The penetration testing system of claim 8, wherein the execution of the program instructions by the one or more processors of the remote computing device causes the first and second penetration testing campaigns to be performed at least partially simultaneously.

12. The penetration testing system of claim 8, wherein the identity of the first scenario template uniquely determines the use of active validation for all validation operations included in the first penetration testing campaign, and the identity of the second scenario template uniquely determines the use of passive validation for all validation operations included in the second penetration testing campaign.

13. The penetration testing system of claim 8, wherein the penetration testing system is controlled by a user interface, and the execution of the program instructions by the one or more processors of the remote computing device further performs: receiving, by the penetration testing system and via the user interface, one or more manually-entered inputs, the one or more manually-entered inputs explicitly defining at least one of (i) a type of a validation method to be used for validating all vulnerabilities in the first penetration testing campaign that is based on the first scenario template, and (ii) a type of a validation method to be used for validating all vulnerabilities in the second penetration testing campaign that is based on the second scenario template.

14. The penetration testing system of claim 8, wherein the penetration testing system is controlled by a user interface, and the execution of the program instructions by the one or more processors of the remote computing device further performs: receiving, by the penetration testing system and via the user interface, one or more manually-entered inputs, the one or more manually-entered inputs explicitly defining at least one of (i) a type of a validation method to be used for validating vulnerabilities in all penetration testing campaigns that are based on the first scenario template, and (ii) a type of a validation method to be used for validating vulnerabilities in all penetration testing campaigns that are based on the second scenario template.

* * * * *